(12) United States Patent
Iritani

(10) Patent No.: US 11,500,273 B2
(45) Date of Patent: Nov. 15, 2022

(54) IMAGE PICKUP APPARATUS TO WHICH HANDLE IS ATTACHABLE

(71) Applicant: CANON KABUSHIKI KAISHA, Tokyo (JP)

(72) Inventor: Yuko Iritani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/325,964

(22) Filed: May 20, 2021

(65) Prior Publication Data

US 2021/0373417 A1    Dec. 2, 2021

(30) Foreign Application Priority Data

May 29, 2020    (JP) .............................. JP2020-094419

(51) Int. Cl.
  *G03B 17/56*    (2021.01)
  *H04N 5/225*    (2006.01)

(52) U.S. Cl.
  CPC ......... *G03B 17/563* (2013.01); *H04N 5/2252* (2013.01)

(58) Field of Classification Search
  CPC ... G03B 17/563; H04N 5/2252; H04N 5/2251
  See application file for complete search history.

(56) References Cited

U.S. PATENT DOCUMENTS

| 9,146,005 | B1* | 9/2015 | Swanson | F16M 13/00 |
| 2004/0183941 | A1* | 9/2004 | McCutchen | H04N 5/2251 |
| | | | | 348/E5.025 |
| 2015/0071627 | A1* | 3/2015 | Hoang | F16M 11/10 |
| | | | | 396/421 |
| 2016/0091779 | A1* | 3/2016 | Jodoin | G03B 17/563 |
| | | | | 396/428 |
| 2017/0108162 | A1* | 4/2017 | Pan | F16M 11/16 |
| 2017/0289456 | A1* | 10/2017 | David | B25J 13/088 |
| 2018/0188637 | A1* | 7/2018 | Tian | F16M 11/38 |

FOREIGN PATENT DOCUMENTS

JP    2016-128851 A    7/2016

* cited by examiner

*Primary Examiner* — Amy R Hsu
(74) *Attorney, Agent, or Firm* — Canon U.S.A., Inc. I.P. Division

(57) ABSTRACT

An image pickup apparatus includes an apparatus body having a first fixing part, a handle member having first and second fastening parts and a first holding member having a third fastening part fastened with the second fastening part and a second fixing part fixed to the first fixing part. Each of the three fastening parts includes: a radial gear and a through hole provided parallel to a fastening direction. The radial gear includes depressions and projections formed in uniform phase in normal line directions of a center axis of the through hole. The handle member is fixed to the first holding member by communicating the through hole of the second fastening part with the through hole of the third fastening part and by a bolt being fastened to a nut through the communicated through holes in a state where the radial gears of the three fastening parts are engaged.

11 Claims, 40 Drawing Sheets

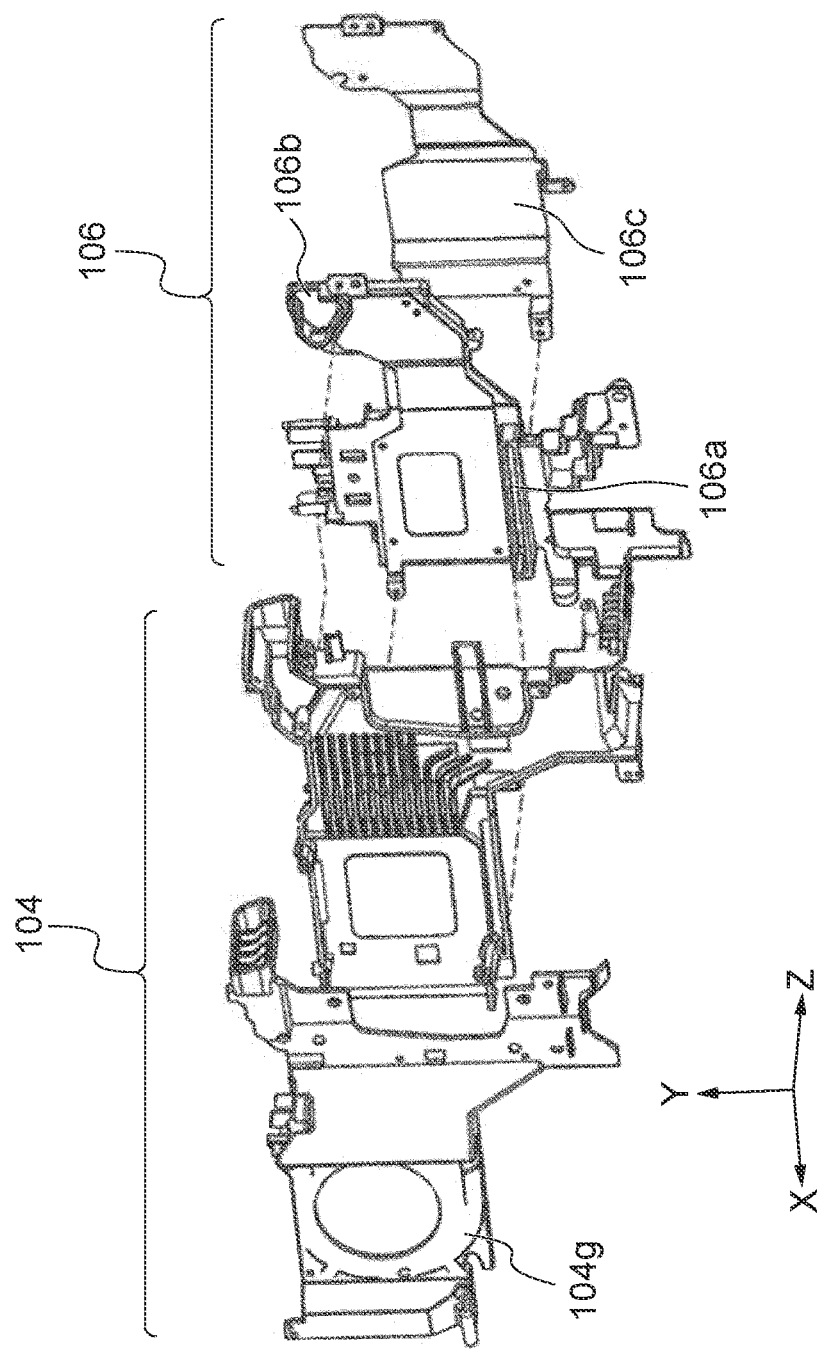

IMAGE PICKUP APPARATUS TO WHICH HANDLE IS ATTACHABLE

BACKGROUND

Field

The present disclosure relates to an image pickup apparatus to which a handle is attachable, and to an accessory that is attachable to the image pickup apparatus.

Description of the Related Art

Some business-use image pickup apparatuses that can capture a video image allow of attachment of handles to upper parts of the apparatuses. Such an image pickup apparatus is easily carried by gripping the handle and by lifting up the apparatus.

In the meantime, an accessory like a display panel may be attached on the upper surface of an image pickup apparatus. In this case, the accessory can be attached toward a desired direction by holding the accessory with a holder etc. and by attaching the holder to the image pickup apparatus. Against this, a compact image pickup apparatus has only one attachment part in many cases. Such an image pickup apparatus can arrange an accessory at a desired position while attaching a handle by attaching the accessory to the handle (for example, see Japanese Laid-Open Patent Publication (Kokai) No. 2016-128851 (JP 2016-128851A)).

However, the configuration described in the above-mentioned publication may not fix the accessory at a desired position in a state where the handle needed to carry the image pickup apparatus is attached because the accessory is attached to an accessory fixing part of the handle.

A method to attach the accessory to a movable arm-shaped holding member that is fixed to the handle can be considered for this. According to this method, the accessory can be arranged at a desired position by adjusting the shape of the holding member. However, since use of such a holding member increases total weight of the apparatus, the ease of photographing becomes less easy.

SUMMARY

Various embodiments of the present disclosure provide an image pickup apparatus that can be equipped with an accessory in various attachment states.

According to an aspect of the present disclosure, an image pickup apparatus includes an image pickup apparatus body configured to have a first fixing part, a handle member configured to have a first fastening part at a tip and a second fastening part at a base end, and a first holding member configured to have a third fastening part that is fastened with the second fastening part and a second fixing part that is fixed to the first fixing part, wherein each of the first fastening part, the second fastening part, and the third fastening part includes: a radial gear and a through hole provided in a direction approximately parallel to a fastening direction, where the radial gear includes depressions and projections formed in uniform phase in normal line directions of a center axis of the through hole, and wherein the handle member is fixed to the first holding member by communicating the through hole of the second fastening part with the through hole of the third fastening part and by a fastening bolt being screwed with a fastening nut through the communicated through holes in a state where the radial gears of the first, second, and third fastening parts are engaged.

According to various embodiments of the present disclosure, an image pickup apparatus can be equipped with an accessory in various attachment states.

Further features will become apparent from the following description of exemplary embodiments with reference to the attached drawings.

BRIEF DESCRIPTION OF THE DRAWINGS

FIG. 6B is a second exploded perspective view showing the main duct and the sensor duct.

DESCRIPTION OF THE EMBODIMENTS

Figure 1A:
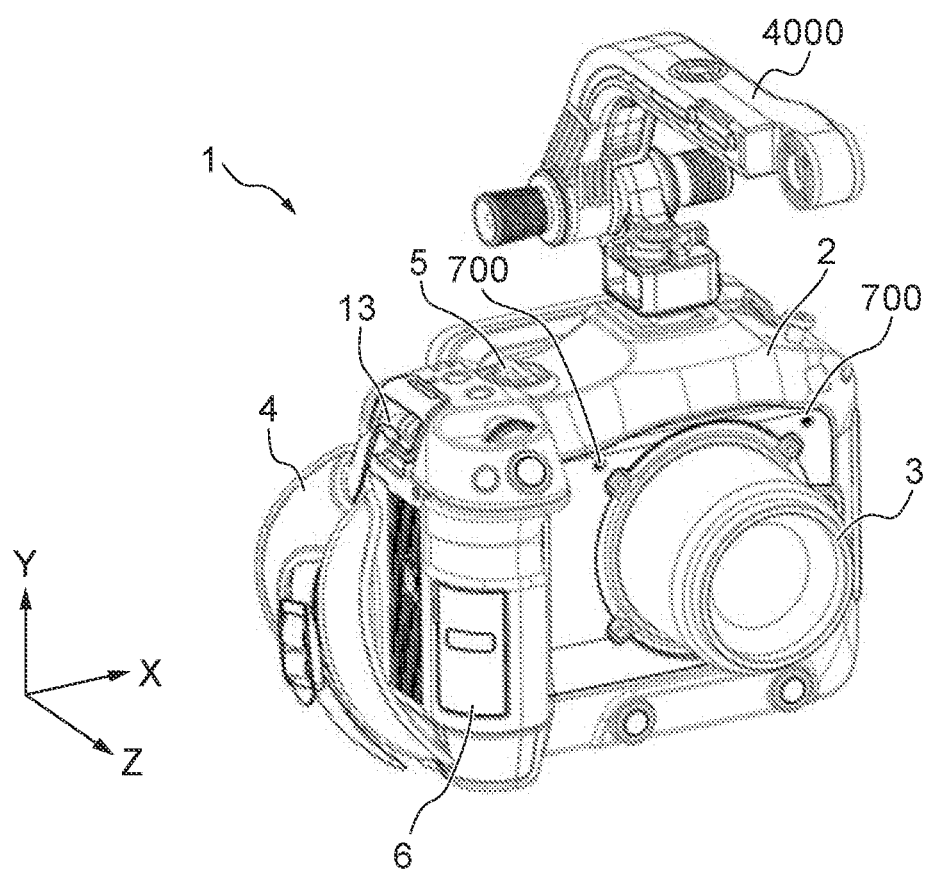
FIG. 1A is a first external perspective view showing an image pickup apparatus according to one embodiment.

Hereafter, some exemplary embodiments according to the present disclosure will be described in detail by referring to the drawings.

Figure 1B:
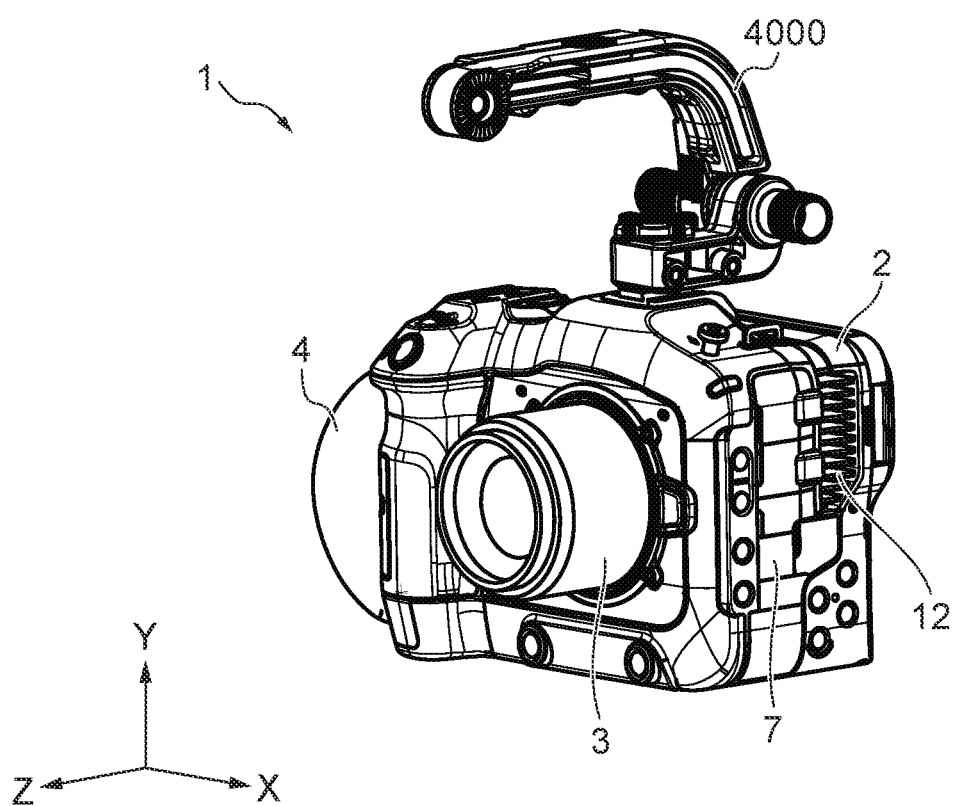
FIG. 1B is a second external perspective view showing the image pickup apparatus.
Figure 1C:
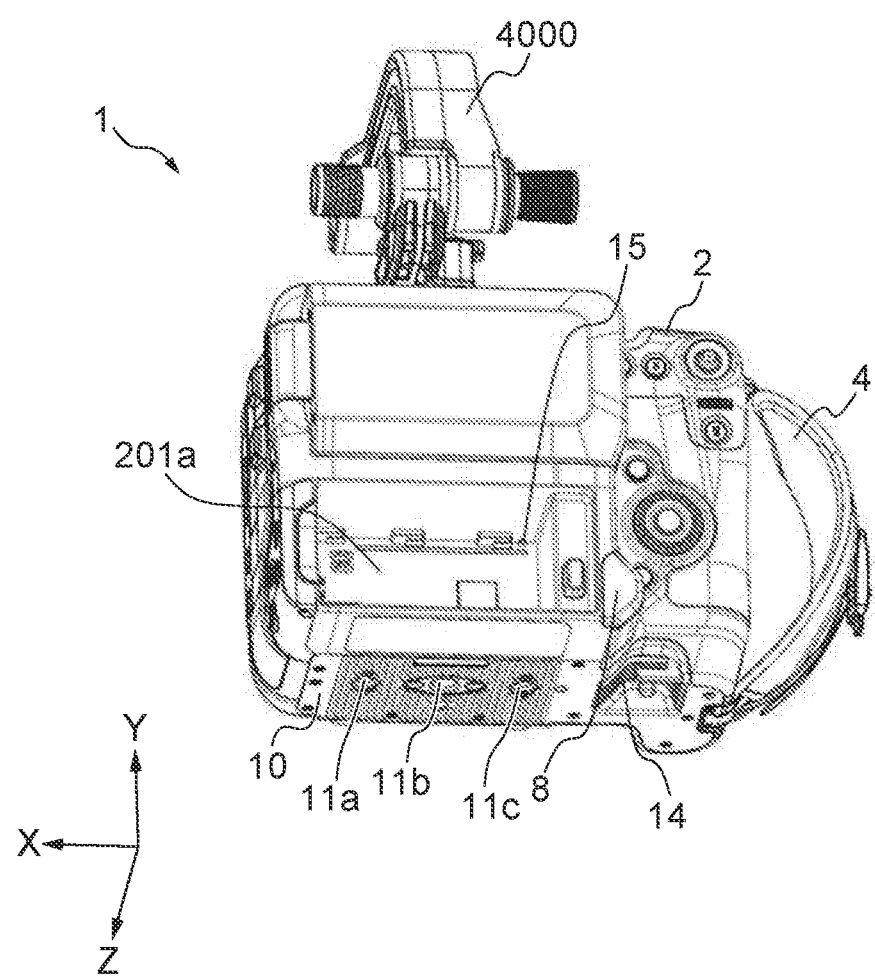
FIG. 1C is a third external perspective view showing the image pickup apparatus.

FIG. 1A, FIG. 1B, and FIG. 1C are external perspective views showing an image pickup apparatus 1 according to one embodiment of the present disclosure viewed from different directions, respectively.

An orthogonal coordinate system that is constituted by an X-axis, a Y-axis, and a Z-axis that mutually intersect at the right angle is defined in FIG. 1A, FIG. 1B, and FIG. 1C for convenience of description. The Z-axis is parallel to a photographing optical axis of the image pickup apparatus 1. A direction directed from the image pickup apparatus 1 toward an object (not shown) is a forward direction (+Z). Moreover, the X-axis is parallel to a width direction of the image pickup apparatus 1 in a plane that intersects perpendicularly with the Z-axis. A direction directed from the left side toward the right side when the image pickup apparatus 1 is viewed from the object side is a forward direction (+X). The Y-axis that intersects perpendicularly with the X-axis and the Z-axis is parallel to a height direction. A direction directed from a bottom side toward an upper side is a forward direction (+Y).

The image pickup apparatus 1 has an image pickup apparatus body 2 (hereinafter referred to as a "camera body 2"), a lens 3, a grip belt 4, and a handle unit 4000. The camera body 2 contains main functions of the image pickup apparatus 1, such as a main control substrate that totally controls the image pickup apparatus 1, an image sensor that converts incident light through the lens 3 into an electrical signal, a power source, and a recording unit that records image data.

Various kinds of operating members and terminals are arranged in predetermined positions of the external appearance of the camera body 2. For example, the camera body 2 of the image pickup apparatus 1 is provided with operation members, such as a power switch 5 that switches ON/OFF of the power source of the image pickup apparatus 1, a release button that instructs a photographing start, a menu button for various settings, a move button, and a selection button. Moreover, the camera body 2 is provided with a medium lid 6 that protects a contained recording medium, such as a card type recording medium, and a microphone unit 700 that records external voice. Furthermore, the camera body 2 is provided with an external terminal lid 7 that protects connection terminals, such as a USB terminal and a HDMI (registered trademark) terminal, that are used for connection with external devices.

A DC jack lid 8 that protects a DC jack terminal and a battery chamber 201a that stores a battery are provided in a back side (−Z side) of the camera body 2. Internal tripod threads 11a, 11b, and 11c for supporting the camera body 2 with a tripod or a rig are provided in a bottom cover 10 arranged at the bottom side (−Y side) of the camera body 2.

The lens 3 is attached to the front side (+Z side) of the camera body 2. Various lenses that are different in focal length, an open F value, and a zoom function, etc. are prepared. A user can exchange the lens 3 attached to the camera body 2 in accordance with a photographing condition.

The camera body 2 mounts a forced air cooling function using a fan as a cooling mechanism for cooling heat generating elements (various kinds of electronic parts that generate heat by operating) implemented on substrates contained. The camera body 2 has a main body inlet port 12 that opens toward the +X-direction of the camera body 2 as an inlet port (FIG. 1B). Moreover, the camera body 2 has a first body exhaust port 13 that opens toward the −X-direction as an exhaust port (FIG. 1A). Then, a second body exhaust port 14 that opens toward the −Y-direction is provided in the bottom cover 10 and a third body exhaust port 15 is provided in the battery chamber 201a (FIG. 1C).

The image pickup apparatus 1 is configured so as to attach the grip belt 4, which assists grip of the grip unit 300 by a user (photographing person), to the lower part of the first body exhaust port 13. Accordingly, when the user holds the camera body 2 using the grip belt 4, an exhaust wind does not hit a gripping hand. Moreover, the second body exhaust port 14 opens to the back side (−Z side) of the camera body 2 and does not open to the front side (+Z side). Accordingly, since the second body exhaust port 14 cannot be seen when the image pickup apparatus 1 is seen from the front side, a fine view is maintained. Moreover, since the second body exhaust port 14 is not closed by a floor when the camera body 2 is put on the floor, exhaust air can escape to the back side without being disturbed by the floor, which does not impair cooling performance of the camera body 2.

When a battery is stored in the battery chamber 201a, a certain distance is held between the third body exhaust port 15 and the battery, which secures an exhaust air flow passage. In the meantime, since the battery hides the third body exhaust port 15, the third body exhaust port 15 cannot be seen by the user, which maintains the fine view. It should be noted that details of the forced air cooling, such as an arrangement of a cooling fan, will be mentioned later.

Figure 1D:
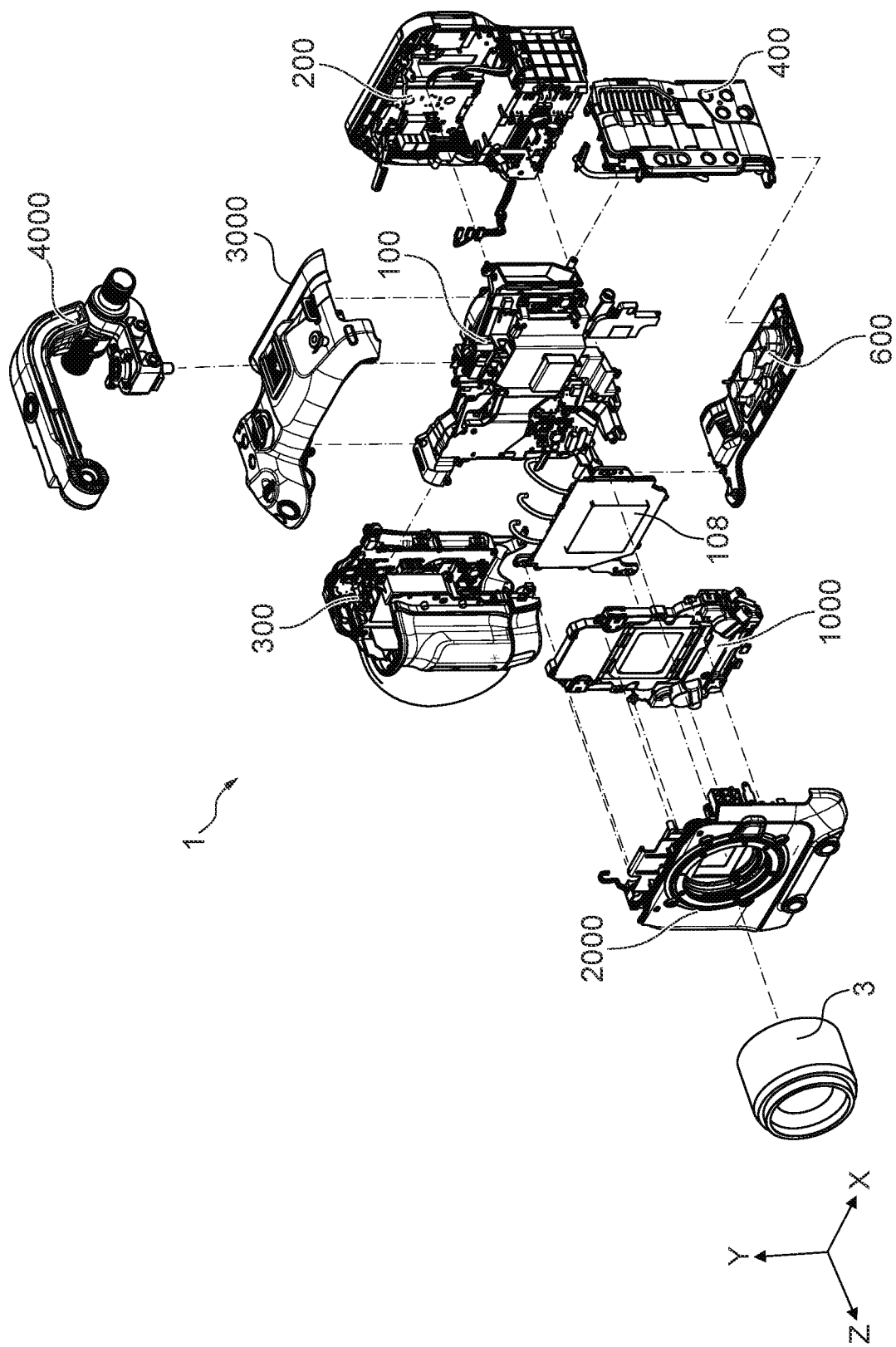
FIG. 1D is an exploded perspective view showing the image pickup apparatus by dividing into rough units.

FIG. 1D is an exploded perspective view showing the image pickup apparatus 1 by dividing into rough units. The camera body 2 is provided with an F unit 2000, an ND unit 1000, a sensor unit 108, a main unit 100, and a rear unit 200 that are arranged toward the −Z side from the +Z side. moreover, the camera body 2 is provided with an R unit 400 in the +X side, a grip unit 300 at the −X side, a bottom unit 600 in the −Y side, and a top unit 3000 and handle unit 4000 at the +Y side.

The main unit 100 has forced cooling components, such as a duct and a cooling fan. The rear unit 200 has a liquid crystal panel and the battery chamber 201a. The grip unit 300 has a grip part which contains a recording medium. The R unit 400 has an external connection terminal and the main body inlet port 12. The sensor unit 108 has a sensor substrate in which an image sensor is implemented. The ND unit 1000 is provided with a plurality of optical filters that adjust a light amount entering into the image sensor. The F unit 2000 has a mount part for detaching and attaching the lens 3. The bottom unit 600 has a tripod part. The top unit 3000 has the power switch 5. The handle unit 4000 can be detachably attached to the top unit 3000. It should be noted that the lens 3 is detachably attached to the mount part of the F unit 2000.

Assembly procedures of the image pickup apparatus 1 are as follows. First, the main unit 100 is attached to the rear unit 200, the grip unit 300 is attached to this, and then the R unit 400 is attached. The F unit 2000 to which the sensor unit 108 and ND unit 1000 are attached is attached to the units assembled so far. When the top unit 3000 and the bottom unit 600 are further attached, the camera body 2 is completed. When the desired lens 3 is attached to the F unit 2000 and the handle unit 4000 is attached to the top unit 3000, the image pickup apparatus 1 is completed. It should be noted that details of the ND unit 1000, F unit 2000, top unit 3000, and handle unit 4000 will be mentioned later.

Figure 2A:
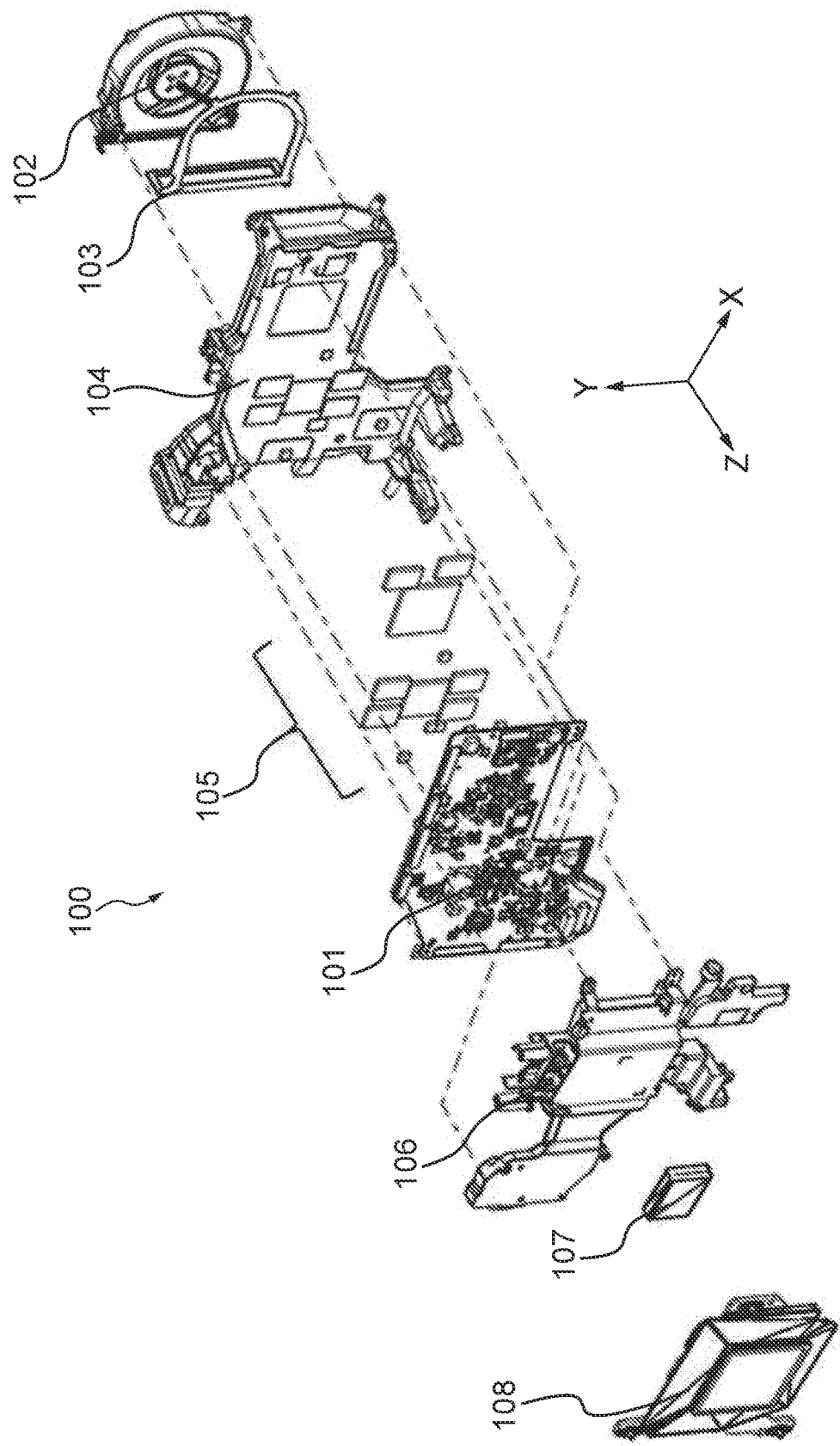
FIG. 2A is a first exploded perspective view showing a main unit of the image pickup apparatus.
Figure 2B:
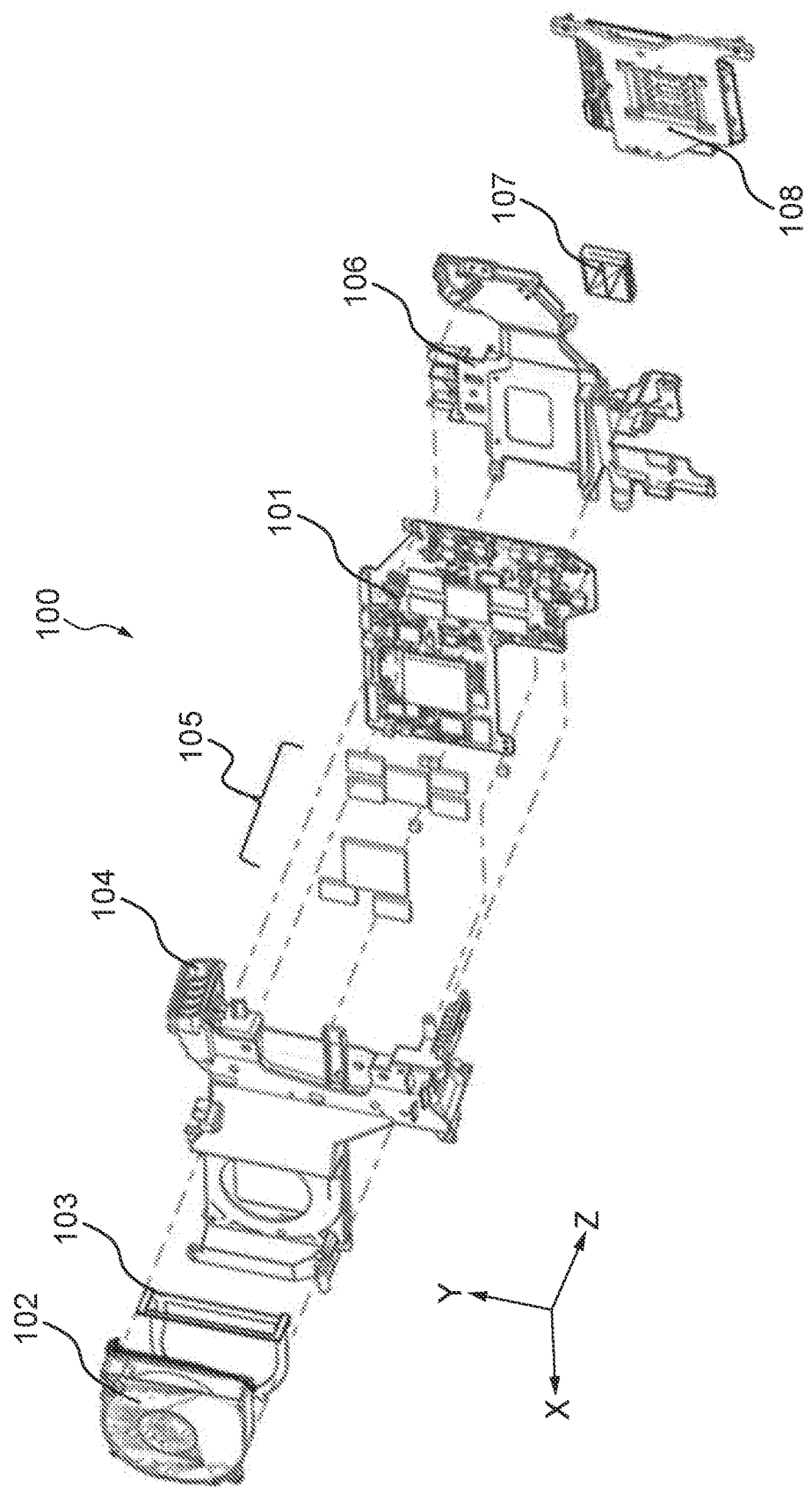
FIG. 2B is a second exploded perspective view showing the main unit.
Figure 3A:
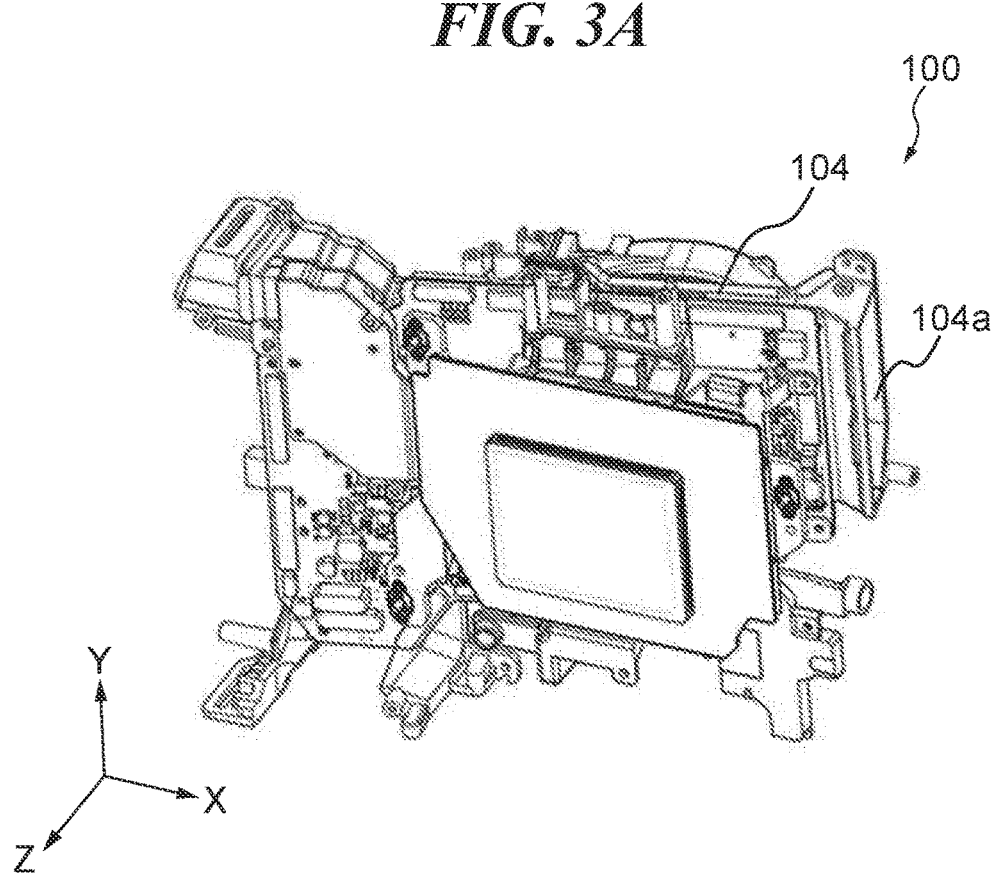
FIG. 3A and FIG. 3B are perspective views showing the main unit viewed from different directions, respectively.
Figure 3B:
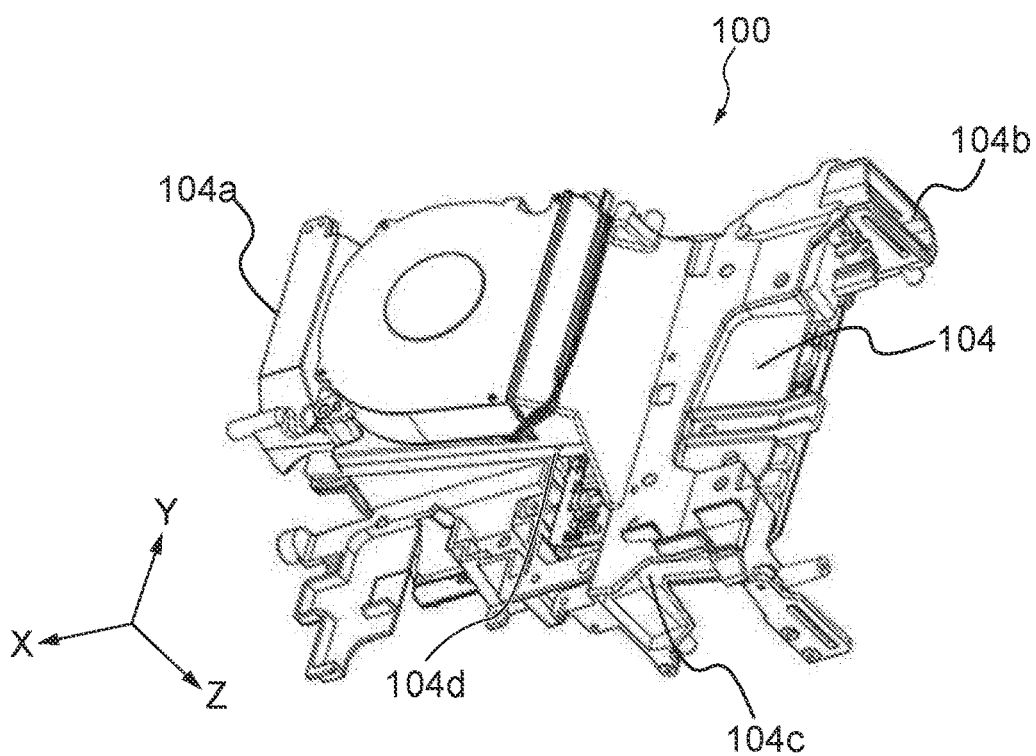

Next, the heat dissipation system of the image pickup apparatus 1 will be described. FIG. 2A and FIG. 2B are the exploded perspective views showing the main unit 100 that has a heat dissipation mechanism viewed from different directions, respectively. FIG. 3A and FIG. 3B are perspective views showing the main unit 100 viewed from different directions, respectively.

As shown in FIG. 2A and FIG. 2B, the heat dissipation system of the image pickup apparatus 1 is constituted by a main circuit board 101, a cooling fan 102, a cooling fan cushion 103, a main duct 104, a heat dissipation rubber 105, a sensor duct 106, a sensor heat dissipation member 107, and the sensor unit 108. The main circuit board 101 implements heat generating elements, such as an image processing semiconductor device, that generate heat during operations. Accordingly, the main circuit board 101 is one of heating components. Moreover, since the sensor unit 108 also includes the image sensor that generates heat during an operation, the sensor unit 108 is one of the heating components.

In the image pickup apparatus 1, air taken in by the cooling fan 102 into the inside from the outside of the camera body 2 flows into the main duct 104 and sensor duct 106 that are made from metal material, such as aluminum, that has high thermal conductivity. Since the heat is exchanged between the air flowing into these ducts and the heat dissipation rubber 105 and sensor heat dissipation member 107 that have high thermal conductivity, the main circuit board 101 and sensor unit 108, which are the heating components, are cooled, and the heated air is exhausted to the outside.

It should be noted that an inlet port 104a of the main duct 104 shown in FIG. 3A is connected to the main body inlet port 12 shown in FIG. 1B. A first exhaust port 104b shown in FIG. 3B is connected to the first body exhaust port 13 shown in FIG. 1A. A second exhaust port 104c is connected to the second body exhaust port 14 shown in FIG. 1C. And a third exhaust port 104d is connected to the third body exhaust port 15 shown in FIG. 1C. Details of the heat dissipation system will be mentioned later.

Figure 4A:
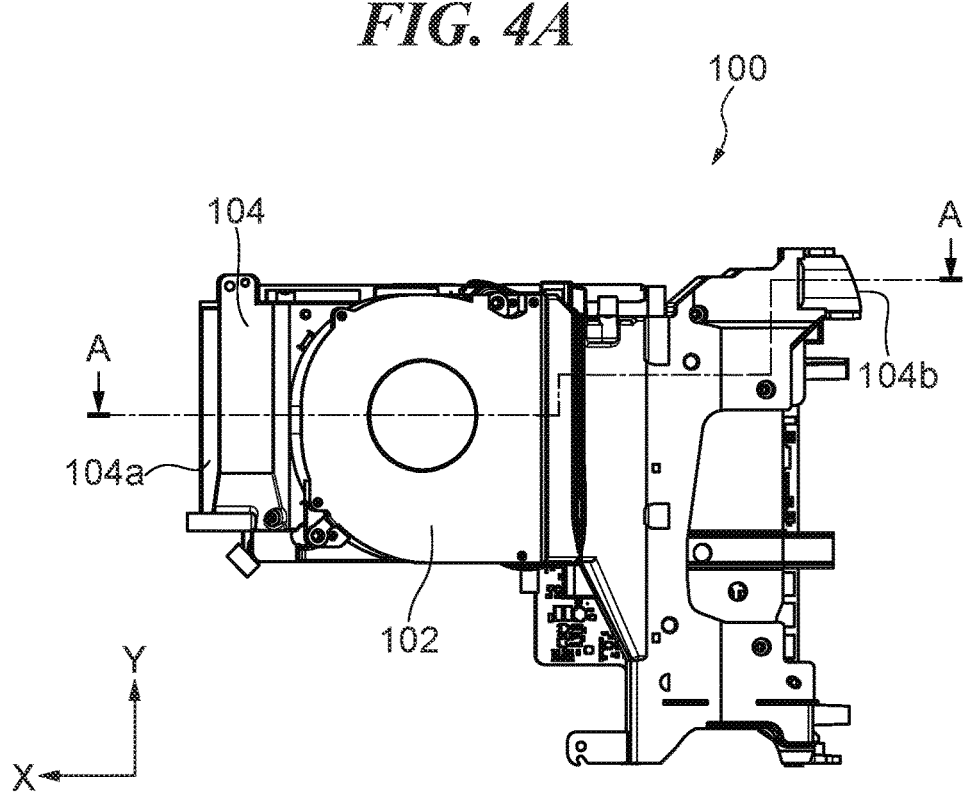
FIG. 4A is a back view showing the main unit.
Figure 4B:
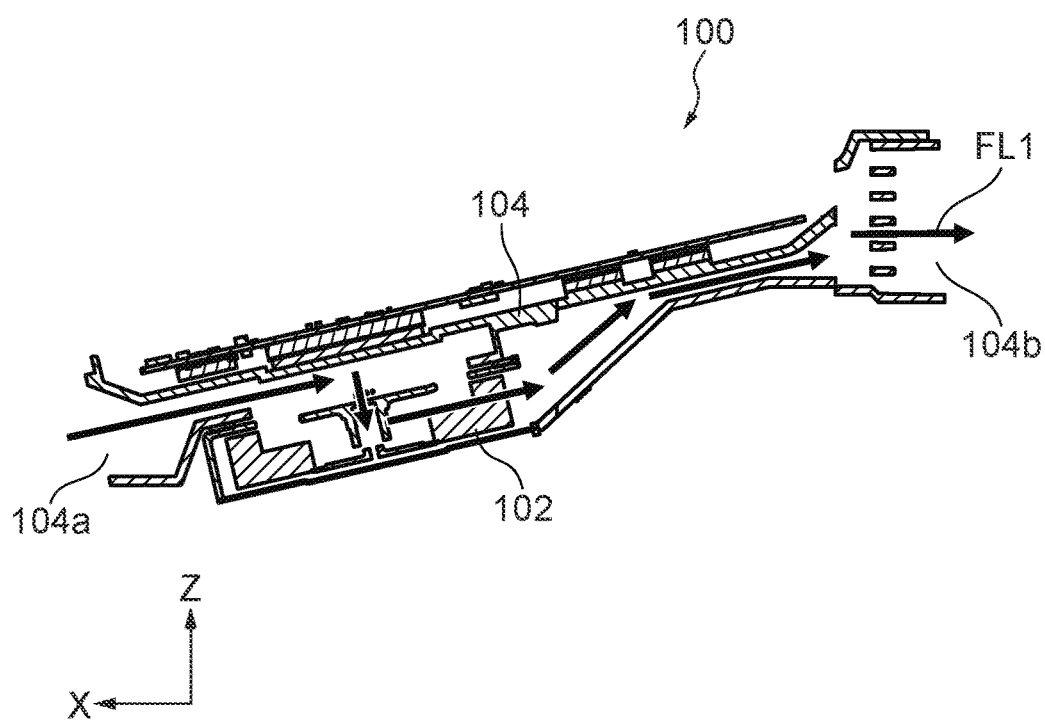
FIG. 4B is a sectional view showing the main unit taken along the line A-A in FIG. 4A and is a first view describing an airflow in a main duct in the image pickup apparatus.
Figure 5:
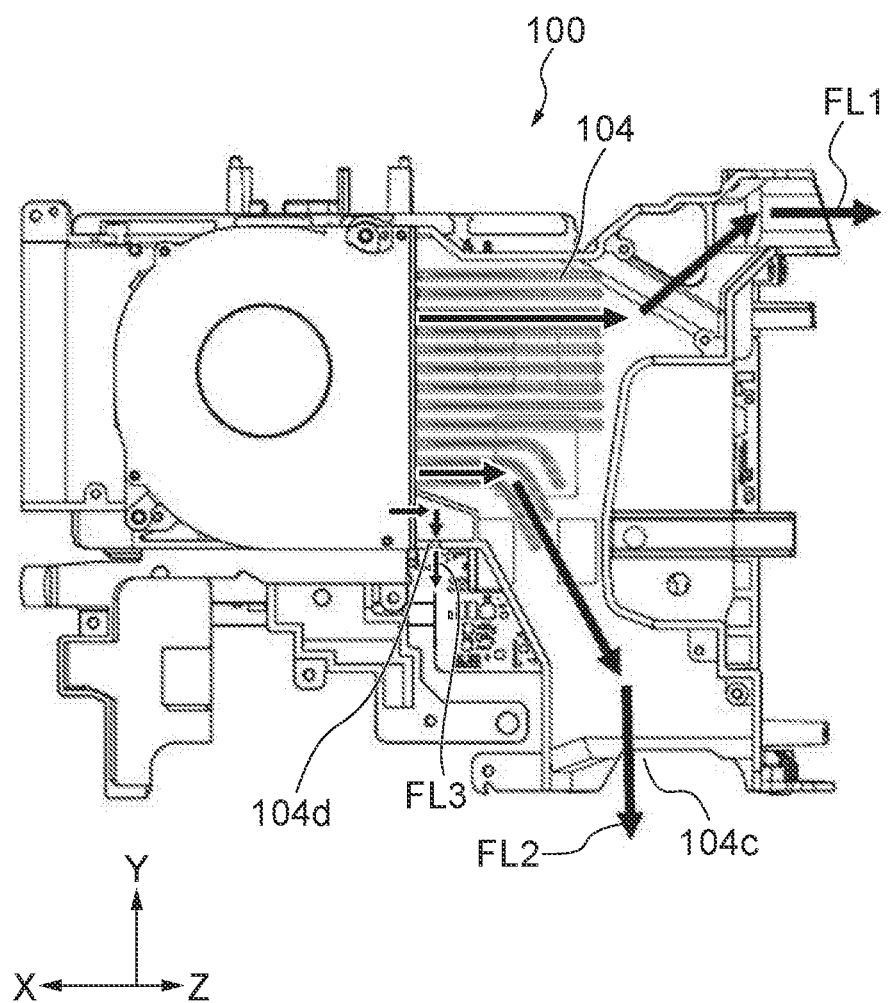
FIG. 5 is a second view describing the airflow in the main duct.

Next, the airflow in the main duct 104 will be described. FIG. 4A is a back view (view seen from the −Z side) of the main unit 100. FIG. 4B is a sectional view showing the main unit 100 taken along a line A-A shown in FIG. 4A, and is a view describing the airflow in the main duct 104. In FIG. 4A and FIG. 4B, the sensor duct 106 and the sensor heat dissipation member 107 are not shown. FIG. 5 is a view showing the air that flows through the main duct 104 while cutting the main unit 100 partially. It should be noted that FIG. 5 shows the main duct 104 in a simplified form. As shown by arrows FL1, FL2, and FL3, the air inhaled from the inlet port 104a by the cooling fan 102 passes along the cooling fan 102 and is exhausted from three places, the first exhaust port 104b, the second exhaust port 104c, and the third exhaust port 104d.

Figure 6A:
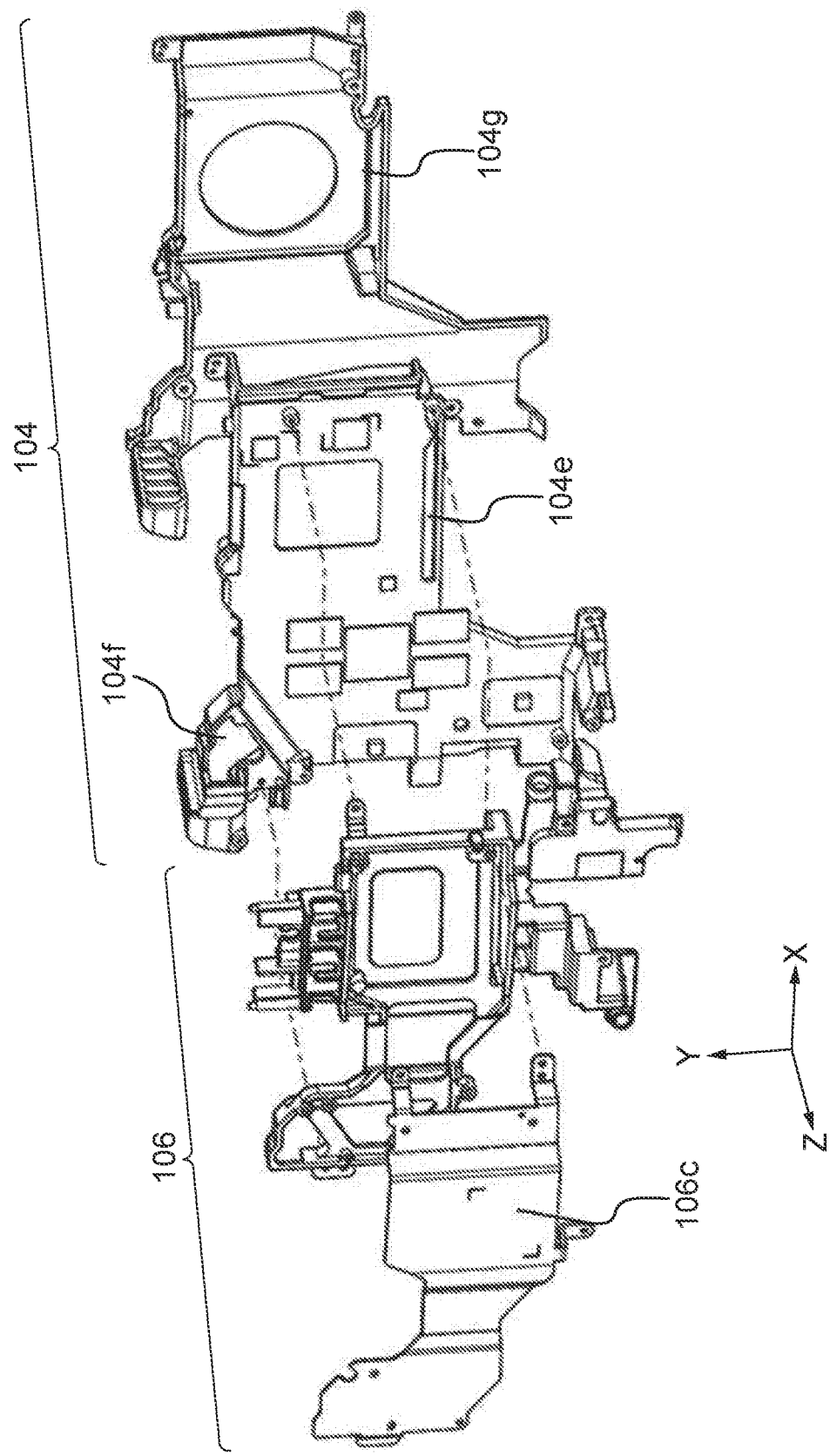
FIG. 6A is a first exploded perspective view showing the main duct and a sensor duct in the image pickup apparatus.

Next, the airflow in the sensor duct 106 will be described. FIG. 6A and FIG. 6B are exploded perspective views showing the main duct 104 and sensor duct 106 viewed from different directions, respectively.

In order to send the air flowing in the main duct 104 into the sensor duct 106, a first sensor-duct opening 104e and second sensor-duct opening 104f are provided in the main duct 104. Moreover, the sensor duct 106 is provided with a first main duct opening 106a and a second main duct opening 106b in positions that face these openings of the main duct 104 in the Z direction. The first sensor-duct opening 104e is connected to the first main duct opening 106a, and the second sensor-duct opening 104f is connected to the second main duct opening 106b.

Figure 7A:
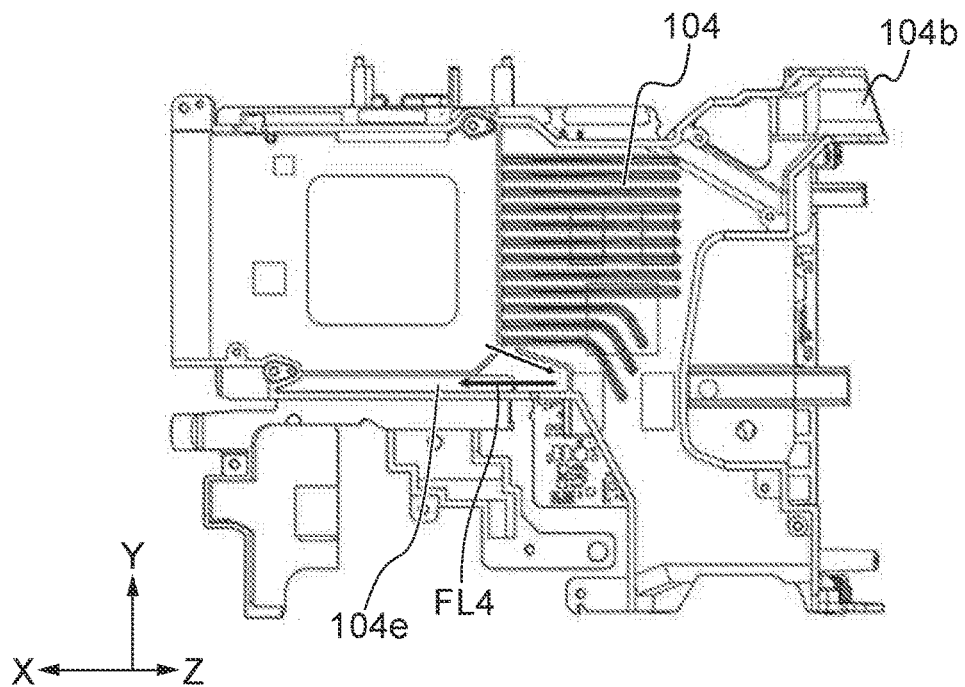
FIG. 7A and FIG. 7B are views respectively describing the airflow in the main duct and the airflow in the sensor duct.
Figure 7B:
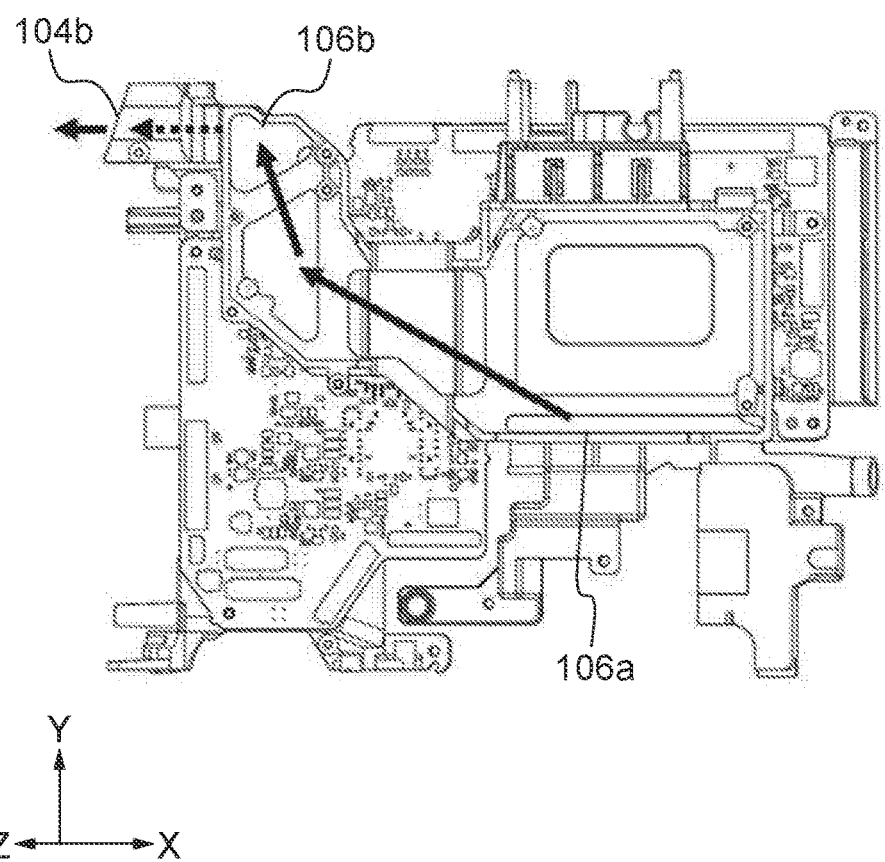

FIG. 7A is a view describing the airflow toward the first sensor-duct opening 104e in the main duct 104. FIG. 7B is a view describing the airflow toward the second main duct opening 106b in the sensor duct 106. It should be noted that FIG. 7A and FIG. 7B do no show a main duct cover 104g, a sensor duct plate 106c, and the cooling fan 102. As shown by an arrow FL4, the air flowing through the main duct 104 is guided to the first sensor-duct opening 104e. The air guided to the first sensor-duct opening 104e is introduced into the sensor duct 106 through the first main duct opening 106a. As shown in an arrow FL5 in FIG. 7B, the air introduced into the sensor duct 106 through the first main duct opening 106a passes through the inside of the sensor duct 106 and flows to the second main duct opening 106b. The air that flows into the second main duct opening 106b returns to the main duct 104 through the second sensor-duct opening 104f connected to the second main duct opening 106b, and then, the air is exhausted from the first exhaust port 104b.

In this way, the air inhaled from the inlet port 104a passes through the main duct 104 and sensor duct 106, and is exhausted from the first exhaust port 104b, the second exhaust port 104c, and the third exhaust port 104d in the image pickup apparatus 1. Meanwhile, since the heat is exchanged with the air in the main duct 104 and sensor duct 10, the heating components arranged inside the image pickup apparatus 1 are cooled.

Figure 8A:
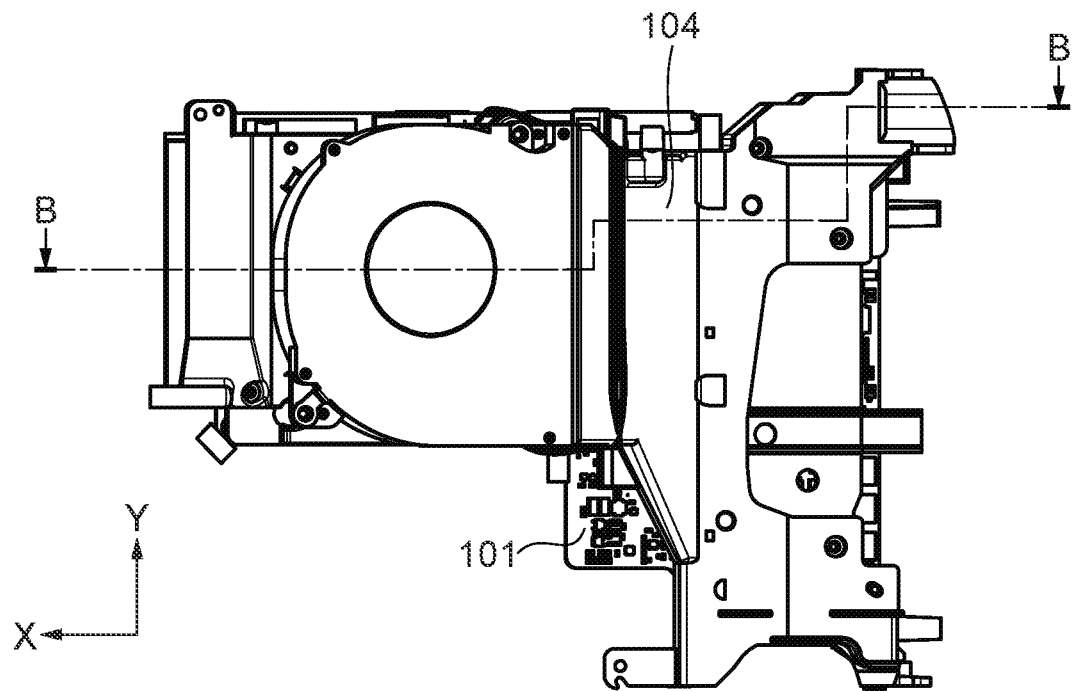
FIG. 8A and FIG. 8B are views describing a thermal connection between the main duct and a main circuit board.
Figure 8B:
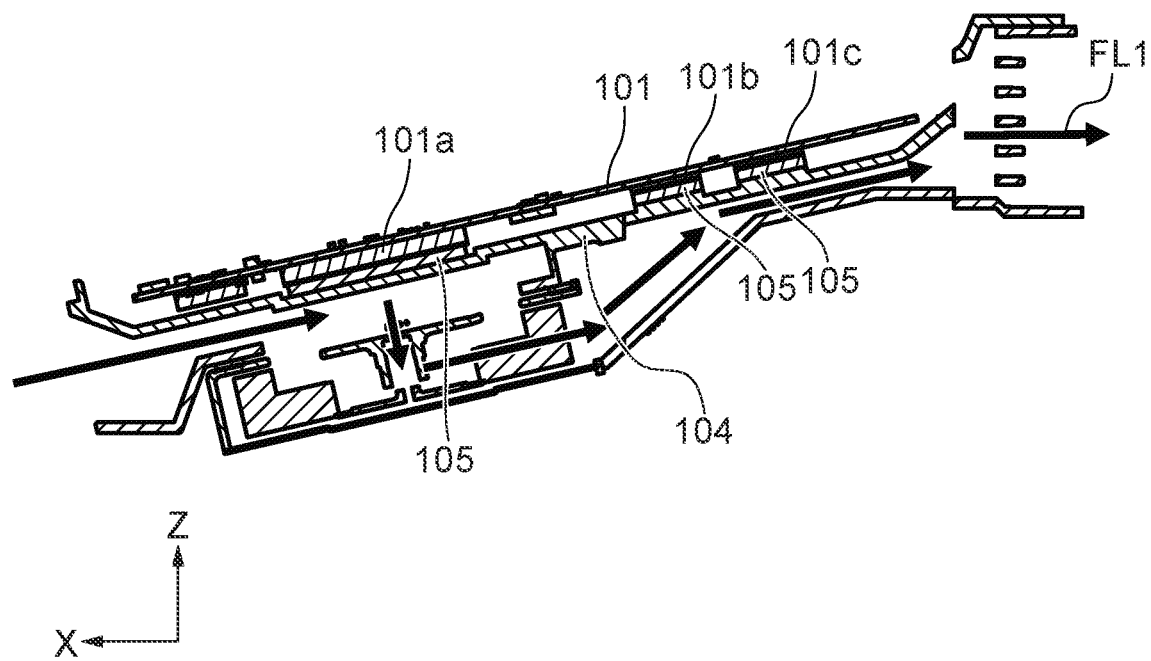

FIG. 8A and FIG. 8B are views describing a thermal connection between the main duct 104 and the main circuit board 101. Specifically, FIG. 8A is a back view showing the positional relationship between the main duct 104 and the main circuit board 101. FIG. 8B is a sectional view taken along a line B-B shown in FIG. 8A.

A first heat generating element 101a, a second heat generating element 101b, and a third heat generating element 101c are implemented in the main circuit board 101. These heat generating elements are thermally connected to the main duct 104 through the heat dissipation rubber 105. Thereby, since the heat is exchanged between the main duct 104 and the air, the first heat generating element 101a, the second heat generating element 101b, and the third heat generating element 101c can be cooled. It should be noted that the number of the heat generating elements implemented in the main circuit board 101 may not be restricted to three, may be less or more.

Figure 9A:
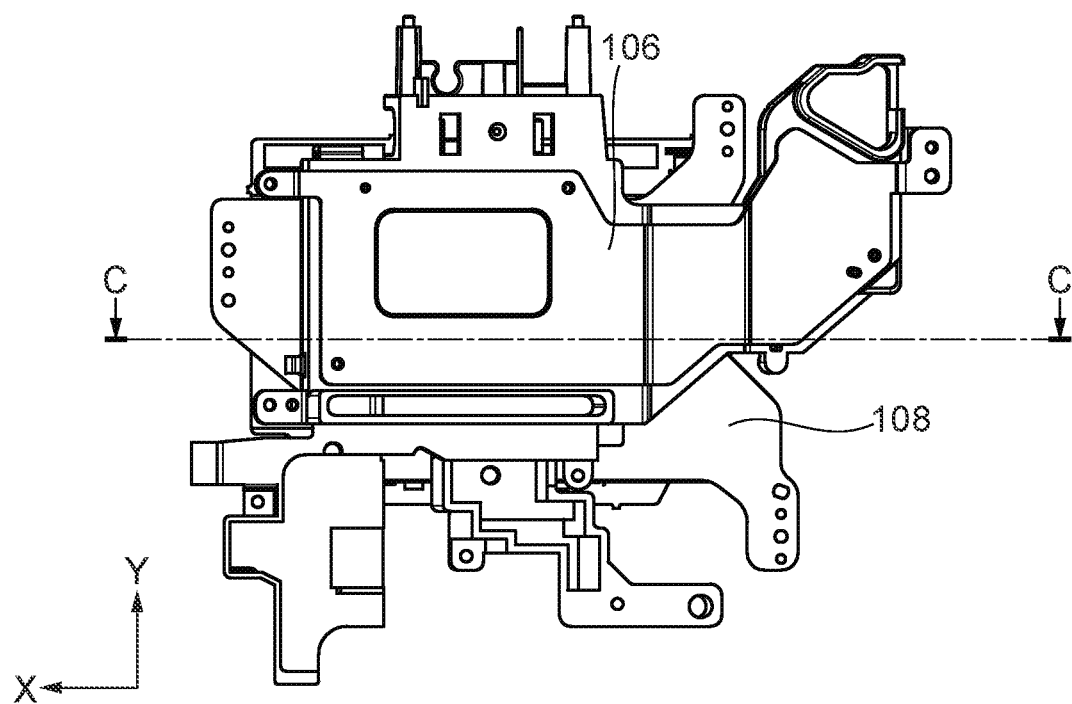
FIG. 9A and FIG. 9B are views describing a thermal connection between the sensor duct and a sensor unit.
Figure 9B:
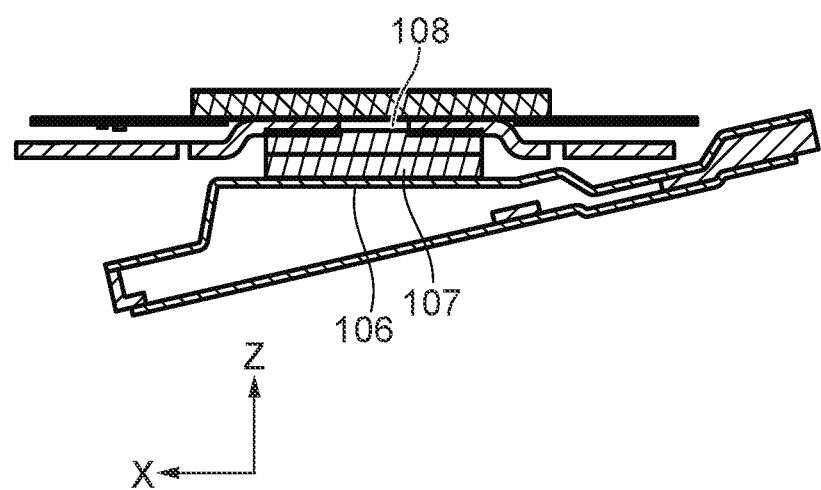

FIG. 9A and FIG. 9B are views describing a thermal connection between the sensor duct 106 and the sensor unit 108. Specifically, FIG. 9A is a back view showing the positional relationship between the sensor duct 106 and the sensor unit 108. FIG. 9B is a sectional view taken along a line C-C shown in FIG. 9A. The heat generated in the sensor unit 108 is conducted to the sensor duct 106 through the sensor heat dissipation member 107 that has high thermal conductivity. Thereby, the sensor unit 108 can be cooled by exchanging the heat between the sensor duct 106 and the air.

As mentioned above, the main duct 104 and the sensor duct 106 perform the cooling function as heat sinks. When focusing on the positional relationship with the cooling fan 102, the sensor duct 106 as a sensor heat sink that cools the sensor unit 108 is provided in the exhaust side of the cooling fan 102 as shown by the airflow shown in FIG. 7B in this embodiment. Moreover, as shown in FIG. 4B, the main duct 104 as a main-control-substrate heat sink that cools the main circuit board 101 is provided in the inlet side and exhaust side of the cooling fan 102.

However, the embodiment is not limited to the structure where the heat sink is arranged at the exhaust side of the cooling fan 102 and the main-control-substrate heat sink is arranged in the inlet side and exhaust side. The main-control-substrate heat sink may be arranged in the inlet side only or the exhaust side only. Moreover, the sensor heat sink and the main-control-substrate heat sink may be arranged in the inlet side of the cooling fan 102.

Figure 10A:
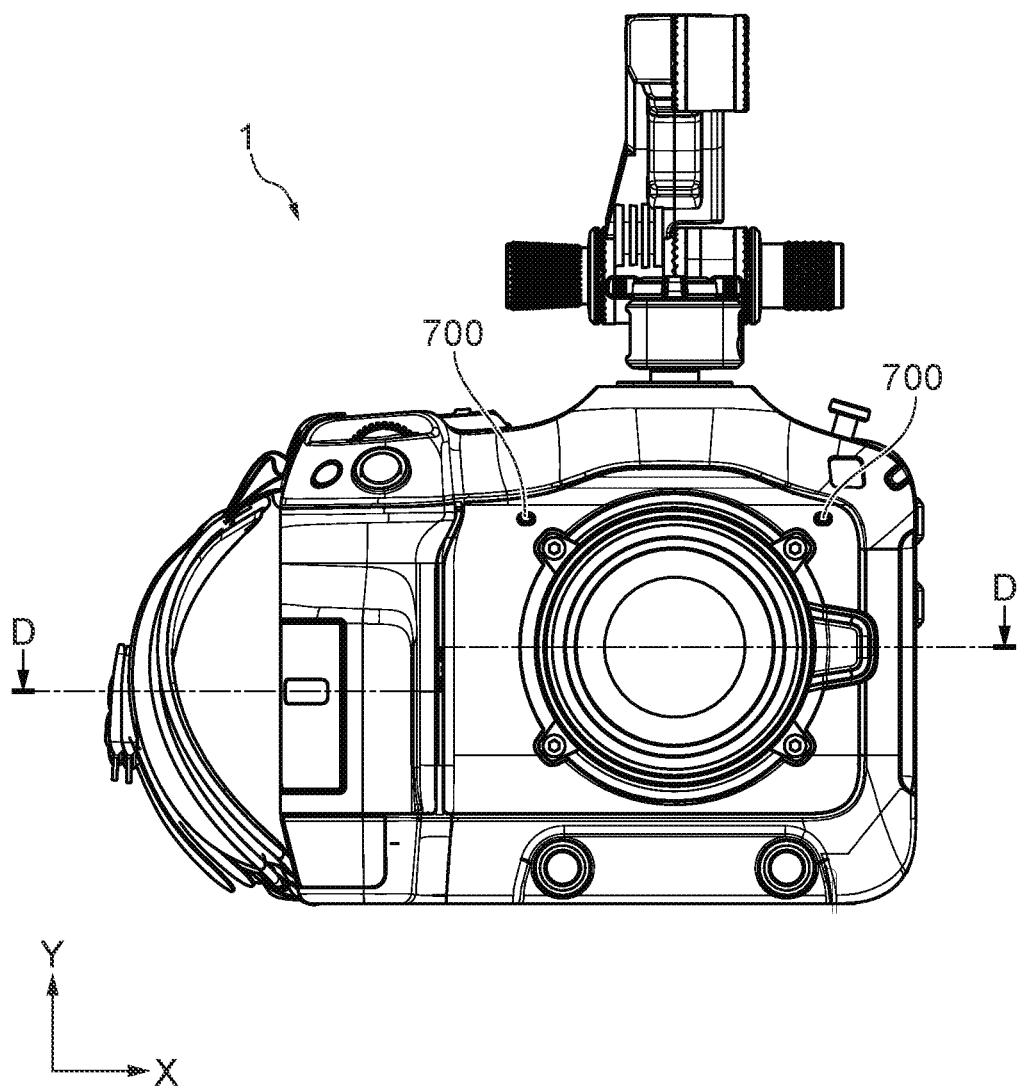
FIG. 10A is a front view showing the image pickup apparatus.
Figure 10B:
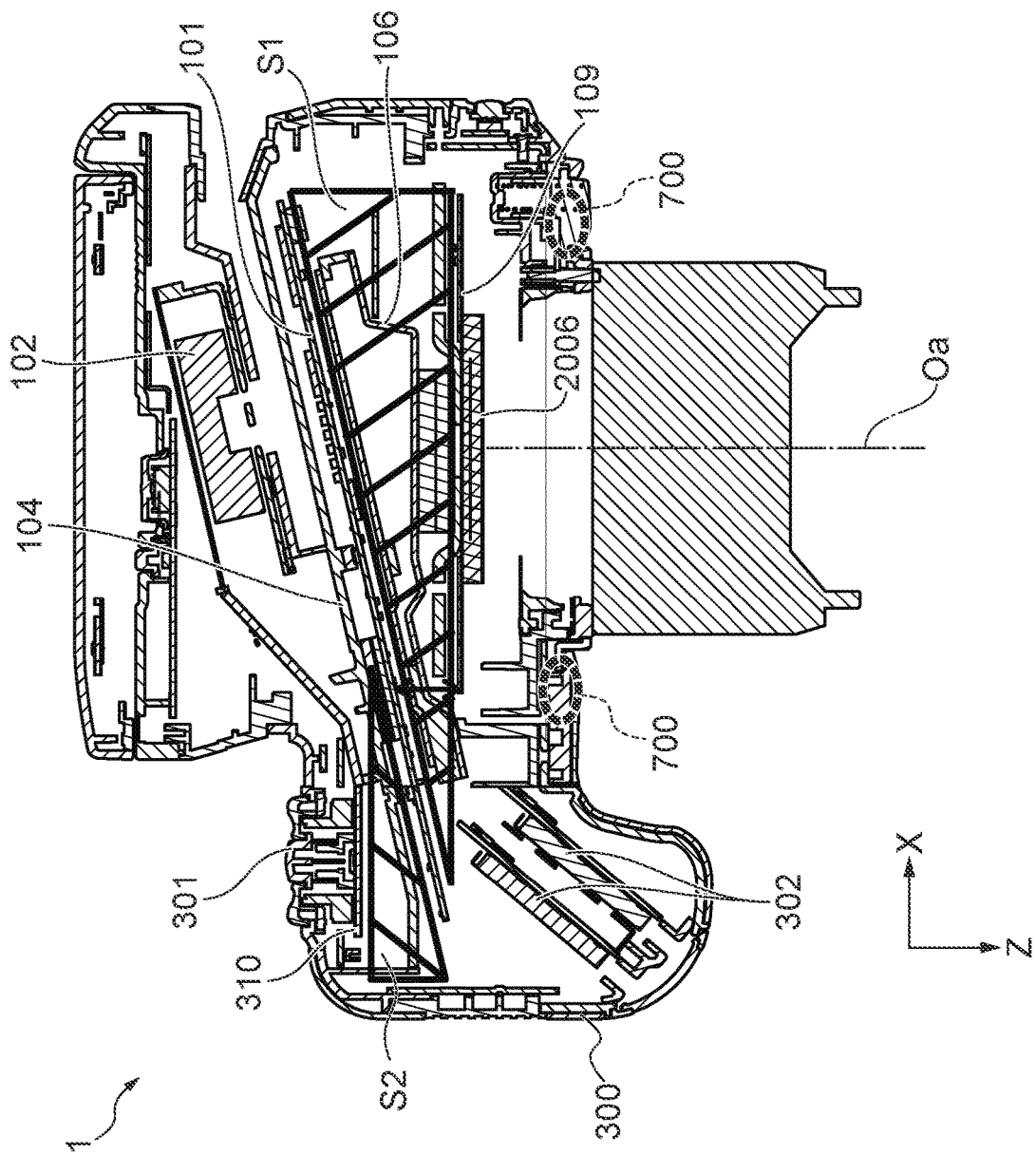
FIG. 10B is a first sectional view showing the image pickup apparatus taken along the line D-D in FIG. 10A.
Figure 10C:
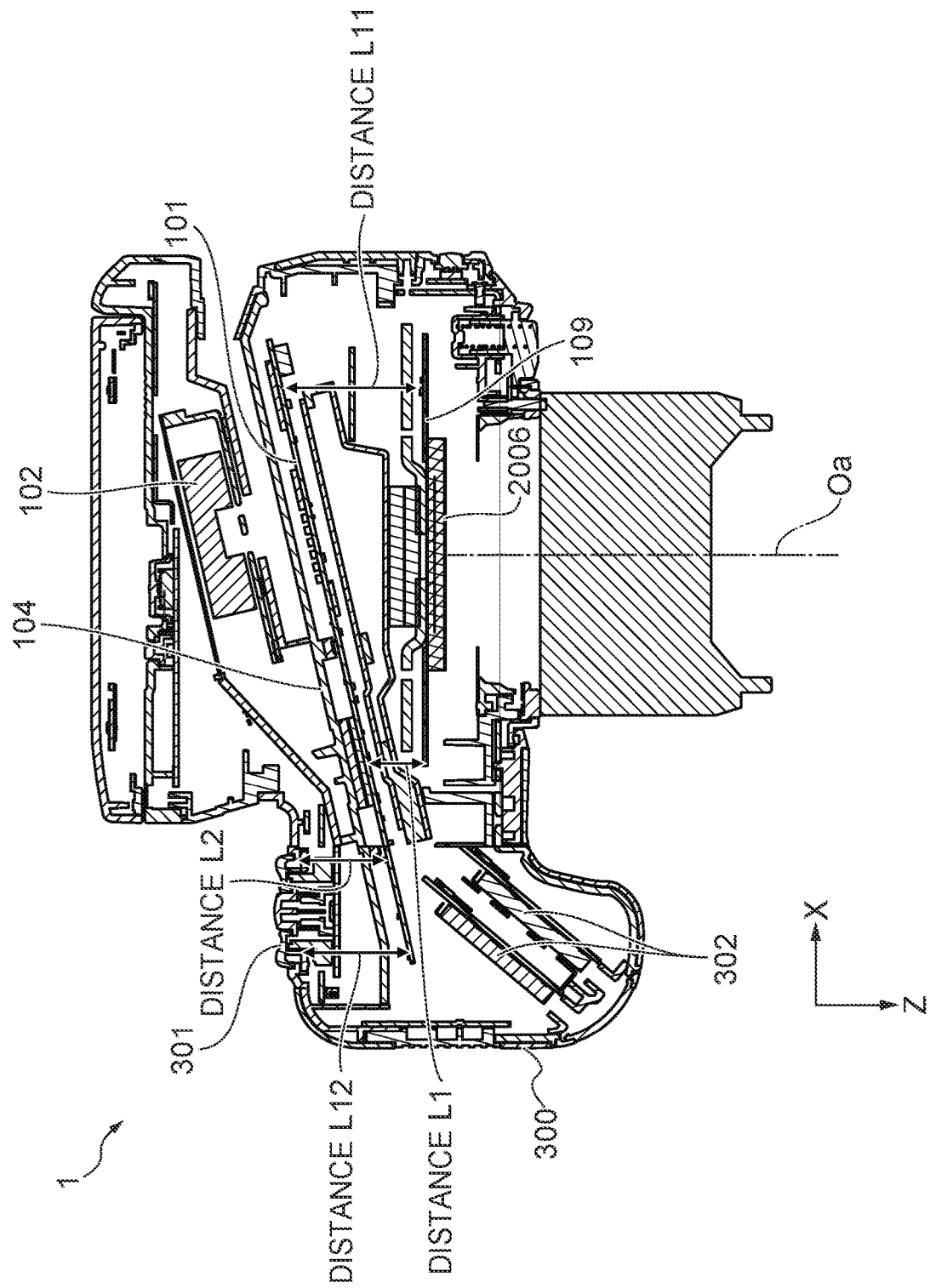
FIG. 10C is a second sectional view showing the image pickup apparatus taken along the line D-D in FIG. 10A.

Next, an inner layout of the image pickup apparatus 1 will be described. FIG. 10A is a front view showing the image pickup apparatus 1. FIG. 10B and FIG. 10C are sectional views taken along a line D-D shown in FIG. 10A. FIG. 10B is a view describing a relation between the layout of the main circuit board 101 and sensor substrate 109 and the sensor duct 106. FIG. 10C is a view describing the influence of the heat that is generated by the main circuit board 101 on vicinities of the main circuit board 101.

It is necessary to arrange the sensor substrate 109 so that the image pickup surface of the implemented image sensor 2006 will perpendicularly intersect with an optical axis Oa. There is no such restriction in the main circuit board 101. Accordingly, in the image pickup apparatus 1, the main circuit board 101 is aslant arranged to the optical axis Oa (not to intersect perpendicularly) so that a space part Si having an approximately triangle cross section will be provided between the sensor substrate 109 and the main circuit board 101. An efficient arrangement of the sensor duct 106 and efficient waste heat become available by arranging the sensor duct 106 to the space part Si formed in this way.

If the main circuit board 101 is provided in parallel to the sensor substrate 109, the distance between both substrates is constant in the distance L1 in FIG. 10C, for example. Against this, in the image pickup apparatus 1, since the main circuit board 101 is aslant arranged, the distance L11 becomes longer than the distance L1 at a certain position, which reduces the heat conducted to the sensor substrate 109 from the main circuit board 101 as compared with the case where both substrates are arranged in parallel. Accordingly, occurrence of an image abnormality due to the heat conducted from the main circuit board 101 to the sensor substrate 109 can be reduced, which addresses one of the thermal issues related to the specification of the image pickup apparatus 1.

Moreover, the distance between the grip operating member 301 of the grip unit 300 and the main circuit board 101 is L2 shown in FIG. 10C in a case where the main circuit board 101 is arranged in approximately parallel to the sensor substrate 109. Against this, in the image pickup apparatus 1, since the main circuit board 101 is aslant arranged, the distance L12 becomes longer than the distance L2 at a certain position, which reduces the heat conducted to the grip operating member 301 from the main circuit board 101 because the both become distant. That is, since the temperature rise of the grip operating member 301 is reduced, unpleasant feeling of a user who operates the grip operating member 301 can be reduced or abolished.

Figure 11A:
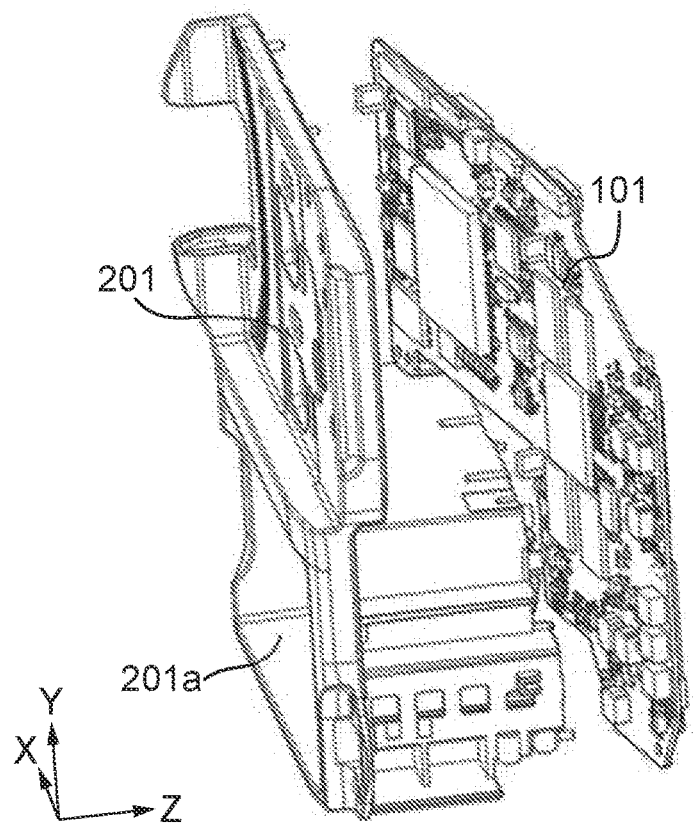
FIG. 11A is a perspective view showing a positional relationship between a rear cover and the main circuit board in the image pickup apparatus.
Figure 11B:
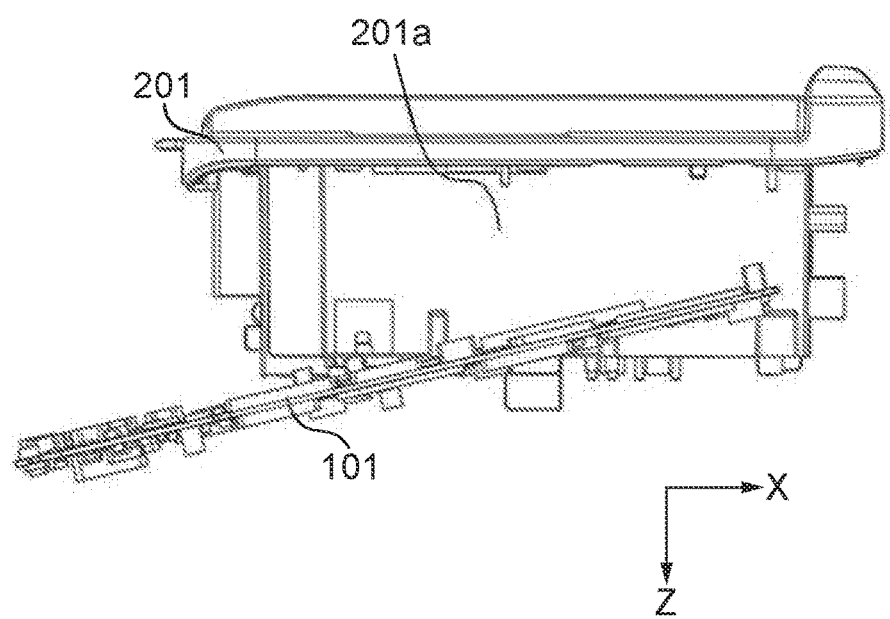
FIG. 11B is a top view showing the positional relationship between the rear cover and the main circuit board in the image pickup apparatus.
Figure 12A:
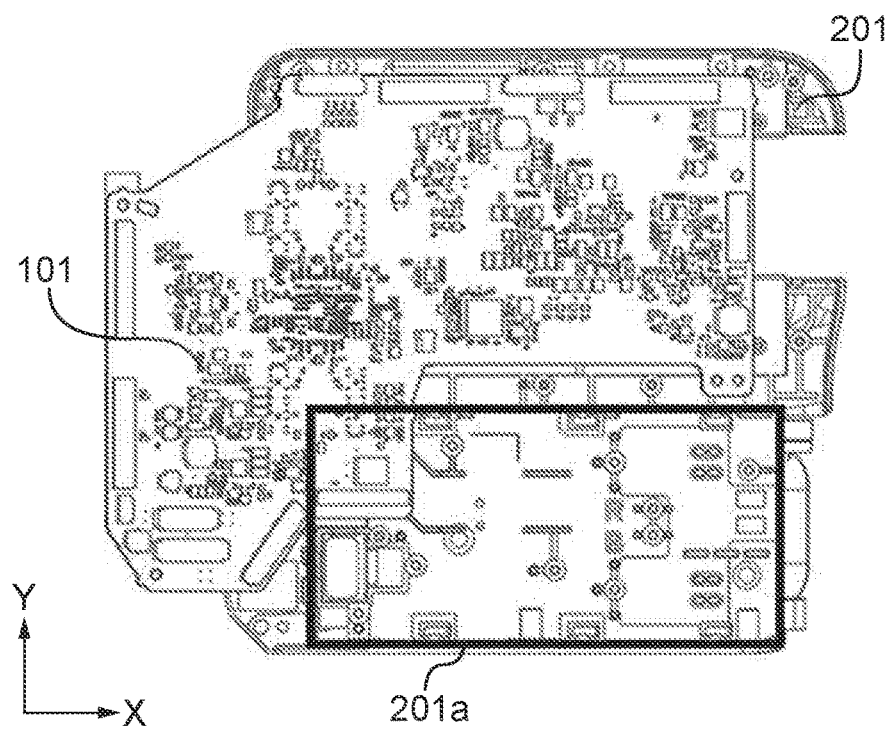
FIG. 12A is a front view showing a positional relationship between a battery chamber provided in the rear cover and the main circuit board in the image pickup apparatus.
Figure 12B:
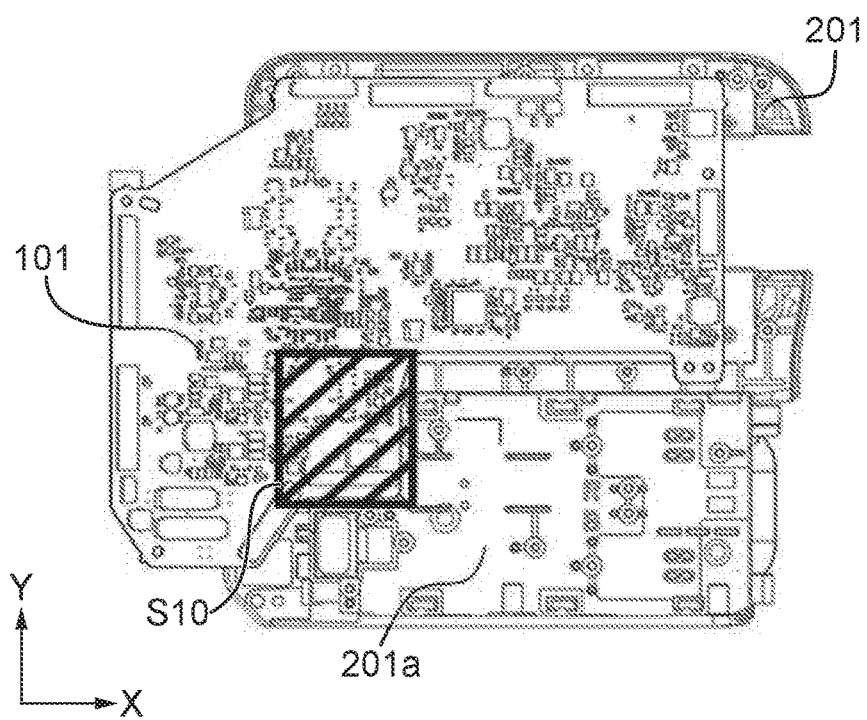
FIG. 12B is a view describing an effect obtained by arranging the main circuit board aslant to an optical axis.

FIG. 11A is a perspective view showing the positional relationship between the rear cover 201 and the main circuit board 101. FIG. 11B is a top plan (view seen from the +Y side) showing the positional relationship between the rear cover 201 and the main circuit board 101. FIG. 12A is a front view showing the positional relationship between the battery chamber 201a of the rear cover 201 and the main circuit board 101. FIG. 12B is a view describing an effect obtained by arranging the main circuit board 101 aslant to the optical axis Oa.

As shown in FIG. 12A, a part of the main circuit board 101 overlaps with the battery chamber 201a on a plane of projection in the optical axis direction. Accordingly, if the main circuit board 101 is not arranged aslant against the present embodiment, it becomes necessary to cut the main circuit board 101 in an interaction region S10 shown in FIG. 12B so that the main circuit board 101 may not interfere with the battery chamber 201a.

Against this, in the image pickup apparatus 1, the main circuit board 101 is aslant arranged to the optical axis Oa as shown in FIG. 10B and FIG. 10C. Accordingly, since it is unnecessary to cut the main circuit board 101 in the interaction region S10 that avoids the battery chamber 201a of the rear cover 201, the substrate area can be increased, which enables expansion of the functions of the image pickup apparatus 1.

As shown in FIG. 10B, in the image pickup apparatus 1, the main duct 104 is aslant arranged to the optical axis Oa. Then, the cooling fan 102 is arranged in a space part of which the cross section is approximately triangle formed by the product contour and the main duct 104. Since the cooling fan 102 is arranged in the space part of which the cross section is approximately triangle, the cooling fan 102 can be arranged without enlarging the product contour in the width direction.

Moreover, since the cooling fan 102 is arranged in that position, the distance from the sensor substrate 109 and microphone unit 700, which is located in the front face of the image pickup apparatus 1, to the cooling fan 102 across the main duct 104 can be long. Since this reduces influence of noise of the cooling fan 102 on the sensor substrate 109 and the microphone unit 700, high imaging quality and high voice quality can be obtained.

As shown in FIG. 10B and FIG. 10C, the grip unit 300 provides recording medium slots 302 that accommodate recording media that store photographed image data, captured video data, audio data, etc. in the image pickup apparatus 1. The recording medium slots 302 are aslant arranged to the optical axis Oa. This enables to arrange the recording medium slots 302 into the grip unit 300 without enlarging the contour of the grip unit 300.

Figure 13A:
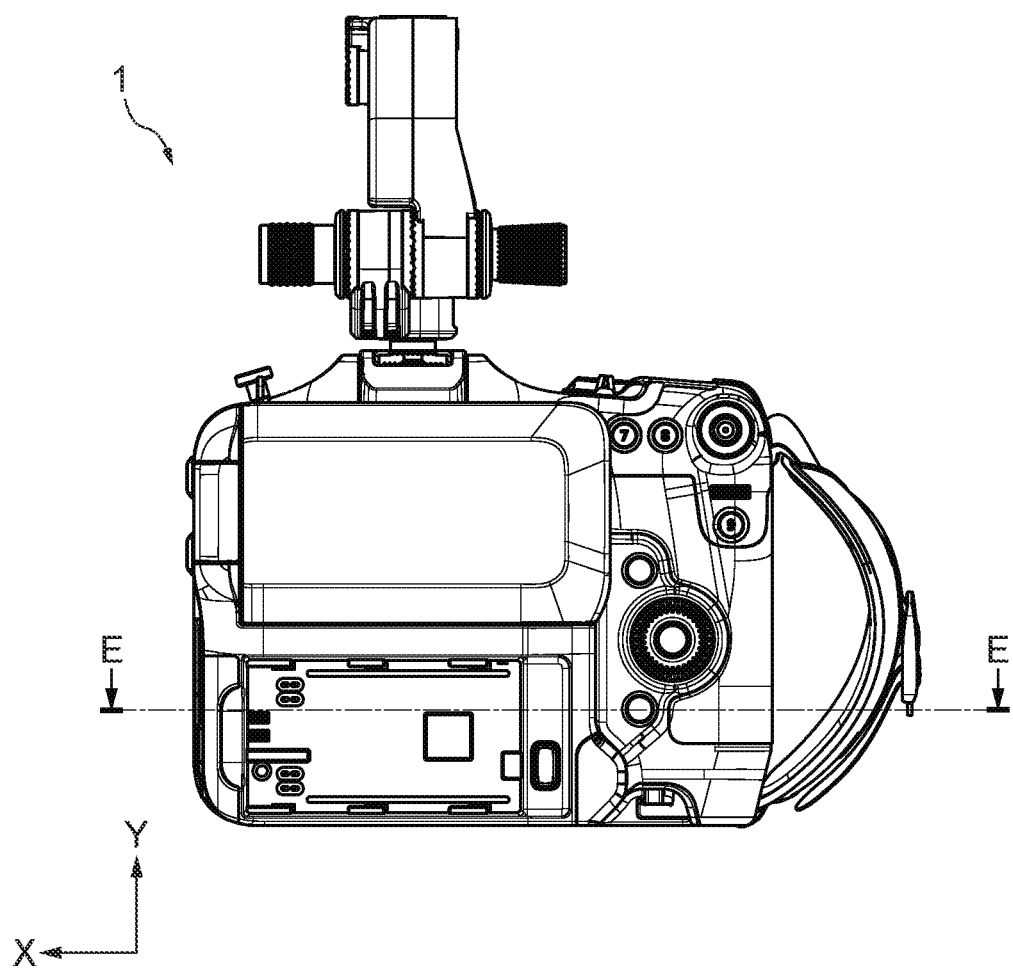
FIG. 13A is a back view showing the image pickup apparatus.
Figure 13B:
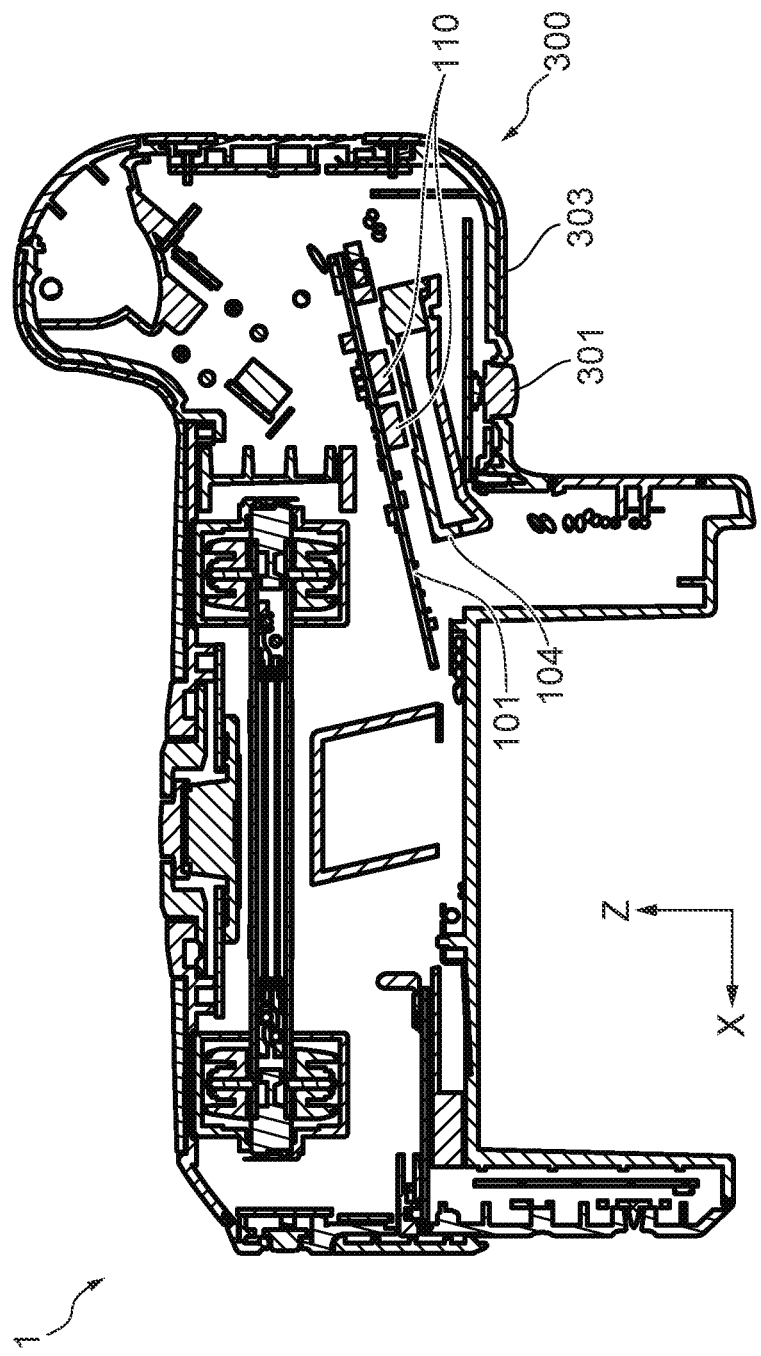
FIG. 13B is a sectional view showing the image pickup apparatus taken along a line E-E in FIG. 13A.

Next, a heat insulation effect by the main duct 104 will be described. FIG. 13A is a back view showing the image pickup apparatus 1. FIG. 13B is a sectional view taken along a line E-E in FIG. 13A. FIG. 13B shows the positional relationship among the main circuit board 101, the main duct 104, the grip operating member 301 of the grip unit 300, and a grip exterior member 303. The heat generating element 110 is implemented in the main circuit board 101.

If the heat generated by the heat generating element 110 implemented in the main circuit board 101 is conducted to the grip operating member 301 or the grip exterior member 303, a user will feel uncomfortable when touching the grip operating member 301 or the grip exterior member 303. In order to avoid this, in the image pickup apparatus 1, the main duct 104 is arranged between the heat generating element 110 and the grip operating member 301 and grip exterior member 303. That is, the conduction of the heat generated by the heat generating element 110 to the grip operating member 301 and the grip exterior member 303 is interrupted by the main duct 104. In this way, since the temperature rise of the grip operating member 301 and the grip exterior member 303 can be reduced, a user does not feel uncomfortable.

Figure 14A:
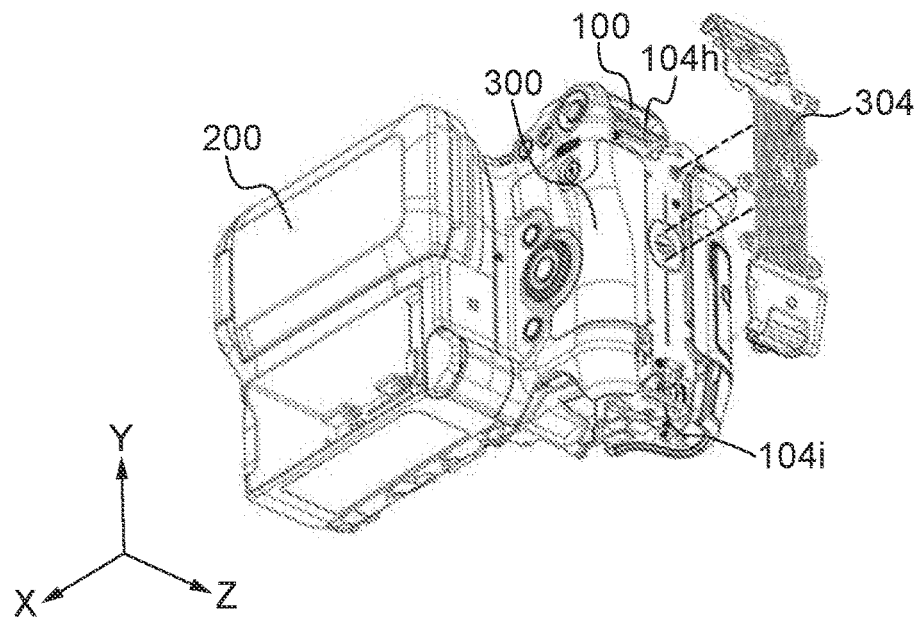
FIG. 14A is an exploded perspective view describing an attachment of an L cover in the image pickup apparatus.
Figure 14B:
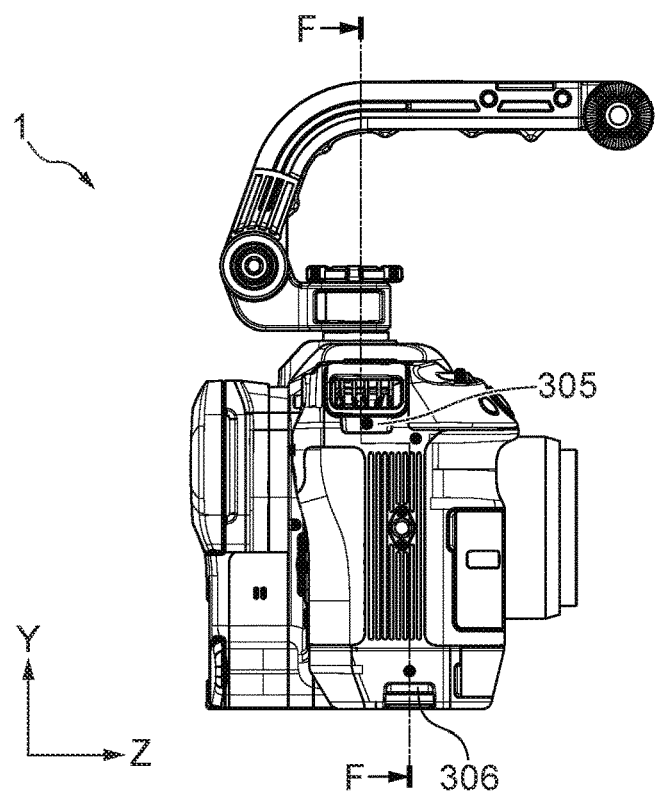
FIG. 14B is a left side view showing the image pickup apparatus.
Figure 15B:
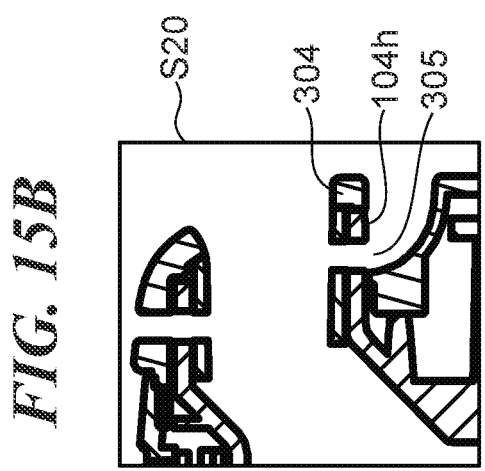
FIG. 15A, FIG. 15B, and FIG. 15C are sectional views showing the image pickup apparatus taken along a line F-F in FIG. 14B.
Figure 15C:
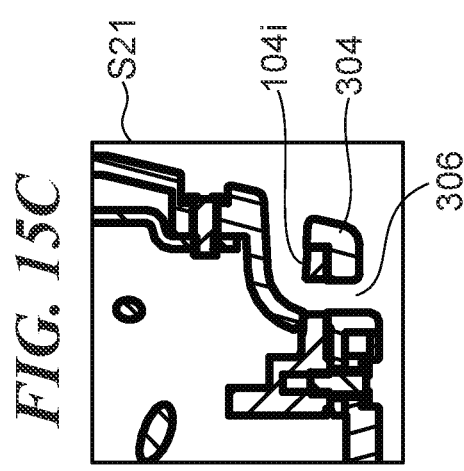
Figure 15A:
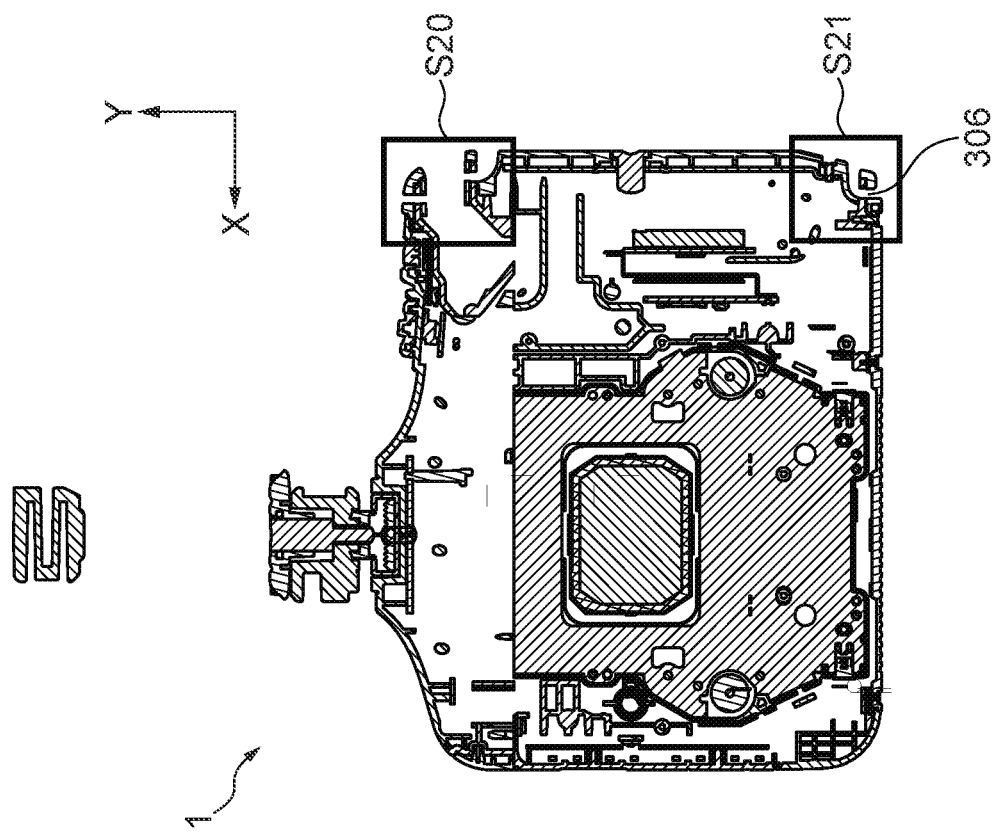

FIG. 14A is an exploded perspective view describing attachment of an L cover 304 in the image pickup apparatus 1. FIG. 14B is a left side view of the image pickup apparatus 1. FIG. 15A, FIG. 15B, and FIG. 15C are sectional views showing the image pickup apparatus 1 taken along a line F-F in FIG. 14B. FIG. 15A is an entire sectional view, FIG. 15B is an enlarged view of an area S20 in FIG. 15A, and FIG. 15C is an enlarged view of an area S21 in FIG. 15A.

The grip unit 300 is provided with the L cover 304. As shown in FIG. 14B, FIG. 15B, and FIG. 15C, a first grip-belt through hole 305 and a second grip-belt through hole 306 are provided in the grip unit 300. These grip-belt through holes are formed by not only the L cover 304 but also a first main duct grip ring 104h and a second main duct grip ring 104i that are formed as parts of the main duct 104.

Since the main duct 104 is made from metal in consideration of thermal conductivity as mentioned above, its mechanical strength is large. Accordingly, since the strength of the first main duct grip ring 104h and second main duct grip ring 104i is also large, it is unnecessary to form the grip rings using other high-strength components. Accordingly, the number of components can be reduced, and the configuration equipped with the high-strength grip rings can be achieved without enlarging the image pickup apparatus 1.

Next, the configuration of the ND unit 1000 will be described. The ND unit 1000 contains four optical filters 1001a, 1001b, 1001c, and 1001d of which optical densities differ in this embodiment. The user can adjust an amount of light entering into the image sensor 2006 by switching a state of each of the four optical filters 1001a through 1001d between a state where a filter is inserted into a beam passing area 1002 and a state where a filter is retracted from the beam passing area 1002.

Figure 16:
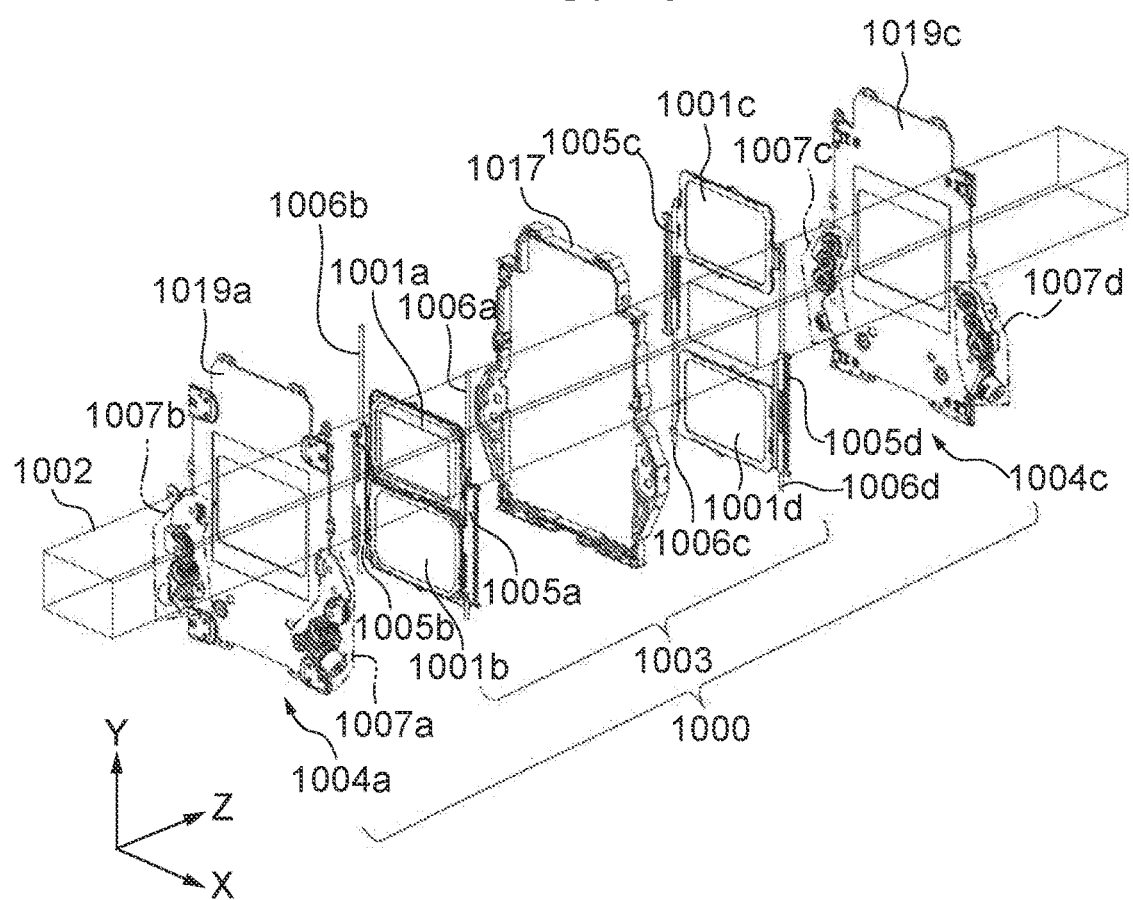
FIG. 16 is an exploded perspective view showing an ND unit in the image pickup apparatus.

FIG. 16 is an exploded perspective view showing the ND unit 1000. The ND unit 1000 is provided with a filter support unit 1003 that supports the optical filters 1001a through 1001d, two filter drive units 1004a and 1004c having drive mechanisms that move the optical filters 1001a through 1001d. In order to slim down the ND unit 1000, the four optical filters are divided into two sets each of which has two optical filters. The two sets are arranged at positions shifted in the Z direction. Two optical filters of each set are arranged in the same plane parallel to the XY plane. When one of the optical filters 1001c and 1001d is inserted into the beam passing area 1002, the other optical filter is retracted from the beam passing area 1002. Similarly, when one of the optical filters 1001a and 1001b is inserted into the beam passing area 1002, the other optical filter is retracted from the beam passing area 1002. As mentioned below, all the optical filters 1001a through 1001d can be held in the state where they are retracted from the beam passing area 1002.

The filter drive units 1004a and 1004c are arranged so as to face each other in the Z direction across the filter support unit 1003. The filter drive unit 1004a drives the optical filters 1001a and 1001b. The filter drive unit 1004c drives the optical filters 1001c and 1001d.

Figures 17A, 17B, 17C:
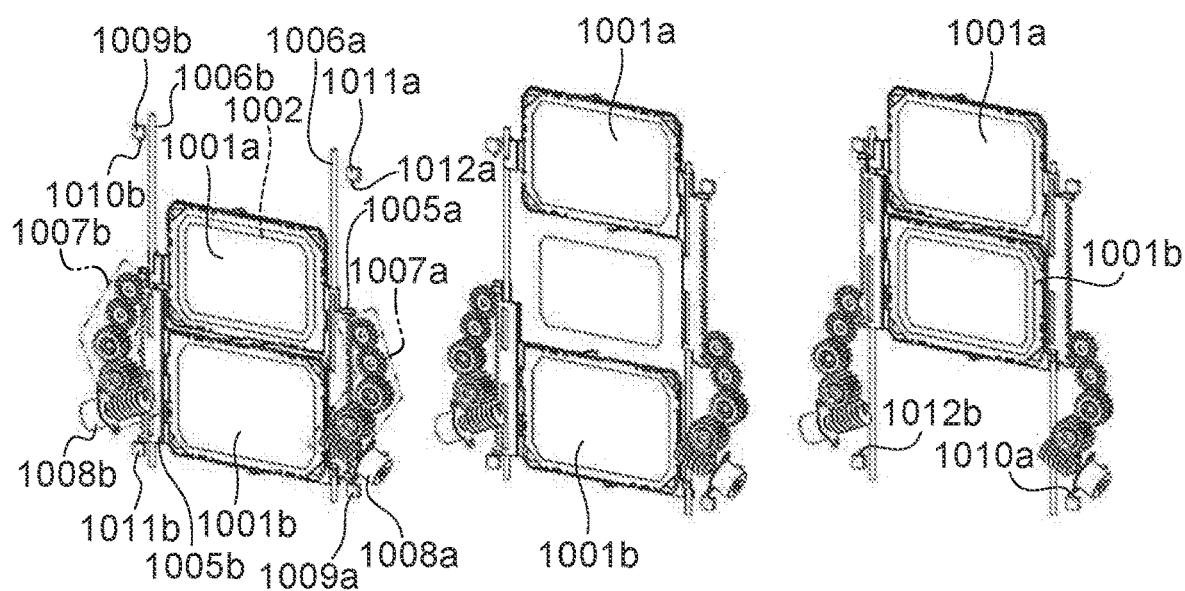
FIG. 17A, FIG. 17B, and FIG. 17C are the views describing insertion states and retraction states of optical filters of the ND unit.

FIG. 17A, FIG. 17B, and FIG. 17C are the views describing the insertion states and the retraction states of the optical filters 1001a and 1001b. The optical filters 1001a and 1001b are respectively held by filter holders 1005a and 1005b. The filter holder 1005a engages with metal-made guide shafts 1006a and 1006b extended in the Y direction. The filter holder 1005b engages with guide shafts 1006a and 1006b.

The filter holder 1005a provides a rack meshed with a drive train 1007a, which is constituted by a plurality of gears, in an engagement part to the guide shaft 1006a. When a motor 1008a is driven, driving force is transmitted to the filter holder 1005a through the drive train 1007a, and the filter holder 1005a moves in the Y direction while being guided by the guide shafts 1006a and 1006b. In this way, the insertion state, and the retraction state of the optical filter 1001a with respect to the beam passing area 1002 can be switched.

Similarly, the filter holder 1005b provides a rack meshed with a drive train 1007b, which is constituted by a plurality of gears, in an engagement part to the guide shaft 1006b. When a motor 1008b is driven, driving force is transmitted to the filter holder 1005b through the drive train 1007b, and the filter holder 1005b moves in the Y direction while being guided by the guide shafts 1006a and 1006b. In this way, the insertion state, and the retraction state of the optical filter 1001*b* with respect to the beam passing area 1002 can be switched.

In the state in FIG. 17A, the optical filter 1001*a* is in the insertion state and the optical filter 1001*b* is in the retraction state. In the state in FIG. 17B, both the optical filters 1001*a* and 1001*b* are in the retraction state. In the state in FIG. 17C, the optical filter 1001*b* is in the insertion state and the optical filter 1001*a* is in the retraction state.

The ND unit 1000 is provided with a detection unit that detects whether each of the optical filters 1001*a* through 1001*d* is in the insertion state or the retraction state with respect to the beam passing area 1002. The detection unit employs a mechanical detection unit that detects movement of a detection lever rather than an optical detection unit like a photo coupler in consideration of optical influence on the incident beam through the lens 3.

For example, as shown in FIG. 17A, an insertion detection switch 1009*a* that detects the insertion state of the optical filter 1001*a* into the beam passing area 1002 and a retraction detection switch 1011*a* that detects the retraction state are arranged in the filter drive unit 1004*a*. The insertion detection switch 1009*a* and the retraction detection switch 1011*a* are arranged in the positions that face each other in the moving direction of the optical filter 1001*a* across the beam passing area 1002. When the optical filter 1001*a* is in the insertion state, the filter holder 1005*a* presses an insertion detection lever 1010*a* (FIG. 17C) of the insertion detection switch 1009*a*. When the optical filter 1001*a* is in the retraction state, the filter holder 1005*a* presses a retraction detection lever 1012*a* of the retraction detection switch 1011*a*.

Similarly, an insertion detection switch 1009*b* that detects the insertion state of the optical filter 1001*b* into the beam passing area 1002 and a retraction detection switch 1011*b* that detects the retraction state are arranged in the filter drive unit 1004*a*. The insertion detection switch 1009*b* and the retraction detection switch 1011*b* are arranged in the positions that face each other in the moving direction of the optical filter 1001*b* across the beam passing area 1002. When the optical filter 1001*b* is in the insertion state, the filter holder 1005*b* presses an insertion detection lever 1010*b* (FIG. 17A) of the insertion detection switch 1009*b*. When the optical filter 1001*b* is in the retraction state, the filter holder 1005*b* presses a retraction detection lever 1012*b* (FIG. 17C) of the retraction detection switch 1011*b*.

Figure 18:
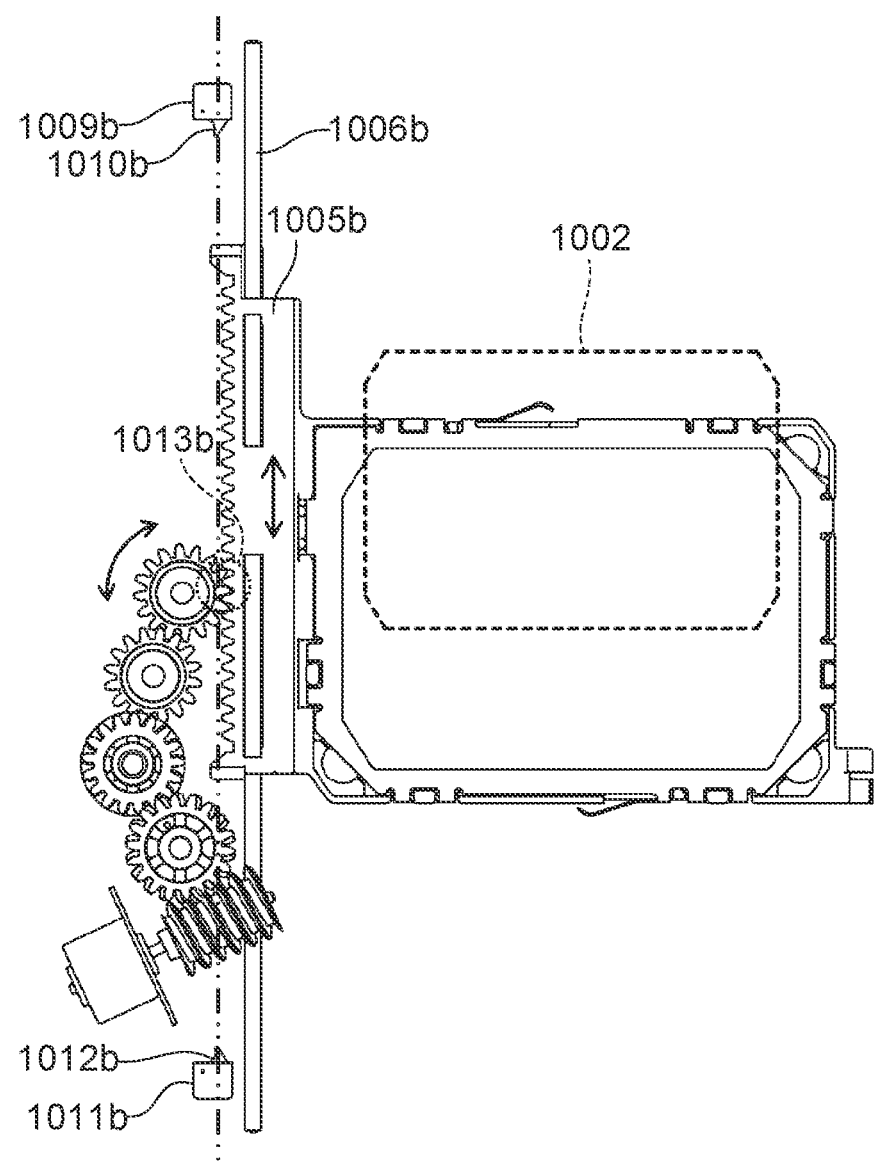
FIG. 18 is a front view showing a positional relationship between an engagement part of a filter holder in the ND unit, a drive train, and a detection switch.

FIG. 18 is a front view describing arrangements of an engagement part 1013*b* of the filter holder 1005*b*, the drive train 1007*b*, the insertion detection switch 1009*b*, and the retraction detection switch 1011*b*. The insertion detection lever 1010*b* and the retraction detection lever 1012*b* are arranged so as to align on a straight line parallel to the moving direction of the optical filter 1001*b*. Moreover, the position where the filter holder 1005*b* receives the driving force from the drive train 1007*b* and the position where the filter holder 1005*b* receives reaction force from the insertion detection lever 1010*b* when the filter holder 1005*b* presses the insertion detection lever 1010*b* are almost aligned on a straight line. This prevents inclination of the filter holder 1005*b* even when the filter holder 1005*b* presses the insertion detection lever 1010*b* or the retraction detection lever 1012*b*. As a result, increase in dynamic resistance and occurrence of operation failure due to a wrench of the filter holder 1005*b* to the guide shafts 1006*a* and 1006*b* that may occur because the filter holder 1005*b* inclines can be reduced.

Since the drive mechanisms of the filter holders 1005*a*, 1005*c*, and 1005*d* other than the filter holder 1005*b* conform to the drive mechanism of the filter holder 1005*b*, their descriptions are omitted. Moreover, the optical filters 1001*c* and 1001*d* can be switched between the insertion state and the retraction state as with the optical filters 1001*a* and 1001*b*. Moreover, the detection method of the insertion state and retraction state of the optical filters 1001*c* and 1001*d* is the same as the detection method of the insertion state and the retraction state of the optical filters 1001*a* and 1001*b*. Accordingly, descriptions about operations and state detections of the optical filters 1001*c* and 1001*d* are omitted.

When the insertion states and retraction states with respect to the beam passing area 1002 are switched by moving the filter holders 1005*a*, 1005*b*, 1005*c*, and 1005*d* respectively holding the optical filters 1001*a*, 1001*b*, 1001*c*, and 1001*d*, there is a fear that static electricity occurred during the moving operations charges the optical filters 1001*a* through 1001*d* and dust in air easily adheres. Here, the ND unit 1000 is provided with an electrically discharging structure for preventing electrification of the optical filters 1001*a* through 1001*d*. The electrically discharging structure will be described as follows.

Figure 19B:
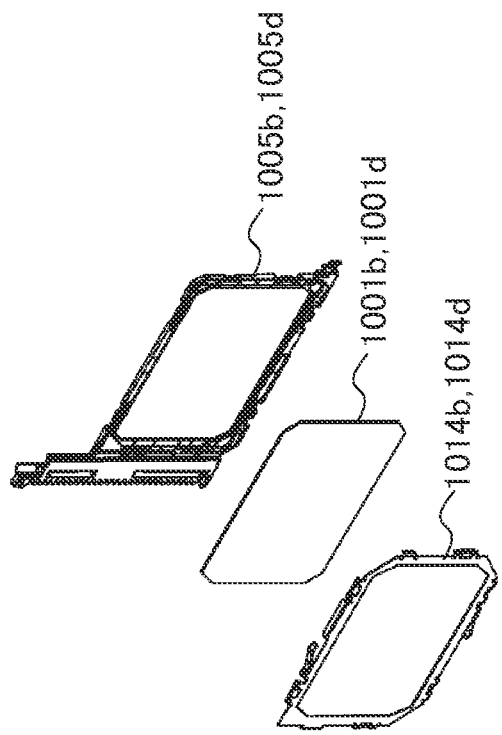
FIG. 19A and FIG. 19B are views showing a simplified configuration of a filter support unit in the ND unit.
Figure 19A:
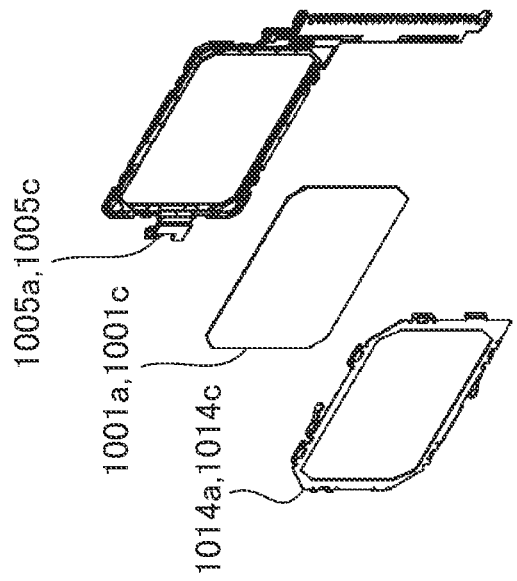

FIG. 19A and FIG. 19B are exploded perspective views simplifying and showing the configuration of the ND unit 1000. For example, the optical filter 1001*a* is put and held between a metal filter cover 1014*a* and the filter holder 1005*a* that is made from conductive resin. The optical filters 1001*b*, 1001*c*, and 1001*d* are also held between the metal filter covers 1014*b*, 1014*c*, and 1014*d* and the filter holders 1005*b*, 1005*c*, and 1005*d*.

Figure 20A:
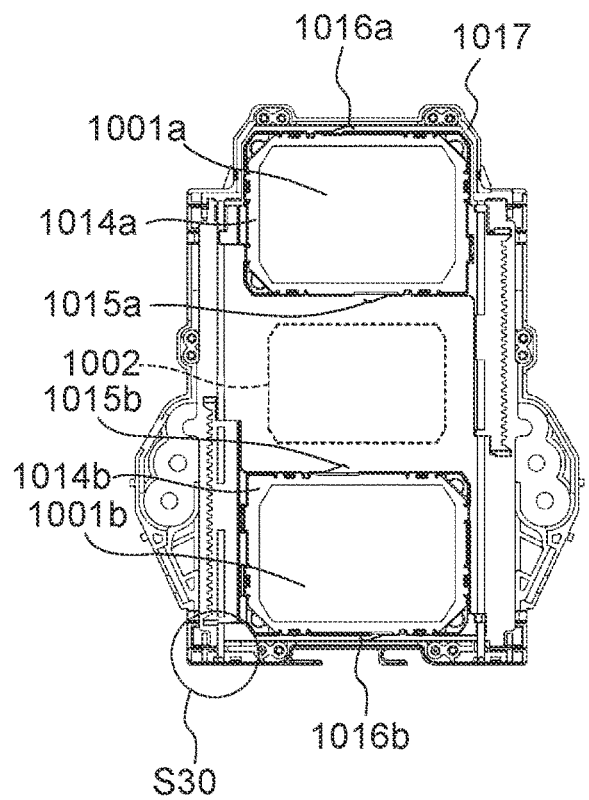
FIG. 20A and FIG. 20B are front views showing the configuration of the ND unit.
Figure 20B:
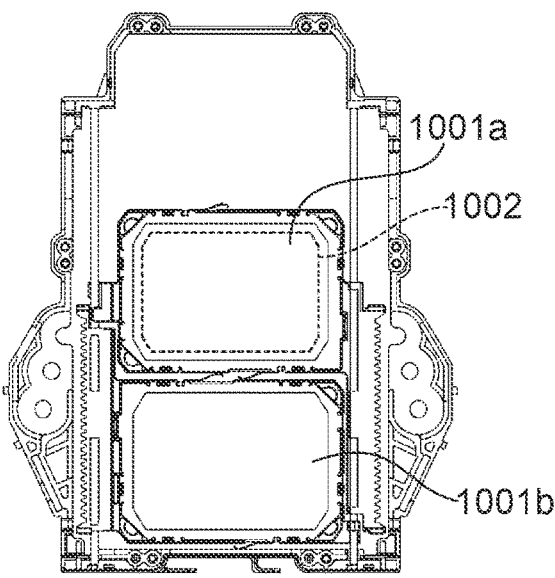
Figure 20C:
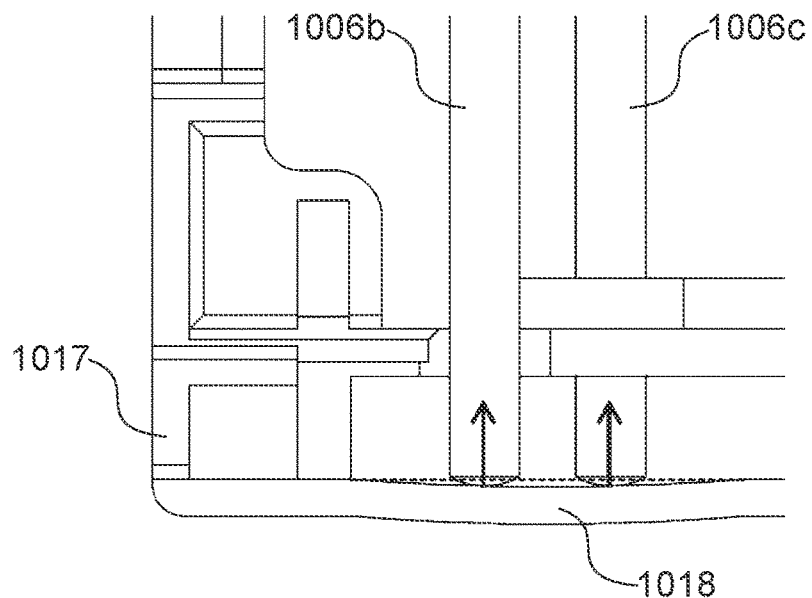
FIG. 20C is an enlarged view in an area S30 in FIG. 20A.

FIG. 20A and FIG. 20B are front views showing the ND unit 1000. FIG. 20A shows the retraction state of the optical filters 1001*a* and 1001*b*. FIG. 20B shows the insertion state of the optical filter 1001*a*. FIG. 20C is an enlarged view of the area S30 in FIG. 20A.

The filter cover 1014*a* has elastic parts 1015*a* and 1016*a*, and the filter cover 1014*b* has elastic parts 1015*b* and 1016*b*. For example, when the optical filters 1001*a* and 1001*b* are in the retraction state as shown in FIG. 20A, the elastic parts 1016*a* and 1016*b* abut to an ND frame 1017 that is made from conductive resin. The ND frame 1017 is a frame body of the filter support unit 1003 and is connected (grounded) to the camera body 2. Moreover, when the optical filter 1001*a* is in the insertion state as shown in FIG. 20B, the elastic part 1016*b* of the filter cover 1014*b* abuts to the ND frame 1017, and the filter cover 1014*a* abuts to the filter cover 1014*b*. That is, even when the optical filter 1001*a* is in the insertion state, the filter cover 1014*a* is grounded to the ND frame 1017 through the filter cover 1014*b*.

In this way, the filter holder 1005*a* is electrically connected to the ND frame 1017 in both the insertion state and retraction state with respect to the beam passing area 1002 and is grounded to the camera body 2 so that the electricity will be removed. Accordingly, electrification of the optical filter 1001*a* held by the filter holder 1005*a* can be prevented, and adhesion of dust to the optical filter 1001*a* can be reduced. Since such a configuration is common to the optical filters 1001*b* through 1001*d*, their descriptions are omitted.

If the guide shafts 1006*a* and 1006*b* have shakiness in an axial direction, the guide shafts 1006*a* and 1006*b* may move with movements of the filter holders 1005*a* and 1005*b* in the axial direction. If the guide shafts 1006*a* and 1006*b* moves in the axial direction, those shaft ends will collide with the ND frame 1017 that supports the guide shafts 1006*a* and 1006*b*, and collision sound (ambient noise) will occur.

In order to avoid occurrence of this, the filter support unit 1003 is configured to provide an elastic part 1018 in a part that supports the shaft ends of the guide shafts 1006a through 1006d in the ND frame 1017 as shown in FIG. 20C. It should be noted that FIG. 20C shows the guide shafts 1006a and 1006b but omits showing the guide shafts 1006c and 1006d. When the guide shafts 1006a through 1006d are attached to the ND frame 1017, the elastic part 1018 deforms elastically and gives the guide shafts 1006a through 1006d the elastic force (energization force) in the axial direction, which can prevent the shakiness's and can reduce occurrence of the ambient noise.

Figure 21:
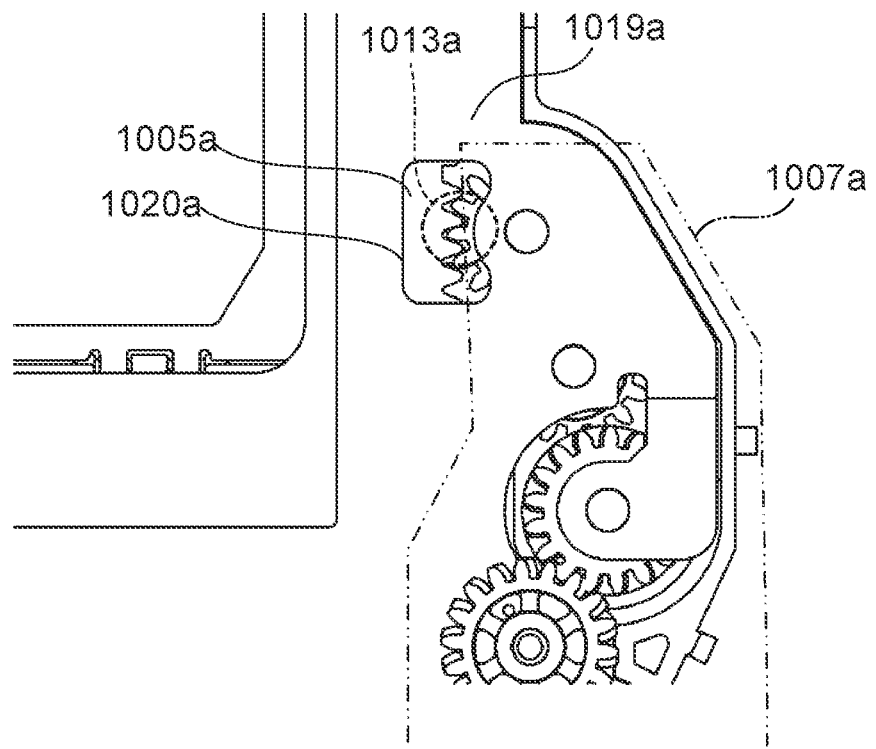
FIG. 21 is a partial enlargement view showing a filter drive unit in the ND unit.

In the ND unit 1000, the filter support unit 1003 and the filter drive unit 1004a and 1004c are assembled so that the filter holders 1005a through 1005d will be respectively engaged with the drive trains 1007a, 1007b, 1007c, and 1007d. In that time, respective engagement points (1013a in FIGS. 21 and 1013b in FIG. 18, for example) of the filter holders 1005a through 1005d come inside drive-train supporting plates 1019a and 1019c (FIG. 16) that support the drive trains 1007a through 1007d.

Accordingly, since the engagement points of the filter holders 1005a through 1005d with the drive trains 1007a through 1007d are covered with the drive-train supporting plates 1019a and 1019c, the engagement points cannot be seen when no countermeasure is taken. Accordingly, in the filter drive unit 1004a, for example, a check hole 1020a is provided in the drive-train supporting plate 1019a at a position that overlaps with the engagement part 1013a when viewed in the optical axis direction as enlarged and shown in FIG. 21 in this embodiment. As a result of this, a worker can visually check whether the drive engagement at the engagement point 1013a is normal through the check hole 1020a, an action defect due to the engagement defect at the engagement point 1013a, and deformation or breakage of components due to improper assembly are prevented. Check holes corresponding to the drive trains 1007b through 1007d are provided in the drive-train supporting plates 1019a and 1019c similarly.

Figure 22:
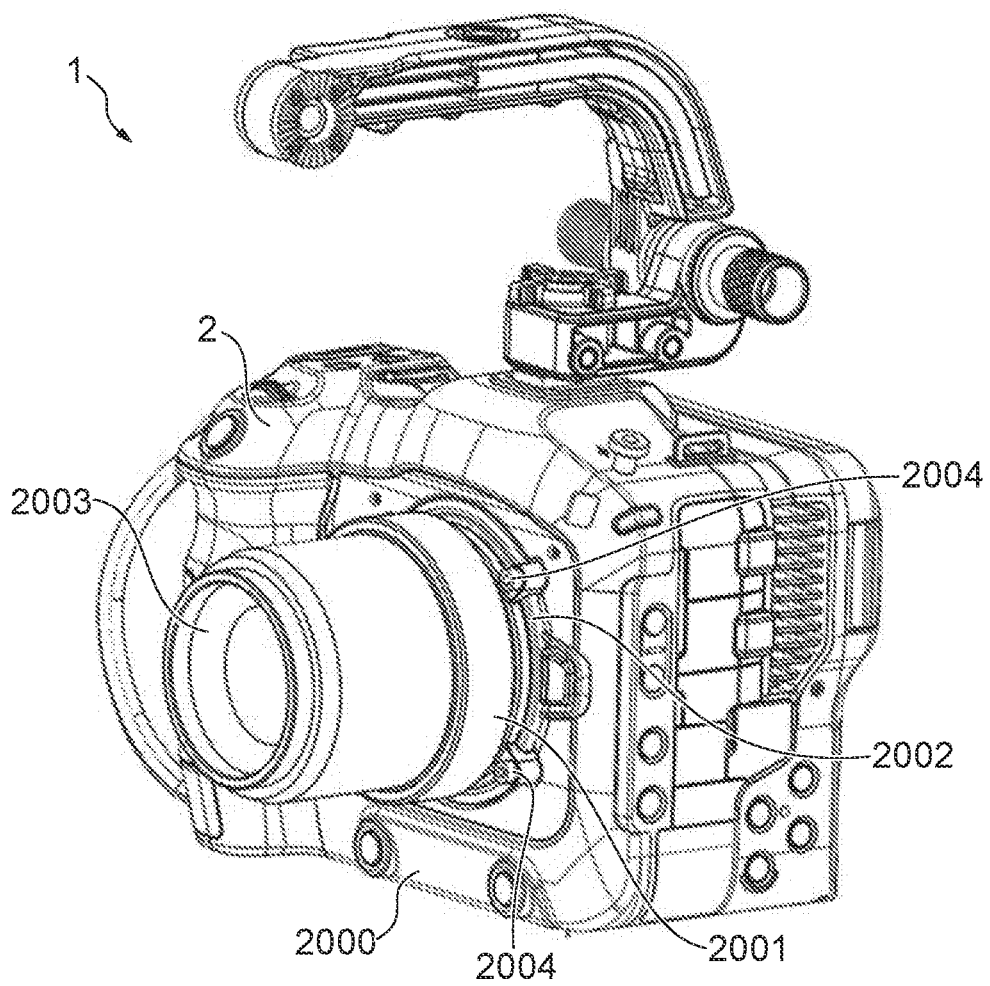
FIG. 22 is an external perspective view showing the image pickup apparatus in a state where a mount adapter is attached.

Next, the configuration of the mount adapter 2001 will be described. FIG. 22 is an external perspective view showing the image pickup apparatus 1 in a state where a lens 2003 is attached through the mount adapter 2001. A camera mount of the lens 2003 is not directly connectable with a lens interchangeable mount 2002 (hereinafter referred to as a "mount 2002") provided in the F unit 2000. In this case, the mount adapter 2001 equipped with a lens interchangeable mount that suits the camera mount of the lens 2003 is attached to the mount 2002 of the camera body 2, and the lens 2003 is attached to the mount adapter 2001. Thereby, the user of the camera body 2 can use the lens 2003.

Figure 23:
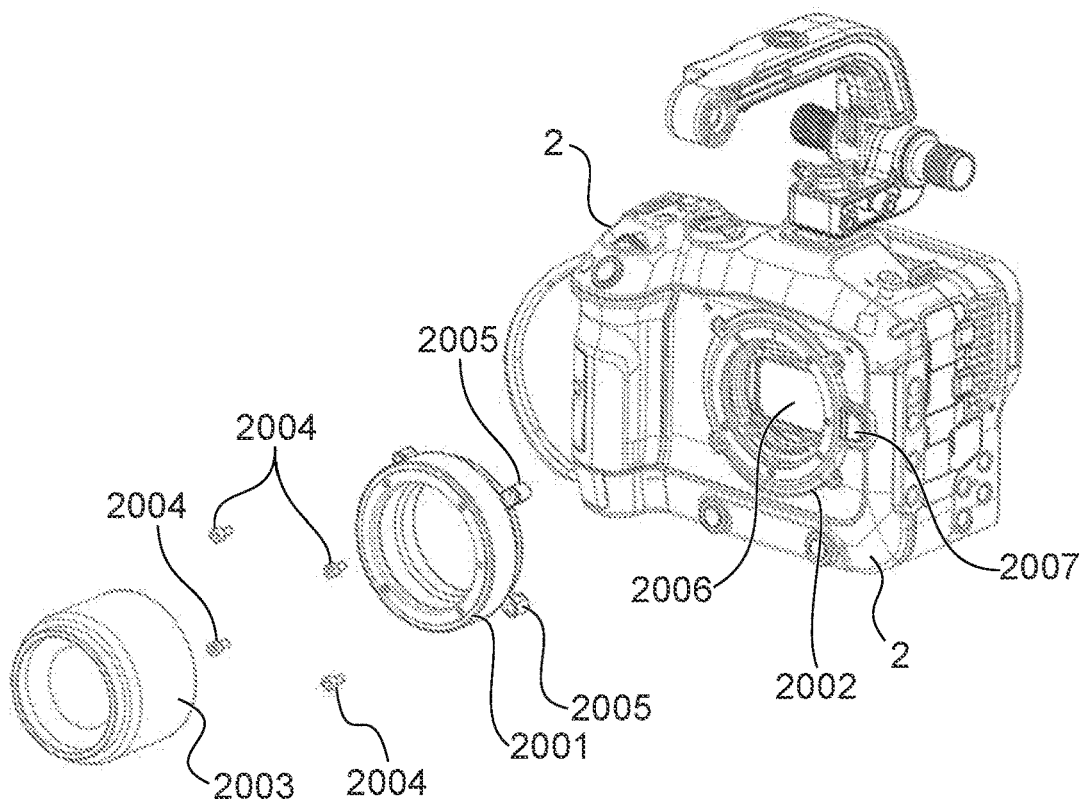
FIG. 23 is a perspective view showing a state where a lens and the mount adapter are detached from a camera body of the image pickup apparatus in FIG. 22.

FIG. 23 is a perspective view showing a state where the mount adapter 2001 and the lens 2003 are detached from the camera body 2. Fixing flanges 2005 are provided in the mount adapter 2001, and screw stop parts (mount fixing parts), which correspond to the fixing flanges 2005, are provided around the mount 2002 of the camera body 2 at four places that are symmetrical in vertical and horizontal directions to the optical axis of the camera body 2. The mount adapter 2001 is fixed to the mount 2002 by screwing fixing screws 2004 to the mount fixing parts through the fixing flanges 2005. For example, the mount 2002 of the camera body 2 is configured to fix a lens with a bayonet system. In this case, since the mount adapter 2001 is configured to fix to the mount 2002 with the fixing screws 2004 but is not configured to be detachably attached with the bayonet system, the mount adapter 2001 is firmly fixed to the mount 2002 without causing shakiness.

Figure 24:
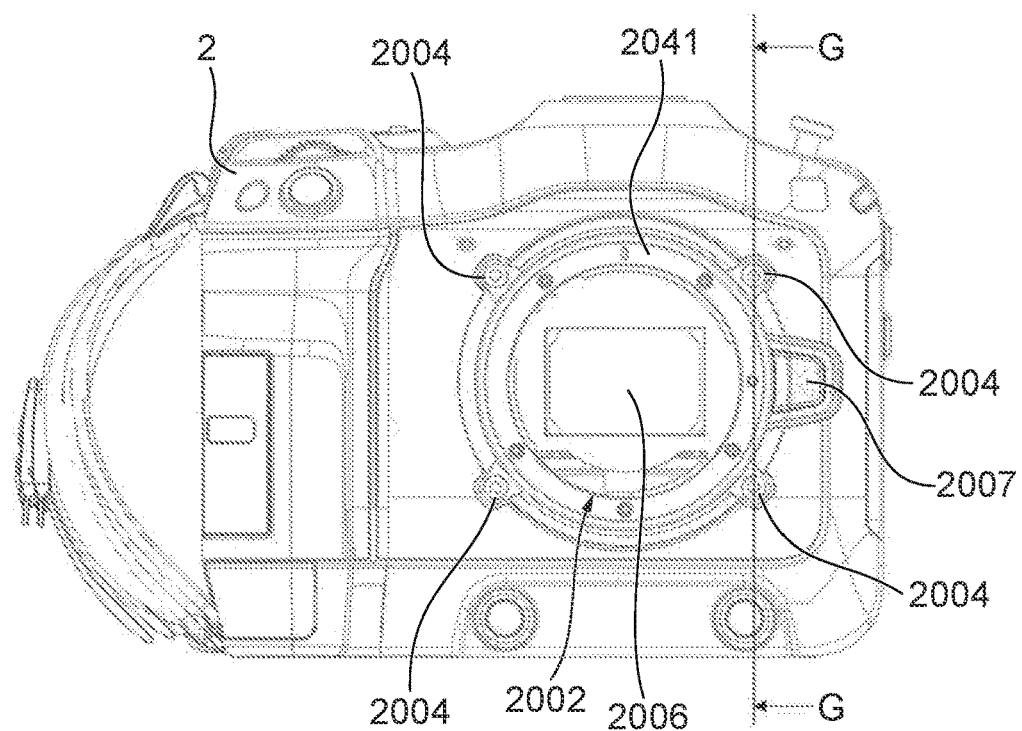
FIG. 24 is a front view showing the camera body of the image pickup apparatus.

FIG. 24 is a front view showing the camera body 2. Even when the mount adapter 2001 is not fixed to the mount 2002 of the camera body 2, the fixing screws 2004 are screwed to the screw stop parts as shown in FIG. 24. This prevents loss of the fixing screws 2004.

The image sensor 2006 is arranged nearly at the center of the mount 2002 when viewed from the front of the camera body 2. A lens release button 2007 for detaching the lens 2003 from the camera body 2 is provided around the mount 2002 at a position that does not interfere with the screw stop parts to which the fixing screws 2004 are screwed and is opposite to the grip unit 300 across the mount 2002.

Figure 25A:
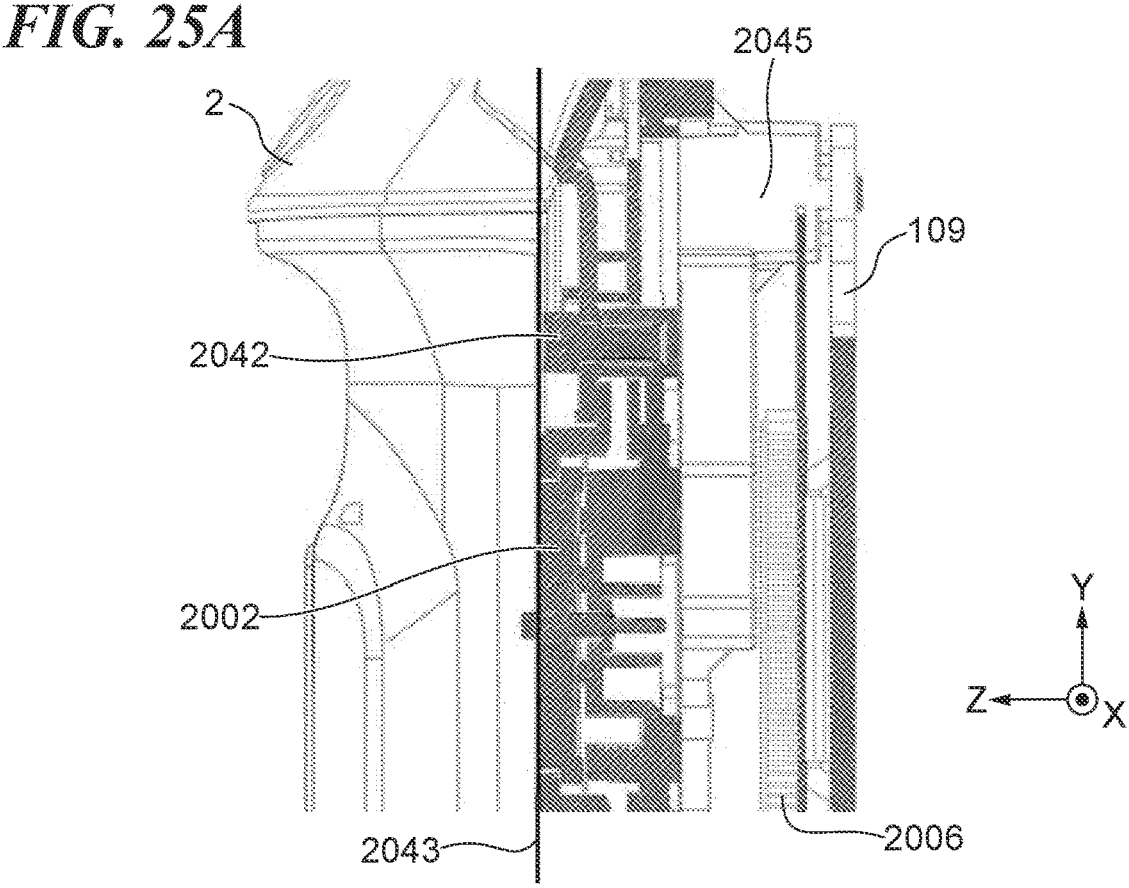
FIG. 25A and FIG. 25B are sectional views showing the camera body taken along a line G-G in FIG. 24.
Figure 25B:
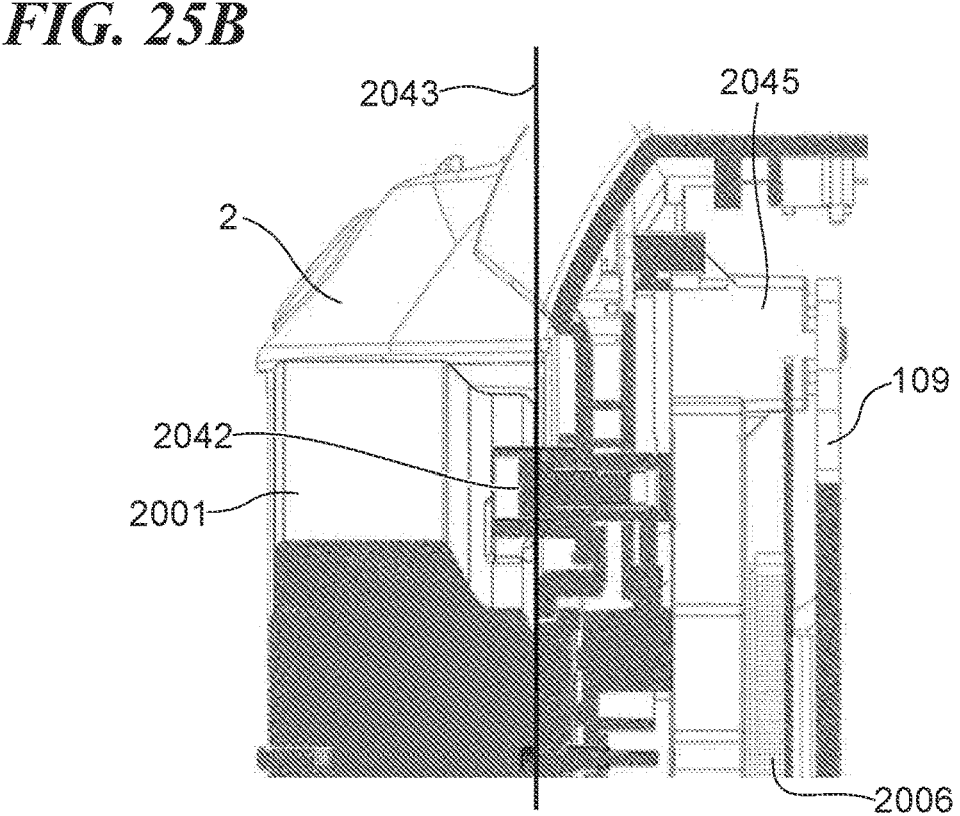

FIG. 25A and FIG. 25B are sectional views showing the camera body taken along a line G-G in FIG. 24. FIG. 25A shows a state where neither the mount adapter 2001 nor the lens 2003 is attached to the mount 2002. FIG. 25B shows a state where the mount adapter 2001 is attached. A line 2043 shown in FIG. 25A and FIG. 25B shows a position of a mount assembly surface 2041. The image sensor 2006 is arranged inside the camera body 2, and the image sensor 2006 is implemented in the sensor substrate 109. The sensor substrate 109 is fixed to a front base 2045. The mount 2002 is fixed to the front base 2045. Moreover, the screw stop parts to which the above-mentioned screws 2004 are screwed are provided in the front base 2045.

In the state of FIG. 25A where the mount adapter 2001 is not attached to the mount 2002, a head 2042 of a fixing screw 2004 is located at the side (−Z side) of the image sensor 2006 than the mount assembly surface 2041. That is, the fixing screw 2004 is not projected from the mount assembly surface 2041 to the +Z side. In the meantime, in the state of FIG. 25B where the mount adapter 2001 is attached to the mount 2002, the head 2042 of the fixing screw 2004 is located at the side (+Z side) of the mount adapter 2001 than the mount assembly surface 2041.

Thereby, when the mount adapter 2001 is not attached to the mount 2002, the fixing screw 2004 can be stored in the position that does not disturb attachment and detachment of the lens 2003.

Figure 26A:
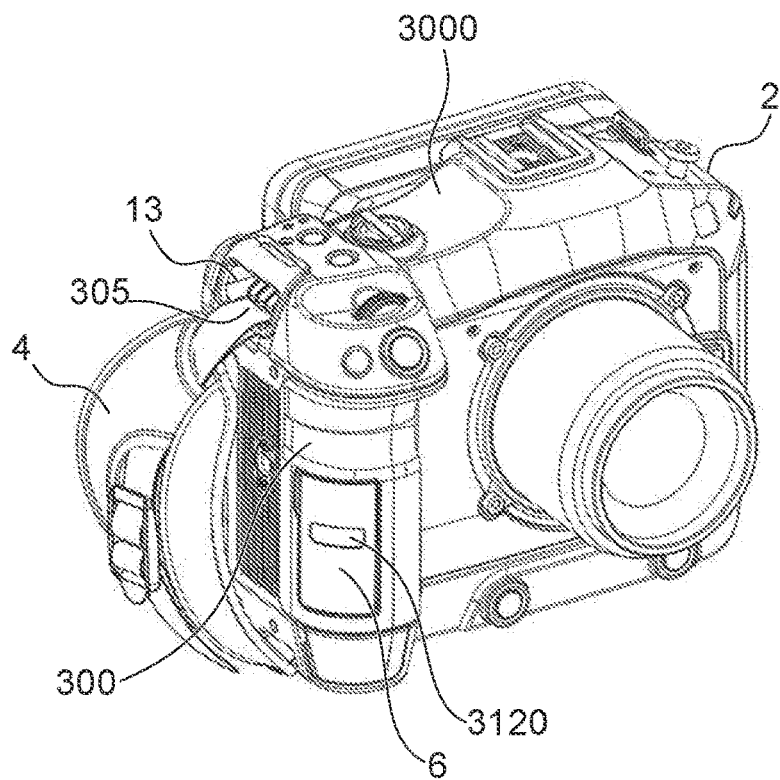
FIG. 26A and FIG. 26B are perspective views showing the image pickup apparatus viewed from a grip unit side.
Figure 26B:
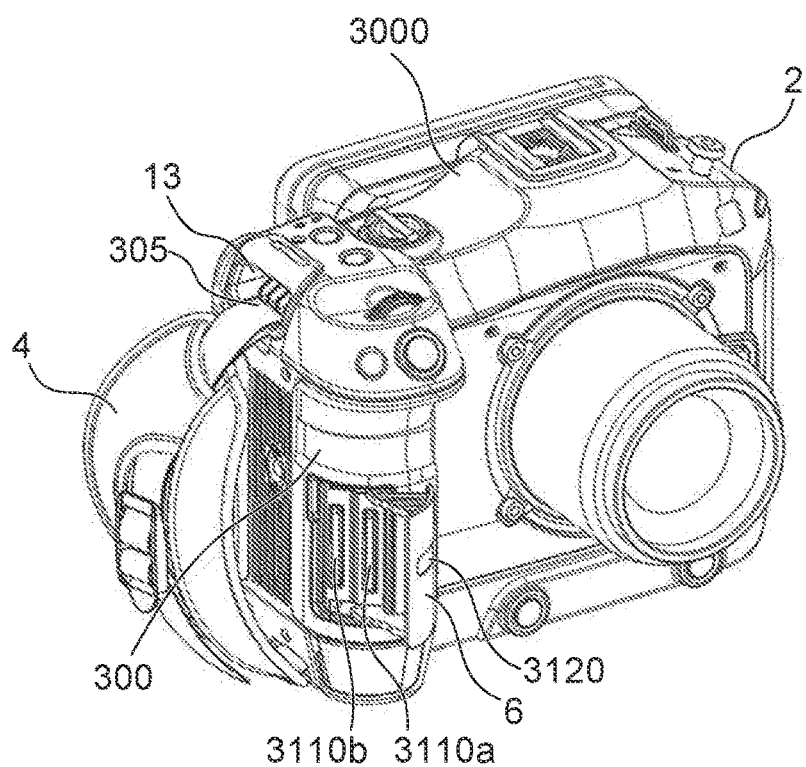

Next, the recording medium will be described. FIG. 26A and FIG. 26B are perspective views showing the image pickup apparatus 1 when viewed from the side of the grip unit 300. FIG. 26A shows a state where the medium lid 6 closed. FIG. 26B shows a state where the medium lid 6 opened. The media lid 6 is provided in the object side (+Z side) of the grip unit 300. When the medium lid 6 is opened, the two recording medium slots 302 (see FIG. 10B) provided inside appear. In a state where the media lid 6 is opened, the user can insert or extract a first recording medium 3110a and second recording medium 3110b, which store data captured by the image pickup apparatus 1, with respect to the recording medium slots 302. FIG. 26B shows a state where the first recording medium 3110a and the second recording medium 3110b are accommodated in the recording medium slots 302.

Although the image pickup apparatus 1 can accommodate two recording media including the first recording medium 3110a and the second recording medium 3110b, it is enough to accommodate one or more recording media.

Since the two recording media 3110a and 3110b are attachable, data can be simultaneously recorded to both the recording media so as to use one recording medium as backup in a case where data in the other recording medium is damaged. In addition, this makes relay recording available for enabling long-time photographing. A translucent or transparent media window 3120 is provided in the medium lid 6. Even when the medium lid 6 is closed, a user can check visually whether the recording media 3110a and 3110b are accommodated in the camera body 2 by viewing through the medium window 3120.

Figure 27:
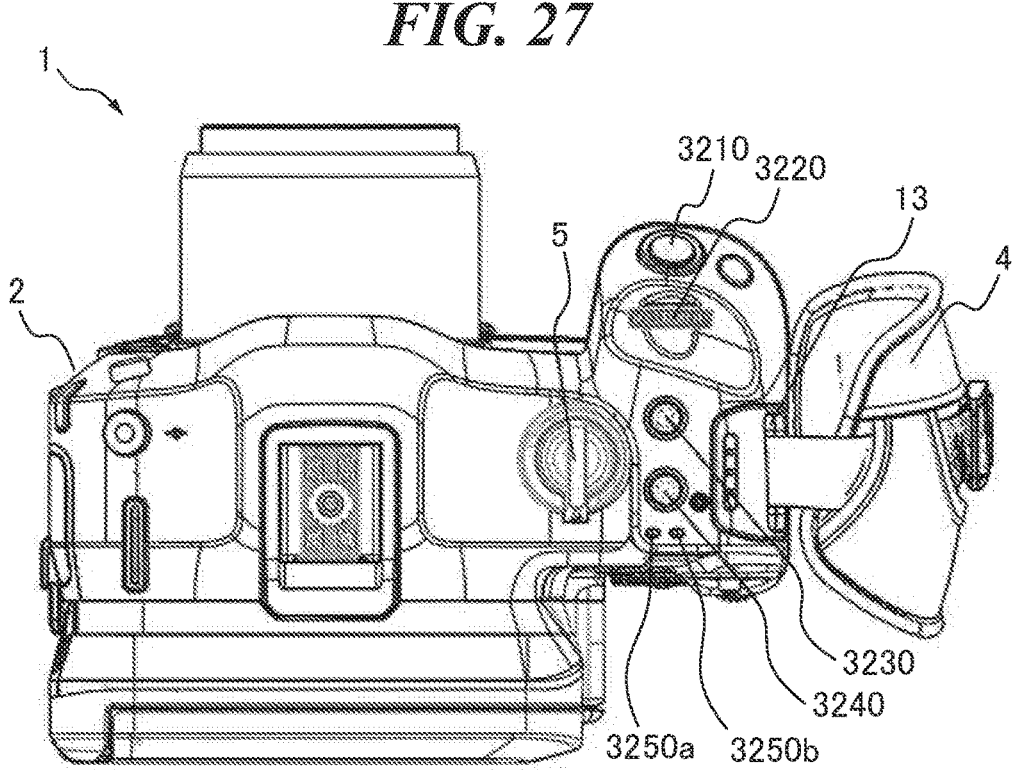
FIG. 27 is a top view showing the image pickup apparatus.
Figure 27:
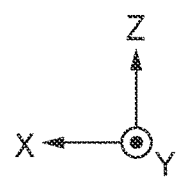

Next, keys in the top unit 3000 will be described. FIG. 27 is a top view showing the image pickup apparatus 1. Various operating members are arranged on the top surface of the top unit 3000 of the camera body 2 at the side of the grip unit 300 so that a user can operate them in a state holding the grip unit 300. A REC button 3210 for instructing to start and stop recording captured image data, an iris dial 3220 for changing an aperture value of the lens 3, etc. are arranged in the front area (+Z side) at the side of the grip unit 300 of the top unit 3000. The power switch 5, a media button 3230, a slot selection button 3240, and access LEDs 3250a and 3250b are arranged in the rear area (−Z side) at the side of the grip unit 300 of the top unit 3000.

By operating the media button 3230, the user achieves transition to the state of checking the picked-up image data. By operating the slot selection button 3240, the user can select one of the first recording medium 3110a and second recording medium 3110b to which the picked-up image is recorded. In that time, the user can confirm which of the two recording media 3110a and 3110b is used to record the image data by checking the access LEDs 3250a and 3250b.

Since the image pickup apparatus 1 can accommodate the two recording media 3110a and 3110b, the two access LEDs 3250a and 3250b are arranged side by side from the optical axis side. The first access LED 3250a near to the optical axis indicates the state of the first recording medium 3110a accommodated near the optical axis. The second access LED 3250b far from the optical axis indicates the state of the second recording medium 3110b far from the optical axis. That is, the arrangement relation of the recording media 3110a and 3110b matches that of the access LEDs 3250a and 3250b. Thereby, even when the recording media and access LEDs are separately arranged, the user can distinguish intuitively which recording medium is indicated by an access LED.

It can be considered that the first recording medium 3110a and the second recording medium 3110b are arranged in this order from the object side. Accordingly, although illustration is omitted, the first access LED 3250a may be arranged in the front side of the camera body 2 and the second access LED 3250b may be arranged in the rear side of the camera body 2. Also, in this case, the user can distinguish intuitively which recording medium is indicated by an access LED.

For example, the following state confirmation method of a recording medium using an access LED can be considered. Lighting in red of an access LED indicates that the corresponding recording medium is under recording, and lighting in green of the access LED indicates that the corresponding recording medium is in a recordable state (standby state). Thereby, the user can immediately check which recording medium is recording by seeing the color of the access LED. It should be noted that the access LED may distinguish a state by lighting and blinking instead of a lighting color.

Generally, since the slot selection button and access LED are related to the recording media, they are arranged near the medium lid in many cases. Against this, since the medium lid 6 of the image pickup apparatus 1 is arranged at the object side of the grip unit 300, the medium lid 6 is covered by a user's hand when the user holds the camera body 2. Accordingly, the slot selection button 3240 and access LEDs 3250a and 3250b are arranged on the top unit 3000 at the side of the grip unit 300 and at the −Z side. Thereby, the user can check the states of the recording media 3110a and 3110b and can select a slot in the state where the user holds the camera body 2.

The media button 3230 and the slot selection button 3240 are arranged at the +X side of the first body exhaust port 13. If the user tries to operate the media button 3230 or the slot selection button 3240 by an index finger while holding the camera body 2, the index finger will cover the first body exhaust port 13. Then, the exhaust wind warmed within the camera body 2 hits the user's index finger, which may give the user displeasure.

In order to avoid this, the image pickup apparatus 1 provides the first grip-belt through hole 305 just under the first body exhaust port 13 (the bottom side of the camera body 2 (−Y side)). Thereby, the movable range of the index finger is regulated with the grip belt 4 so that the media button 3230 and the slot selection button 3240 at the +X side of the first body exhaust port 13 cannot be operated by the index finger. Accordingly, since the user is naturally urged to use the thumb for operating the media button 3230 and the slot selection button 3240, the user can operate them comfortably without exposing a finger to the exhaust wind.

The REC button 3210 and the iris dial 3220 are also arranged in the top unit 3000 as mentioned above. Since these operating members are used frequently at photographing, they are arranged at the front side (+Z side) than the first body exhaust port 13 and the first grip-belt through hole 305 in the image pickup apparatus 1 so that they can be operated by the index finger of the hand that holds the camera body 2. Accordingly, when the user operates the REC button 3210 or the iris dial 3220 by the index finger of the hand that holds the camera body 2, the motion of the index finger is not regulated by the grip belt 4 and the exhaust wind does not hit the index finger.

Figure 28:
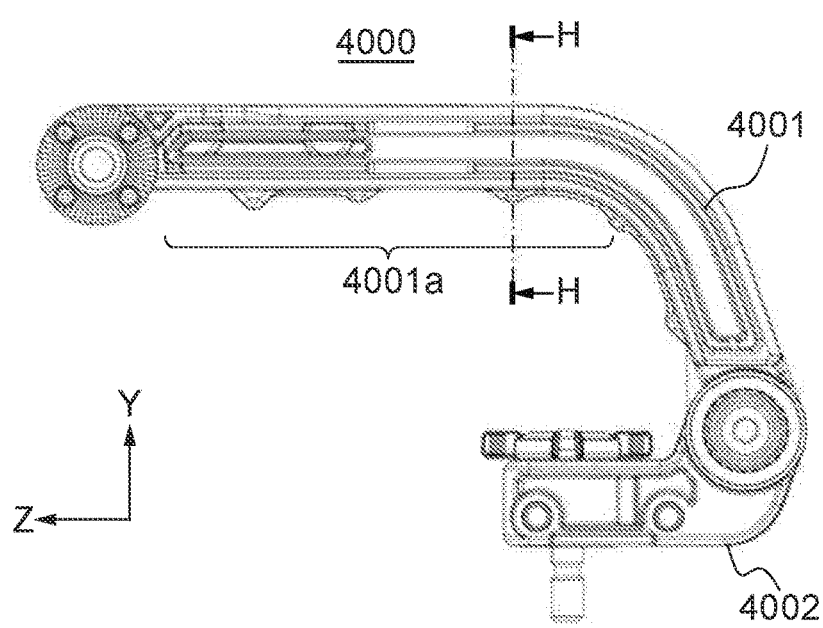
FIG. 28 is a side view showing a handle unit that constitutes the image pickup apparatus.
Figure 29:
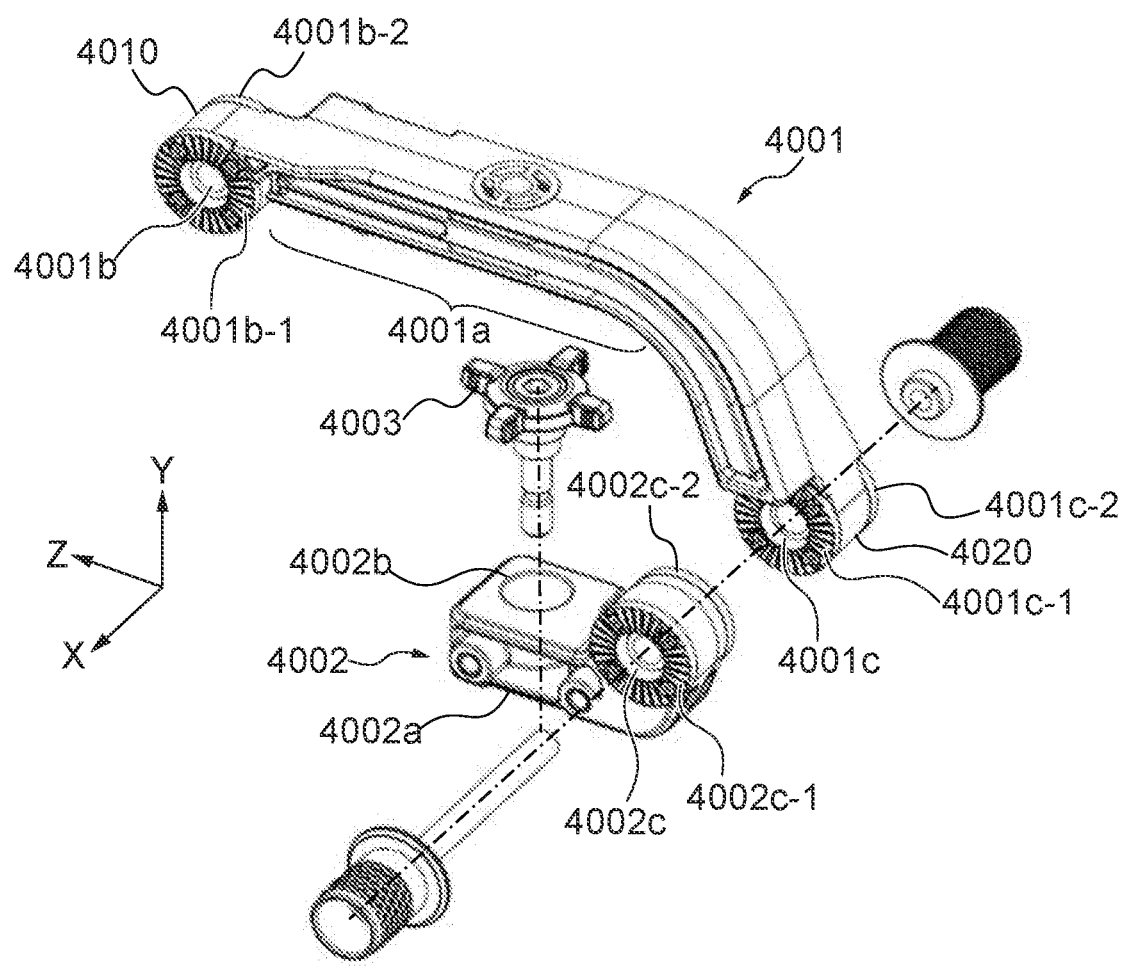
FIG. 29 is an exploded perspective view showing the handle unit.

FIG. 28 is a side view showing the handle unit 4000. FIG. 29 is an exploded perspective view showing the handle unit 4000. The handle unit 4000 is one of accessories that can be detachably attached to the camera body 2 and is fixed to the camera body 2 so that a long side will be parallel to the Z direction and will be extended to the +Z side as a basic configuration. The handle unit 4000 includes a handle part (handle member) 4001 and a holder component (first holding member) 4002. The handle part 4001 is approximately formed in an L-shape that includes a short side part and long side part extended in two directions. When the handle unit 4000 is attached to the image pickup apparatus 1, a user grips a grip part 4001a of the long side part (part being approximately parallel to the Z-axis) of the handle part 4001.

A first fastening part 4010 is formed at one end (tip end) of the handle part 4001 and a second fastening part 4020 is formed in the other end (base end). A through hole 4001b is provided in the first fastening part 4010, and a through hole 4001c is provided in the second fastening part 4020. Around the through holes 4001b and 4001c, rosettes (chrysanthemum-shaped fixtures) are provided in both sides (±X sides) in the X-direction that is a fastening direction. Specifically, the rosette 4001b-1 is provided around the through hole 4001b at the +X side, and the rosette 4001b-2 is provided around the through hole 4001b at the −X side. Similarly, the rosette 4001c-1 is provided around the through hole 4001c at the +X side, and the rosette 4001c-2 is provided around the through hole 4001c at the −X side. It should be noted that a rosette is provided with depressions and projections (hereinafter referred to as a "radial gear") formed in uniform phase in normal line directions of the center axis of the through hole. When a pair of rosettes are faced and their radial gears are abutted and engaged, the phases and centers of the rosettes are matched. The rosettes can be combined by changing the interphase for every gear phase pitch.

The holder component 4002 is fixed to the camera body 2 by abutting an attachment surface 4002a to the camera body 2 and by screwing a handle bolt 4003 to a thread part (fist fixing part) provided in the camera body 2 through a fixing hole (second fixing part) 4002b provided at the +Z side of the holder component 4002. In the holder component 4002, a through hole 4002c is provided in the end (−Z side) other than the fixing hole 4002b to the camera body 2. Moreover, the fastening part (second fastening part) of the holder component 4002 is formed by providing a rosette 4002c-1 at the +X side around the through hole 4002c and by providing a rosette 4002c-2 at the −X side around the through hole 4002c.

The rosette 4001c-1 that is provided in the second fastening part 4020 of the handle part 4001 is abutted to the rosette 4002c-2 that is provided in the holder component 4002 so that the through hole 4001c of the second fastening part 4020 will communicate with the through hole 4002c of the holder component 4002. Furthermore, a fastening bolt 4004 is inserted through both the through hole 4001c of the second fastening part 4020 and the through hole 4002c of the holder component 4002 and is engaged to a fastening nut 4005. Thereby, the handle part 4001 is firmly fixed to the holder component 4002 without rotating easily because the rosettes are engaged.

Figure 30:
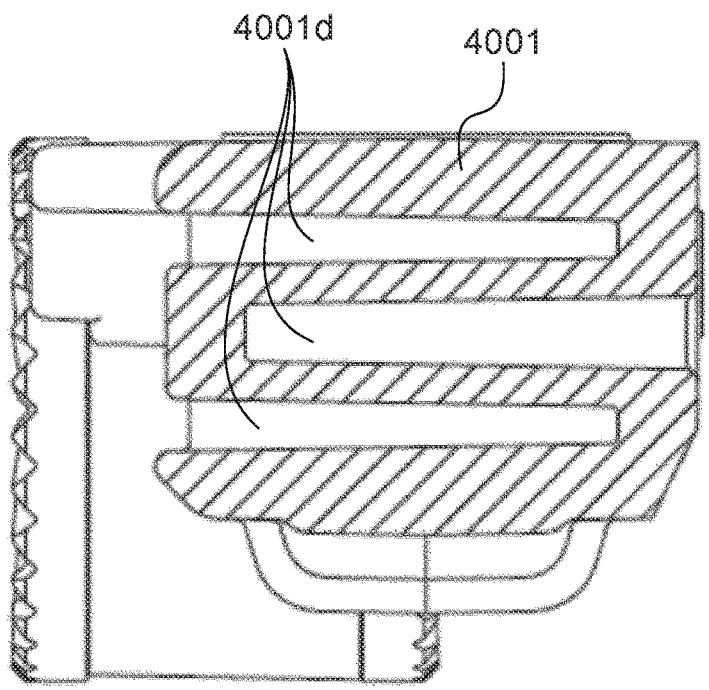
FIG. 30 is a sectional view showing the handle unit taken along a line H-H in FIG. 28.
Figure 30:

FIG. 30 is a sectional view showing the handle part 4001 taken along a line H-H in FIG. 28. The whole surface of the handle part 4001 becomes an appearance member in a product, and a fine view is required. In this embodiment, the handle part 4001 is manufactured by injection molding of resin material as one component. Accordingly, the thickness of the handle part 4001 should be uniform as possible in order to form the outside surface of the handle part 4001 smoothly. Accordingly, the handle part 4001 is configured to have an S-shaped section having depressions 4001d in both sides (+X side and −X side) in the X-direction. Thereby, the handle part 4001 secures high strength enough not to be broken when gripping the grip part 4001a while maintaining a fine view with uniform wall thickness. Moreover, since the depressions 4001d are formed alternately from the both sides in the X-direction, each the depressions becomes small (narrow), which prevents insertion of a finger into the depressions 4001d and improves the grip. It should be noted that such a cross section configuration of the handle part 4001 can be used for not only the L-shaped handle but also a handle of another shape made from resin material.

Figure 31:
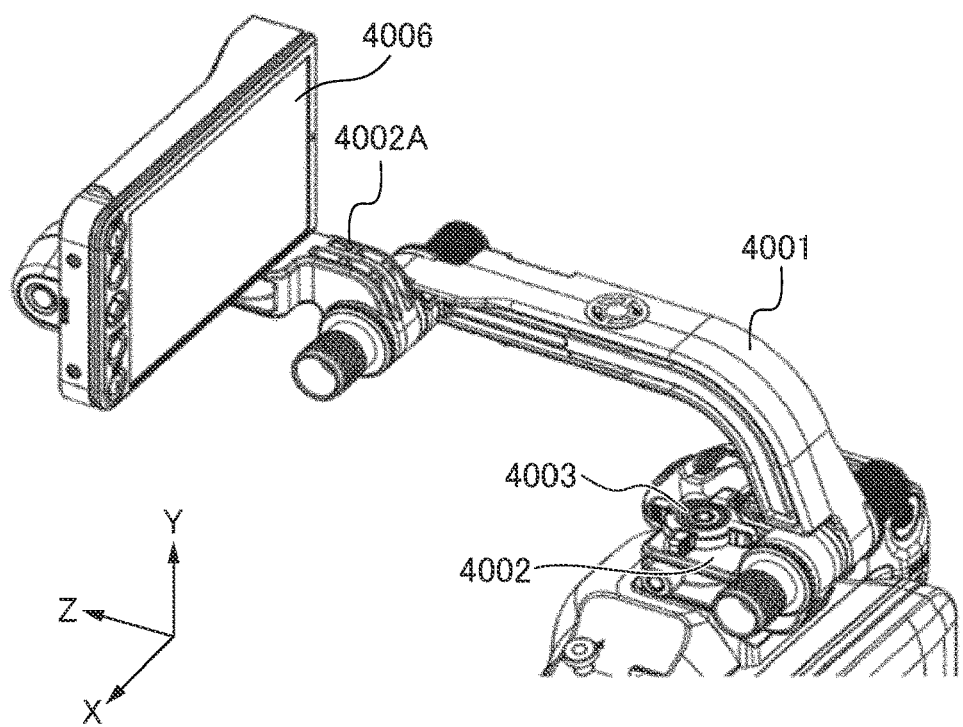
FIG. 31 is a perspective view showing one state of a display panel attached to the handle unit.

FIG. 31 is a perspective view showing one state where an accessory is attached to the handle unit 4000. As mentioned above, the handle unit 4000 is basically attached to the camera body 2 at one position so that the long side part (the extended part of the grip part 4001a) will be parallel to the Z-direction (optical axis direction) and the tip end will be directed to the +Z side. In this case, an accessory can be attached to the tip of the gripping member 4001a. In this example, a display panel 4006 for checking a photographed image and inputting an operation is attached as an accessory.

A holder component (second holding member) 4002A that holds the display panel 4006 has the same configuration as the holder component 4002 and is giving versatility to the holder component 4002 as components in this way. The display panel 4006 is fixed by screwing to a fixing hole of the holder component 4002A (equivalent to the fixing hole 4002b of the holder component 4002, see FIG. 29). Then, the display panel 4006 is fixed to the handle part 4001 by abutting a rosette of the holder component 4002A (equivalent to the rosette 4001c-1 of the holder component 4002) to the rosette 4002b-1 of the first fastening part 4010 of the handle part 4001, and by fastening with a bolt. In this state, since the display panel 4006 is in front of the camera body 2, a user can easily photograph while watching the display panel 4006 when carrying the image pickup apparatus 1 on the shoulder.

Figure 32A:
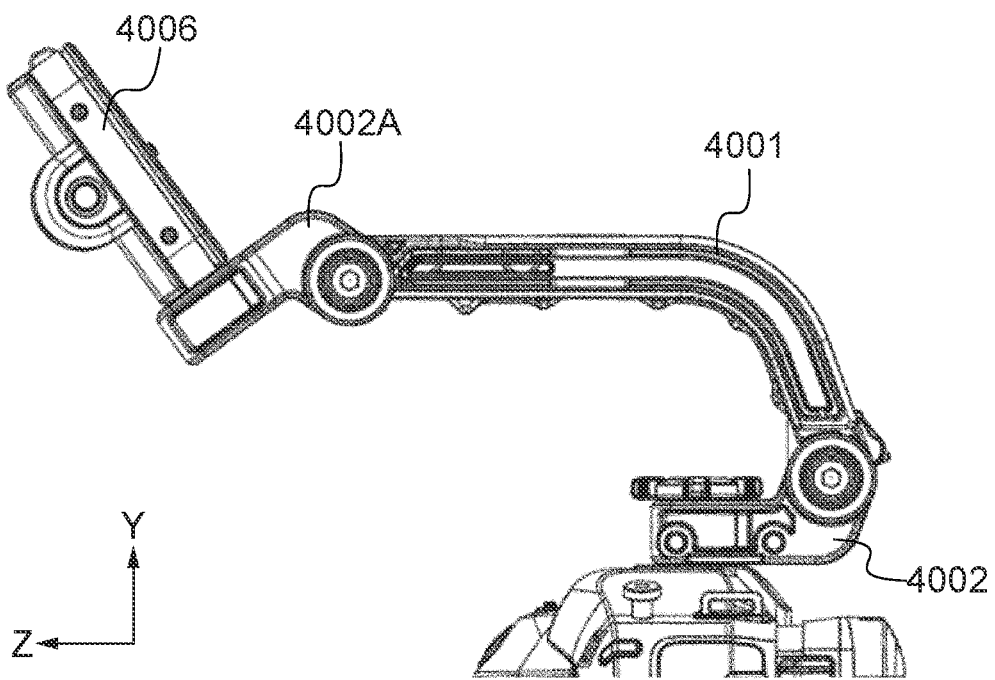
FIG. 32A and FIG. 32B are side views showing examples of attachment states of the display panel to the handle unit.
Figure 32B:
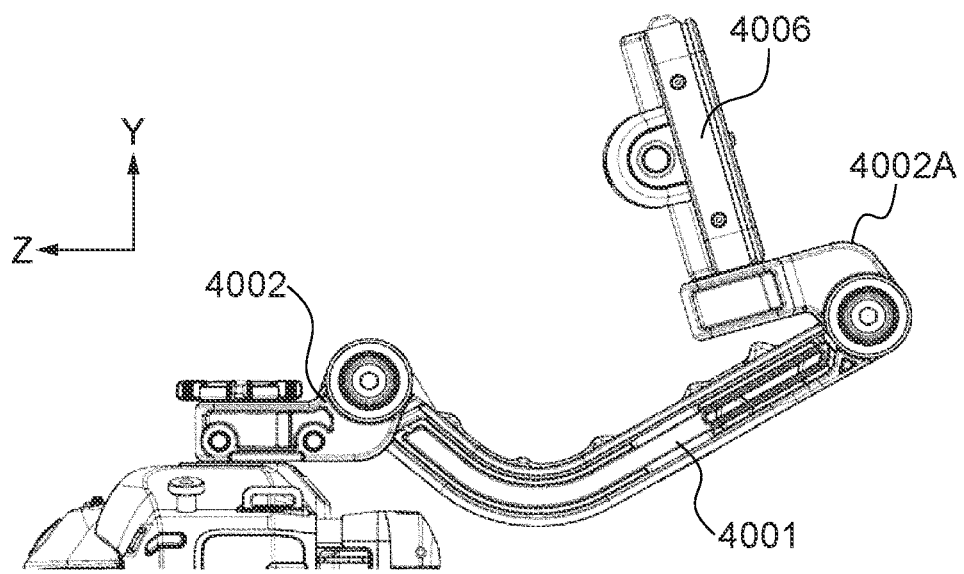

FIG. 32A and FIG. 32B are side views showing examples of attachment states of the display panel 4006 to the handle unit 4000. FIG. 32A shows the attachment state that is changed from the state of FIG. 31 only in an attachment angle of the display panel 4006 to the holder component 4002A. In the attachment state of FIG. 32A, since a screen of the display panel 4006 is directed in a slant upper direction, the user can easily check the display when photographing in low angle.

FIG. 32B shows the attachment state that is changed from the state of FIG. 31 in the attachment angle of the handle unit 4000 to the camera body 2 and the attachment angle of the display panel 4006 to the handle unit 4000. In the attachment state of FIG. 32B, since the display panel 4006 is arranged in a position projected to the back side (−Z side), the screen of the display panel 4006 can be seen from the back of the image pickup apparatus 1, and accordingly persons other than the user can easily check an image. Moreover, this attachment state is useful when the image pickup apparatus 1 is attached to a tripod and the user checks the display from a back side that is distant from the image pickup apparatus 1.

Figure 33A:
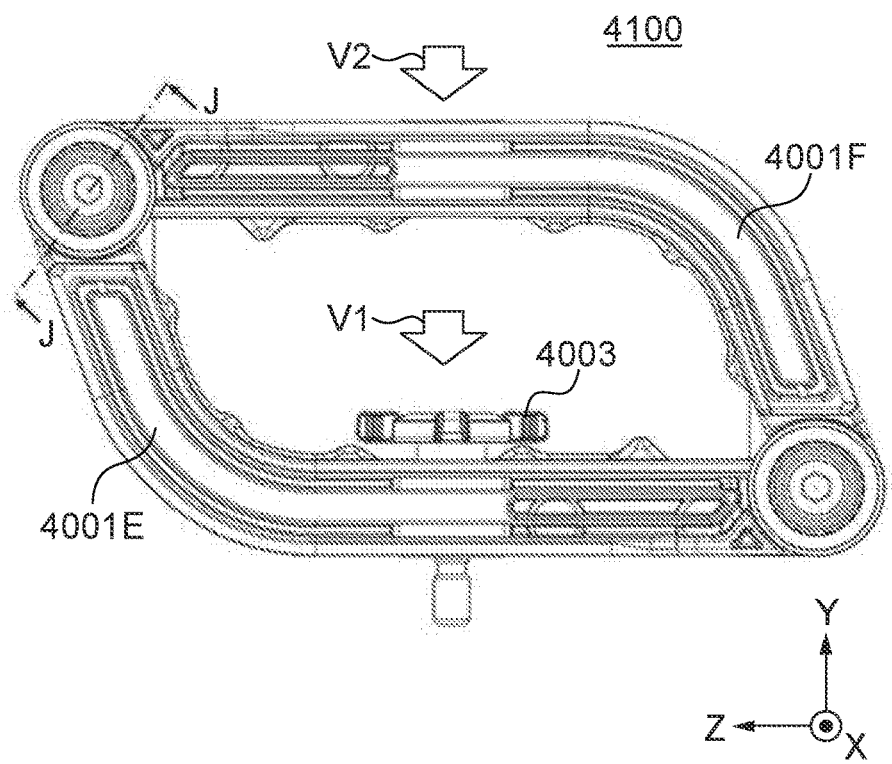
FIG. 33A and FIG. 33B are views describing an annular handle assembled by two handle parts.
Figure 33B:
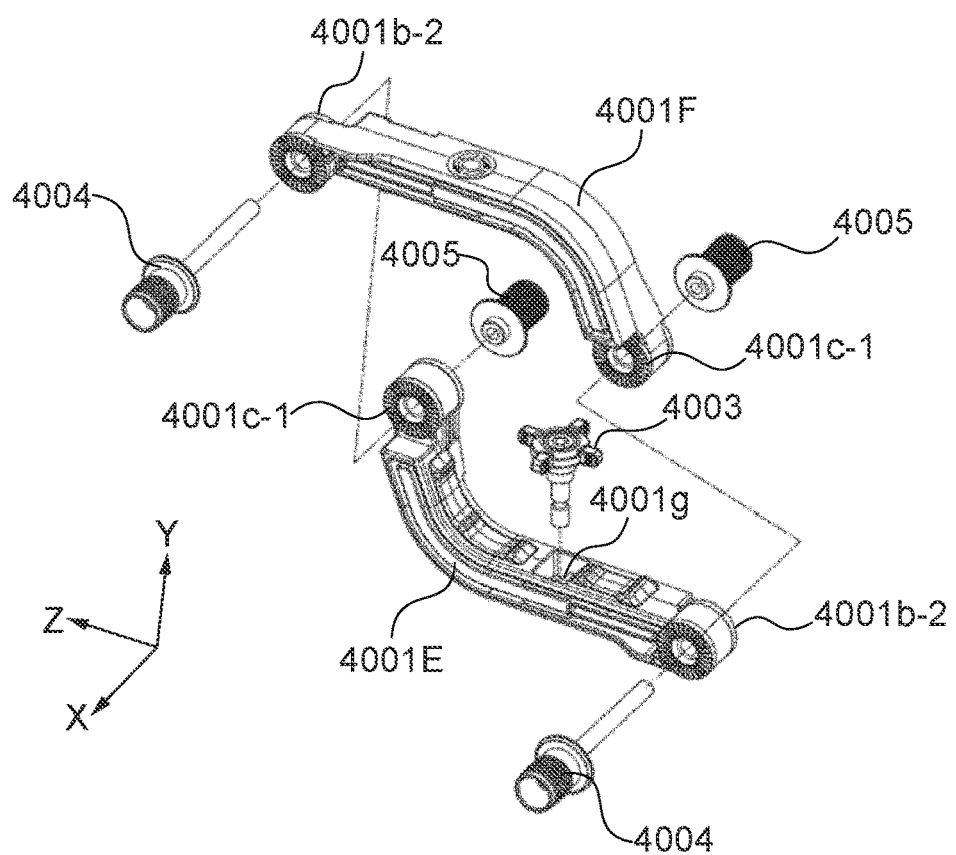

FIG. 33A is a side view showing an annular handle 4100 assembled using two handle parts 4001E and 4001F. FIG. 33B is an exploded perspective view of the annular handle 4100. The annular handle 4100 is constituted by rotating one of the handle parts 4001E and 4001F around the X-axis by 180 degrees and by combining and fastening to each other. It should be noted that the handle part 4001E and 4001F are identical to the handle part 4001 shown in FIG. 28.

A rosette 4001c-1 of the handle part 4001E is engaged to a rosette 4001b-2 of the handle part 4001F, and a rosette 4001b-2 of the handle part 4001E is engaged to a rosette 4001c-1 of the handle part 4001F. Then, the fastening bolts 4004 inserted into the through holes of the respective engagement parts are screwed to the fastening nuts 4005 in the X-direction. Thereby, the annular handle 4100 is obtained. A fixing hole 4001g that is a fixing part to the camera body 2 is provided in the center position of the long side part of each of the handle parts 4001E and 4001F. Accordingly, the annular handle 4100 is fixed to the camera body 2 by screwing the handle bolt 4003 to the camera bod 2 through the fixing hole 4001g.

The annular handle 4100 improves the strength in the holding-up direction as compared with the case where the handle part 4001 is used independently. Accordingly, when the image pickup apparatus 1 is compact and lightweight, the handle unit 4000 is used independently. When the image pickup apparatus 1 of which the weight becomes heavy because of combination with a large lens is used, the annular handle 4100 is used. Such a separation gives high convenience.

Figure 34A:
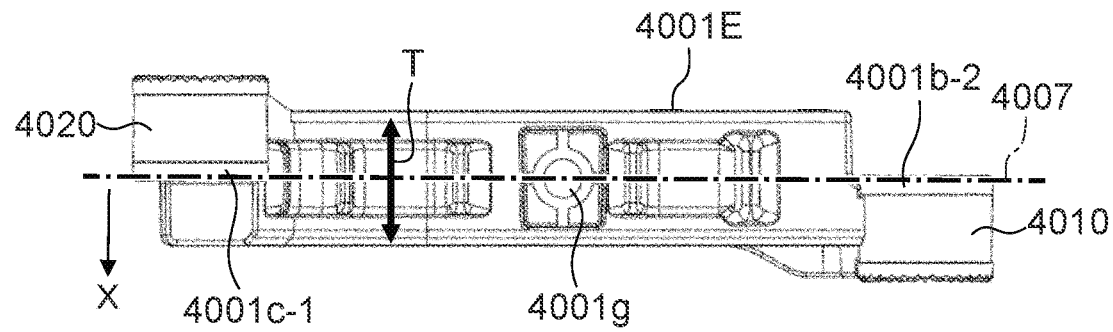
FIG. 34A and FIG. 34B are plan views showing the annular handle viewed in a direction of an arrow shown in FIG. 33A.
Figure 34B:
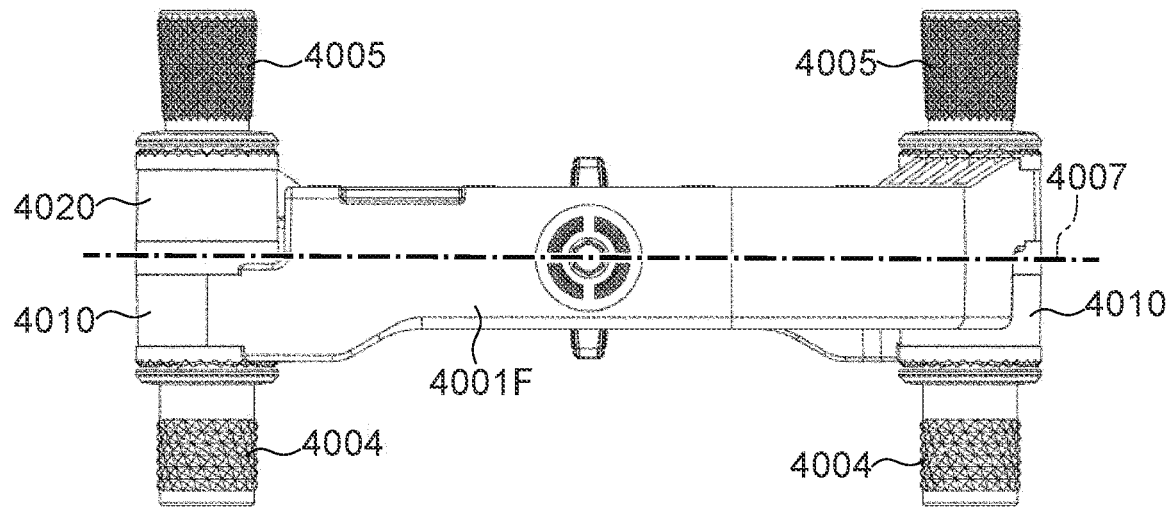

FIG. 34A is a plan view showing the handle part 4001E that forms the annular handle viewed in a direction of an arrow V1 shown in FIG. 33A from a position shown by the arrow V1. FIG. 34B is a plan view showing the annular handle 4100 viewed in a direction of an arrow V2 shown in FIG. 33A from a position shown by the arrow V2.

As shown in FIG. 34A, a center (a position that divides the width into two equally) of the thickness of the grip part

4001*a* of the handle part 4001E indicated by an arrow T in the X-direction is defined as a center position 4007 shown by an alternate long and short dash line. The fixing hole 4001*g* is provided on the center position 4007. Then, the rosette 4001*c*-1 facing to the +X side around the through hole 4001*b* (the second fastening part 4020) of the handle part 4001E is located on the center position 4007. Moreover, the rosette 4001*b*-1 facing to the −X side around the through hole 4001*b* (the first fastening part 4010) of the handle part 4001E is located on the center position 4007.

Such a configuration of the handle part 4001E is identical to that of the handle part 4001F. The center positions 4007 of the handle parts 4001E and 4001F are coincident when the annular handle 4100 is formed by combining the handle parts 4001E and 4001F of which the rosettes at both the ends are located on the center position 4007 and face to the opposite sides in the width direction. Thereby, the fixing hole 4001*g* of the handle part 4001E of the lower side (the side of the camera body 2) is coincident with the thickness center of the grip part 4001*a* of the handle part 4001F in the X-direction. Since the grip part 4001*a* of the handle part 4001F does not shift from the attachment part to the camera body 2 when the annular handle 4100 is attached to the camera body 2, the handle part 4001F can be held with sufficient balance.

Figure 35:
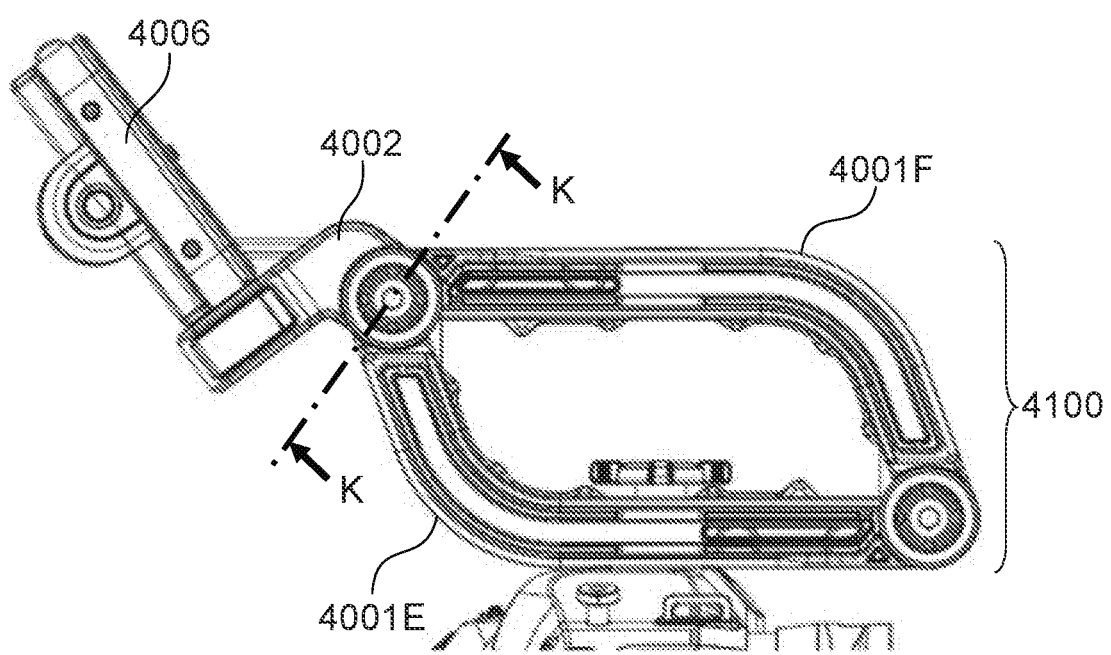
FIG. 35 is a view showing one state where the display panel is attached to the annular handle.
Figure 36A:
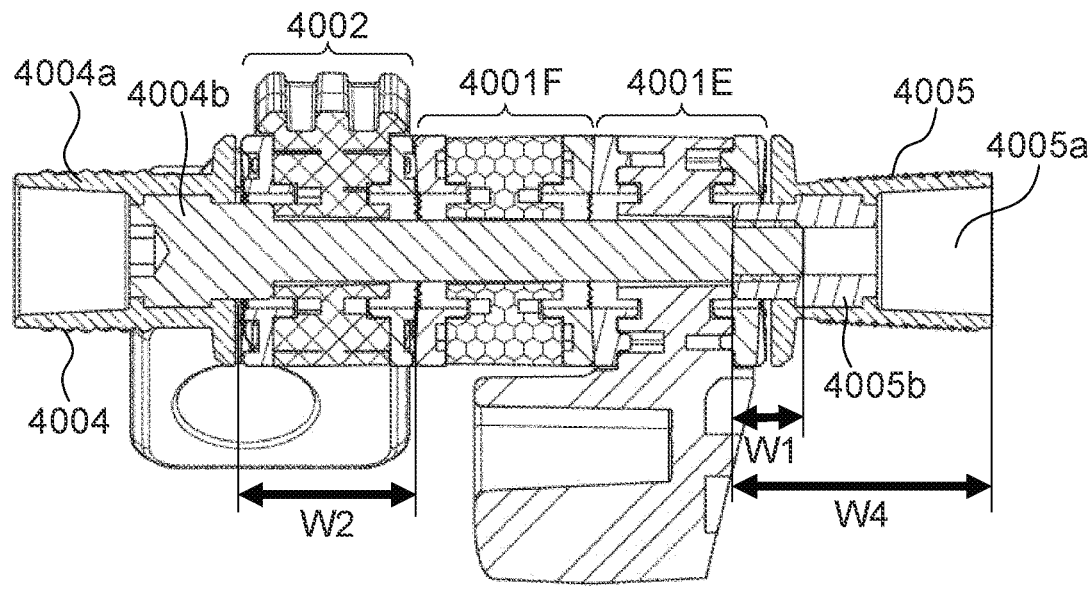
FIG. 36A and FIG. 36B are sectional views showing the annular handle taken along a line K-K in FIG. 35 and a line J-J in FIG. 33A, respectively.

FIG. 35 is a view showing one state where the display panel 4006 is attached to the annular handle 4100. FIG. 36A is a sectional view showing the annular handle 4100 taken along a line K-K shown in FIG. 35. The display panel 4006 is fixed to the first fastening part 4010 of the handle part 4001F, which is one of the connection parts of the handle parts 4001E and 4001F of the annular handle 4100, through the holder component 4002. The rosette 4002*c*-2 of the holder component 4002 to which the display panel 4006 is fixed is engaged to the rosette 4001*b*-1 at the +X side of the handle part 4001F, and they are fastened by the fastening bolt 4004 and the fastening nut 4005 in the X-direction. Thereby, the second fastening part 4020 of the handle part 4001E, the first fastening part 4010 of the handle part 4001F, and the holder component 4002 are fastened in the X-direction in this order from the −X side and are fixed firmly.

In this state, since the display panel 4006 is in front of the camera body 2 as with the state shown in FIG. 31, the user can easily photograph while watching the display panel 4006 when carrying the image pickup apparatus 1 on the shoulder. It should be noted that the display panel 4006 can be fixed to the rosette 4001*c*-2 at the −X side of the second fastening part 4020 of the handle part 4001E of the annular handle 4100 through the holder component 4002.

Figure 36B:
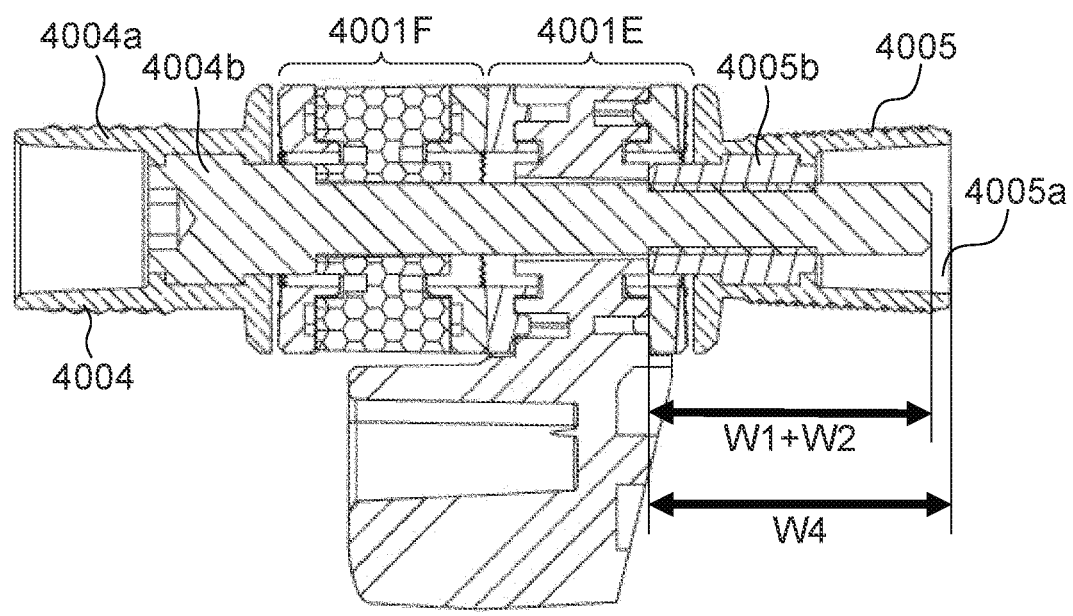

FIG. 36B is a sectional view showing the handle part 4001 taken along a line J-J in FIG. 33A. The fastening state by the fastening bolt 4004 and the fastening nut 4005 will be described hereinafter by comparing FIG. 36A and FIG. 36B. The fastening bolt 4004 is constituted by a grip part 4004*a* and an external screw part 4004*b*. The grip part 4004*a* is a grip for tightening and loosening the fastening bolt 4004 that is screwed to the fastening nut 4005. The external screw part 4004*b* is cylindrical and is integrally assembled with the grip part 4004*a*. The fastening nut 4005 is constituted by a grip part 4005*a* and an internal screw part 4005*b*. The grip part 4005*a* is a grip for tightening and loosening the fastening nut 4005 that is screwed to the fastening bolt 4004 and has a hollow part. The internal screw part 4005*b* has an internal screw in a center hole and is integrally assembled with the grip part 4005*a*.

In FIG. 36A, the three members including the handle part 4001E, the handle part 4001F, and the holder component 4002 are put between the fastening bolt 4004 and the fastening nut 4005. The external screw part 4004*b* of the fastening bolt 4004 is screwed with the fastening nut 4005 in a range of a length W1 in this state. In the meantime, in FIG. 36B, the two members including the handle part 4001E and the handle part 4001F are put between the fastening bolt 4004 and the fastening nut 4005. The external screw part 4004*b* of the fastening bolt 4004 is screwed with the fastening nut 4005 in a range of a length W1+W2 in this state. It should be noted that the two members including the handle part 4001 and the holder component 4002 may be put between the fastening bolt 4004 and the fastening nut 4005 as shown in FIG. 31.

In this way, the fastening bolt 4004 may fix three members or two members when an accessory like the display panel 4006 is attached. Accordingly, the external screw part 4004*b* of the fastening bolt 4004 needs a predetermined length so as to screw to the internal screw part 4005*b* of the fastening nut 4005 even when the three members are put therebetween. In the meantime, the length of the external screw part 4004*b* of the fastening bolt 4004 is determined so that a tip of the external screw part 4004*b* that is screwed with the internal screw part 4005*b* and enters into the hollow part is not projected from the grip part 4005*a*. This is because the external screw part 4004*b* of the fastening bolt 4004 is made from metal and the projection of the tip of the external screw part 4004*b* from the fastening nut 4005 is not preferable.

Accordingly, the length of the external screw part 4004*b* of the fastening bolt 4004 is determined so as to be sufficient when three members are inserted so as not to be projected from the grip part 4005*a* of the fastening nut 4005 when two members are inserted. Specifically, the length of the fastening nut in the axial direction is 'W4' and the length of the portion of the holder component 4002 put between the fastening bolt 4004 and the fastening nut 4005 is 'W2'. Moreover, when the fastening bolt 4004 is screwed to the fastening nut 4005 by a length W1 as shown in FIG. 36A, firm fastening is obtained.

In this case, when the two members including the handle parts 4001E and 4001F excluding the holder component 4002 are fastened as shown in FIG. 36B, the external screw part 4004*b* of the fastening bolt 4004 proceeds to the side of the fastening nut 4005 by the length W2. Accordingly, when the relation of 'W1+W2<W4' is satisfied, a user does not touch the external screw part 4004*b* of the fastening bolt 4004 even when the two members are inserted, which enables safe use.

Other Embodiments

While various embodiments of the present disclosure have been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-094419, filed May 29, 2020, which is hereby incorporated by reference herein in its entirety.

What is claimed is:

1. An image pickup apparatus comprising:
    an image pickup apparatus body configured to have a first fixing part;
    a handle member configured to have a first fastening part at a tip and a second fastening part at a base end; and a first holding member configured to have a third fastening part that is fastened with the second fastening part and a second fixing part that is fixed to the first fixing part, wherein each of the first fastening part, the second fastening part, and the third fastening part includes: a radial gear and a through hole provided in a direction approximately parallel to a fastening direction, where the radial gear includes depressions and projections formed in uniform phase in normal line directions of a center axis of the through hole, and wherein the handle member is fixed to the first holding member by communicating the through hole of the second fastening part with the through hole of the third fastening part and by a fastening bolt being screwed with a fastening nut through the communicated through holes in a state where the radial gears of the first, second, and third fastening parts are engaged.

2. The image pickup apparatus according to claim 1, wherein attachment of the handle member to the image pickup apparatus body forms an attachment angle that is adjustable by changing an interphase of engagement between the radial gear of the second fastening part and the radial gear of the third fastening part.

3. The image pickup apparatus according to claim 1,
wherein the handle member is approximately formed in an L-shape, and
wherein an accessory is fixed to the first fastening part of the handle member through a second holding member.

4. The image pickup apparatus according to claim 3,
wherein the second holding member has a fourth fastening part,
wherein the fourth fastening part includes a radial gear configured to engage with the radial gear of the first fastening part and includes a through hole provided in a center of the radial gear of the fourth fastening part, and
wherein attachment of the accessory to the handle member forms an attachment angle that is adjustable by changing an interphase of engagement between the radial gear of the first fastening part and the radial gear of the fourth fastening part.

5. The image pickup apparatus according to claim 1,
wherein the fastening bolt includes an external screw part having a cylindrical shape and includes a grip part that is assembled integrally with the external screw part,
wherein the fastening nut includes an internal screw part that is screwed with the external screw part and includes a grip part that has a hollow part, and
wherein a tip of the external screw part that is screwed with the internal screw part and enters into the hollow part is not projected from the grip part of the fastening nut in a case where a second holding member is fastened to the handle member by screwing the fastening bolt with the fastening nut.

6. An image pickup apparatus comprising:
an image pickup apparatus body configured to have an image pickup apparatus body fixing part;
a first handle member configured to be approximately formed in a first L-shape having a long side and a short side, and to have a long side first fastening part at an end of the long side, a short side first fastening part at an end of the short side, and a first fixing part configured to be fixed to the image pickup apparatus body fixing part at the long side; and
a second handle member configured to be approximately formed in a second L-shape having a long side and a short side, and to have a long side second fastening part at an end of the long side of the second L-shape, a short side second fastening part at an end of the short side of the second L-shape, and a second fixing part configured to be fixed to the image pickup apparatus body fixing part at the long side of the second L-shape, wherein each of the long side first fastening part, the short side first fastening part, the long side second fastening part, and the short side second fastening part includes a radial gear and a through hole provided in a direction approximately parallel to a fastening direction, where the radial gear includes depressions and projections formed in uniform phase in normal line directions of a center axis of the through hole, wherein the first handle member and the second handle member are annularly fastened by respectively communicating the through holes of the first fastening parts with the through holes of the second fastening parts to form two communicated through holes, and by respectively screwing two fastening bolts to two fastening nuts through the two communicated through holes in a state where the radial gears of the long side first fastening part, the short side first fastening part, the long side second fastening part, and the short side second fastening part are engaged, and wherein one of the first fixing part of the first handle member and the second fixing part of the second handle member is fixed to the image pickup apparatus body fixing part.

7. The image pickup apparatus according to claim 6,
wherein each of the two fastening bolts includes an external screw part having a cylindrical shape and includes a grip part that is assembled integrally with the external screw part,
wherein each of the two fastening nuts includes an internal screw part that is screwed with the external screw part of the two fastening bolts and includes a grip part that has a hollow part, and
wherein tips of the two external screw parts that are screwed with the two internal screw parts and enter into the two hollow parts are not projected from either of the two grip parts of the two fastening nuts in a case where the first handle member is fastened to the second handle member by screwing the two fastening bolts with the two fastening nuts.

8. The image pickup apparatus according to claim 6, further comprising a holding member having a third fastening part,
wherein the third fastening part includes a radial gear, a through hole provided in a center of the third fastening part radial gear, and a holding part configured to hold an accessory,
wherein the third fastening part radial gear is configured to engage with one radial gear from the following four radial gears: the long side first fastening part radial gear, the short side first fastening part radial gear, the long side second fastening part radial gear, or the short side second fastening part radial gear,
wherein the four radial gears are provided in both sides in the fastening direction in each of the first fastening parts and the second fastening parts,
wherein the third fastening part is fixed to one of two fastened parts of the first handle member and the second handle member, and wherein the two fastened parts are annularly fastened to form an annular handle member, so as to be inserted between one of the two fastening bolts and one of the two fastening nuts.

9. The image pickup apparatus according to claim 8, wherein attachment of the accessory to the first handle member forms an attachment angle that is adjustable by changing an interphase of engagement between the radial gear of the third fastening part and a radial gear that engages with the radial gear of the third fastening part.

10. The image pickup apparatus according to claim 6, wherein the four radial gears are provided so as to face in mutually opposite directions in a width direction of each of the first and second handle members in a center position that divides each width of the first and second handle members into two equal halves.

11. The image pickup apparatus according to claim 6, wherein each of the first and second fixing parts is provided in a center position that divides each width of the first and second handle members into two equal halves.

\* \* \* \* \*